Figure 2A:
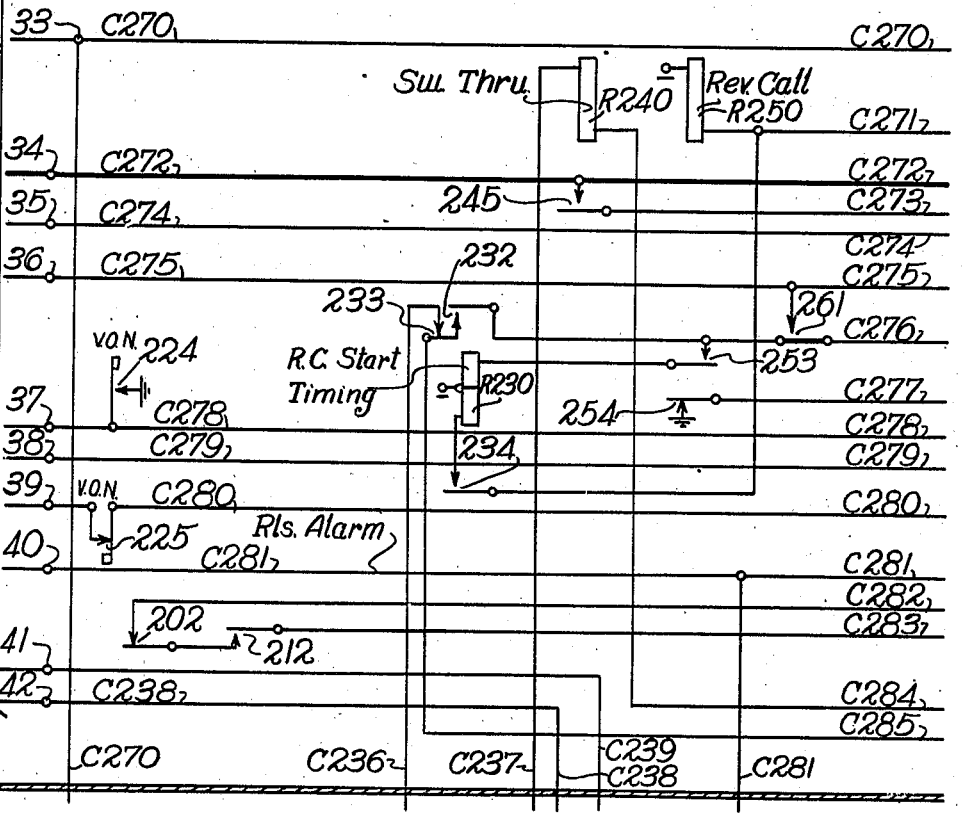

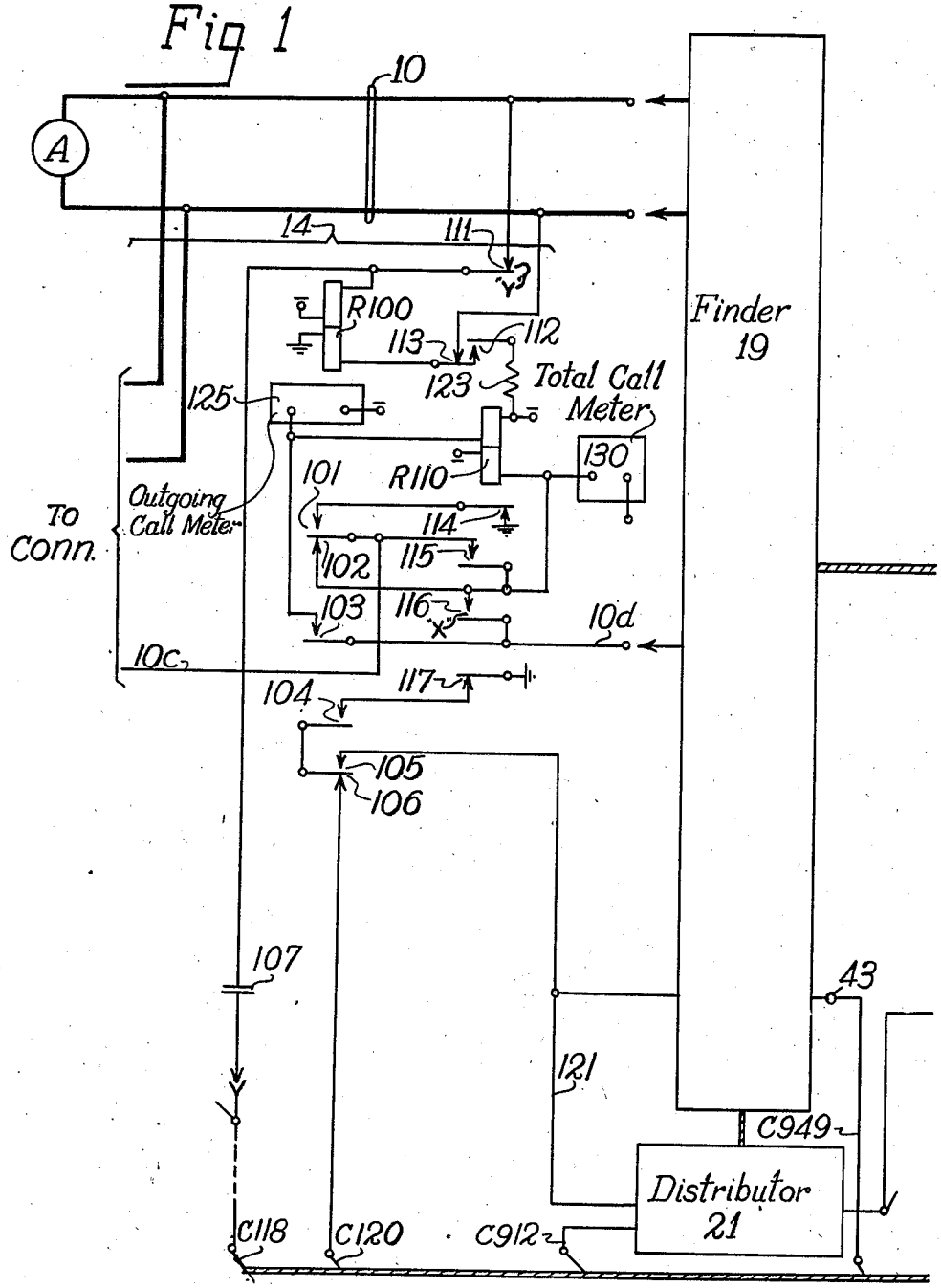

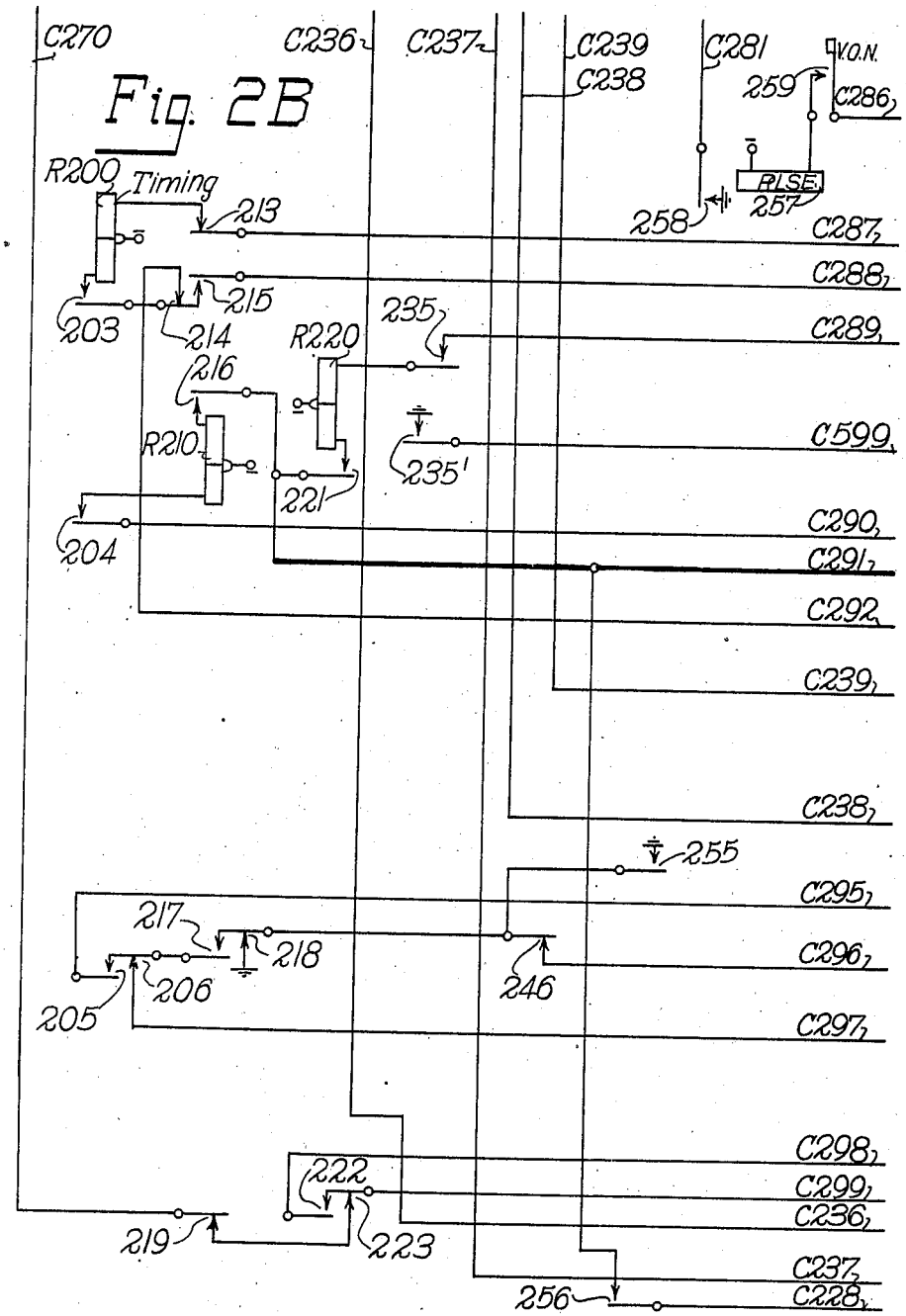

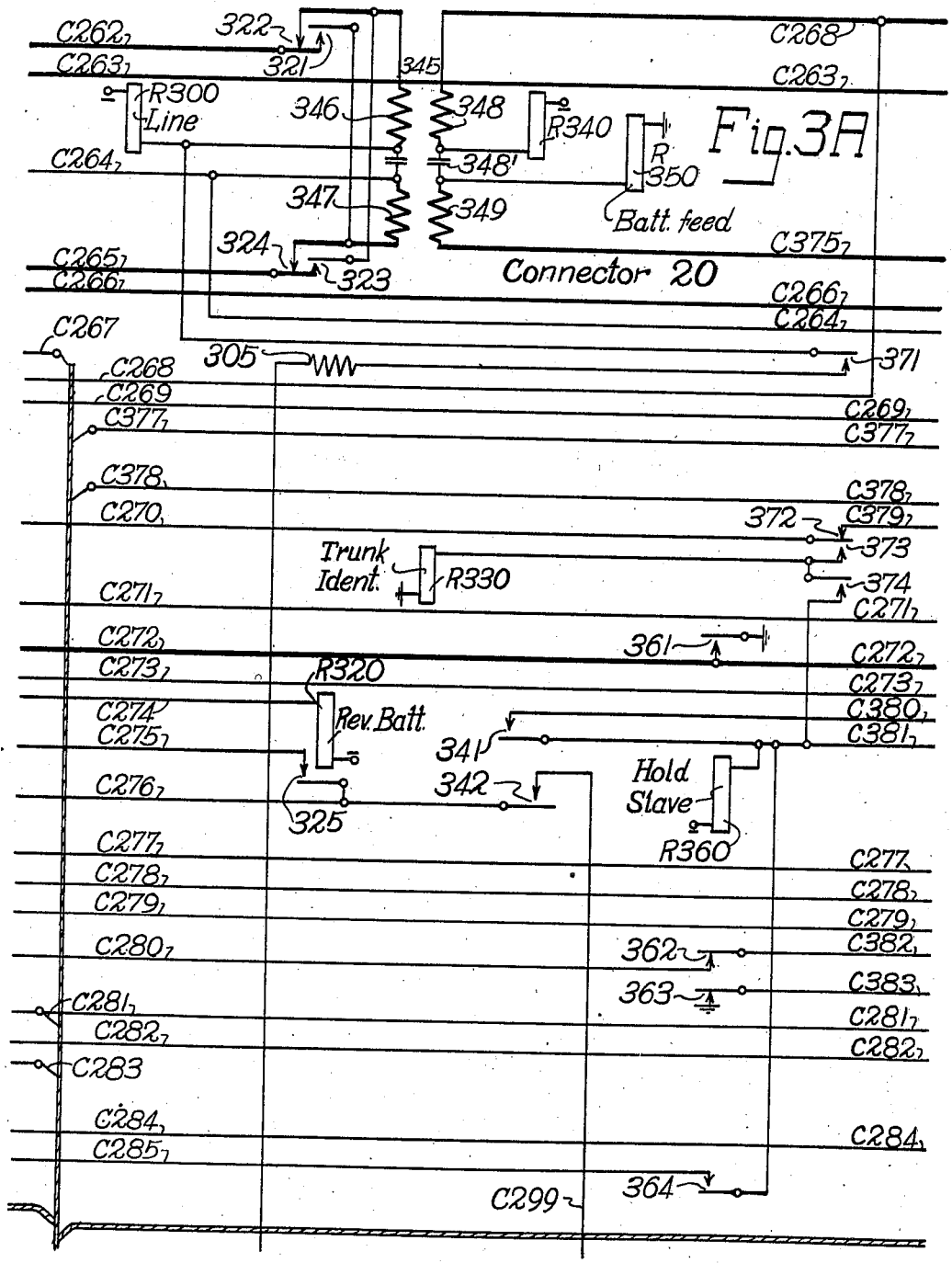

Dec. 21, 1943.　　　　P. BAKKER　　　　2,337,365
TELEPHONE SYSTEM
Filed Dec. 15, 1941　　　19 Sheets-Sheet 5
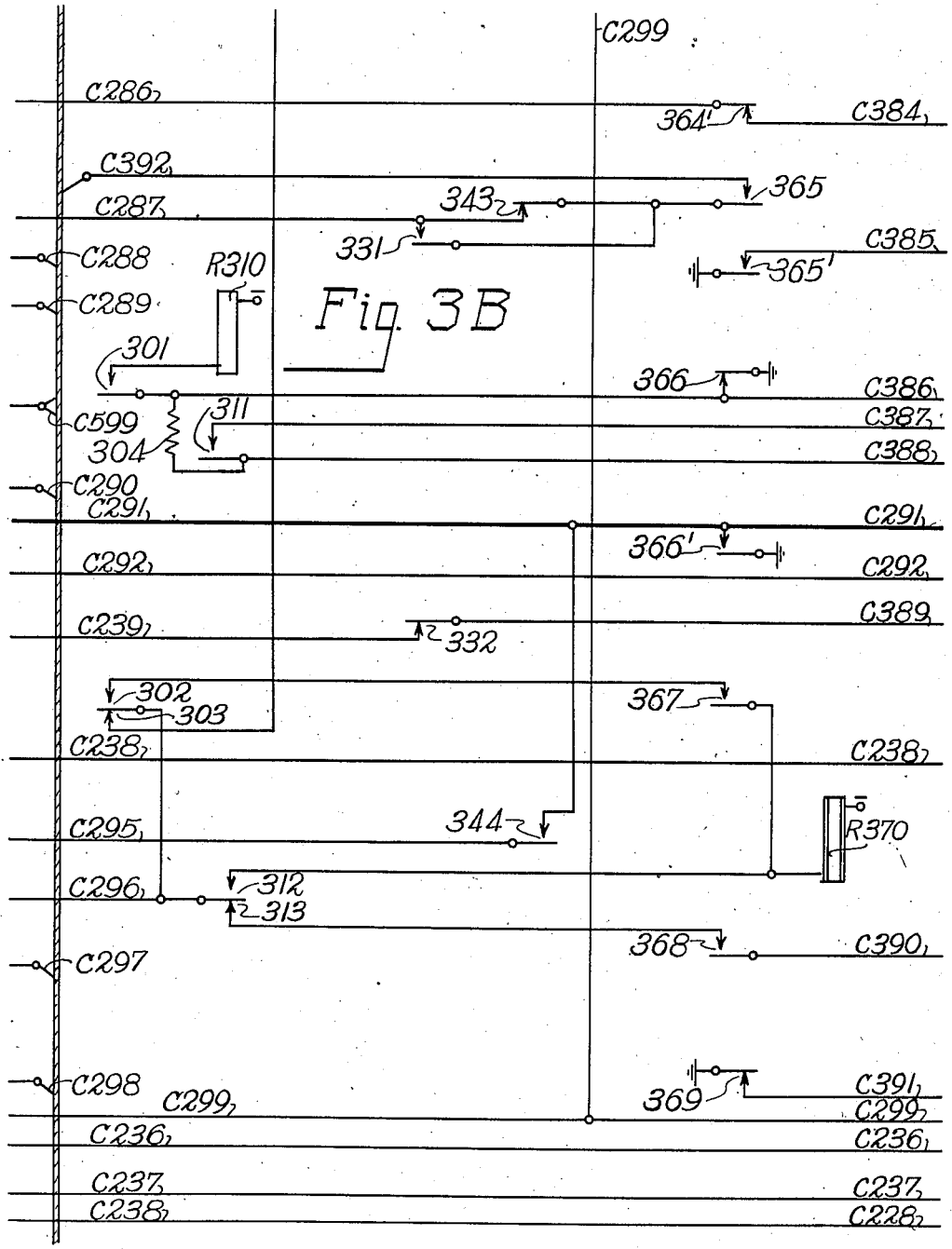
INVENTOR
Pier Bakker
BY
Davis, Lindsey, Smith & Shonts
ATTORNEYS

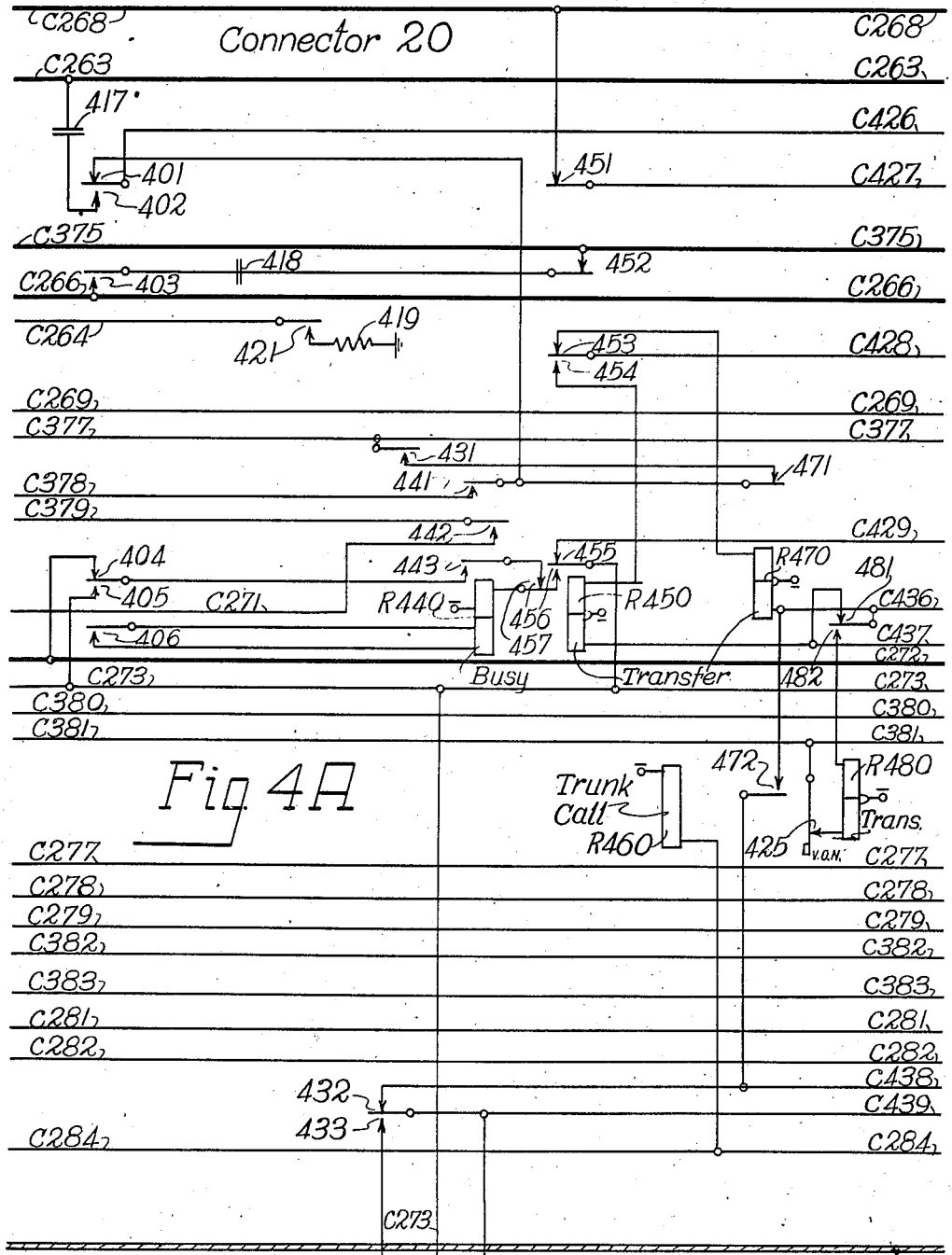

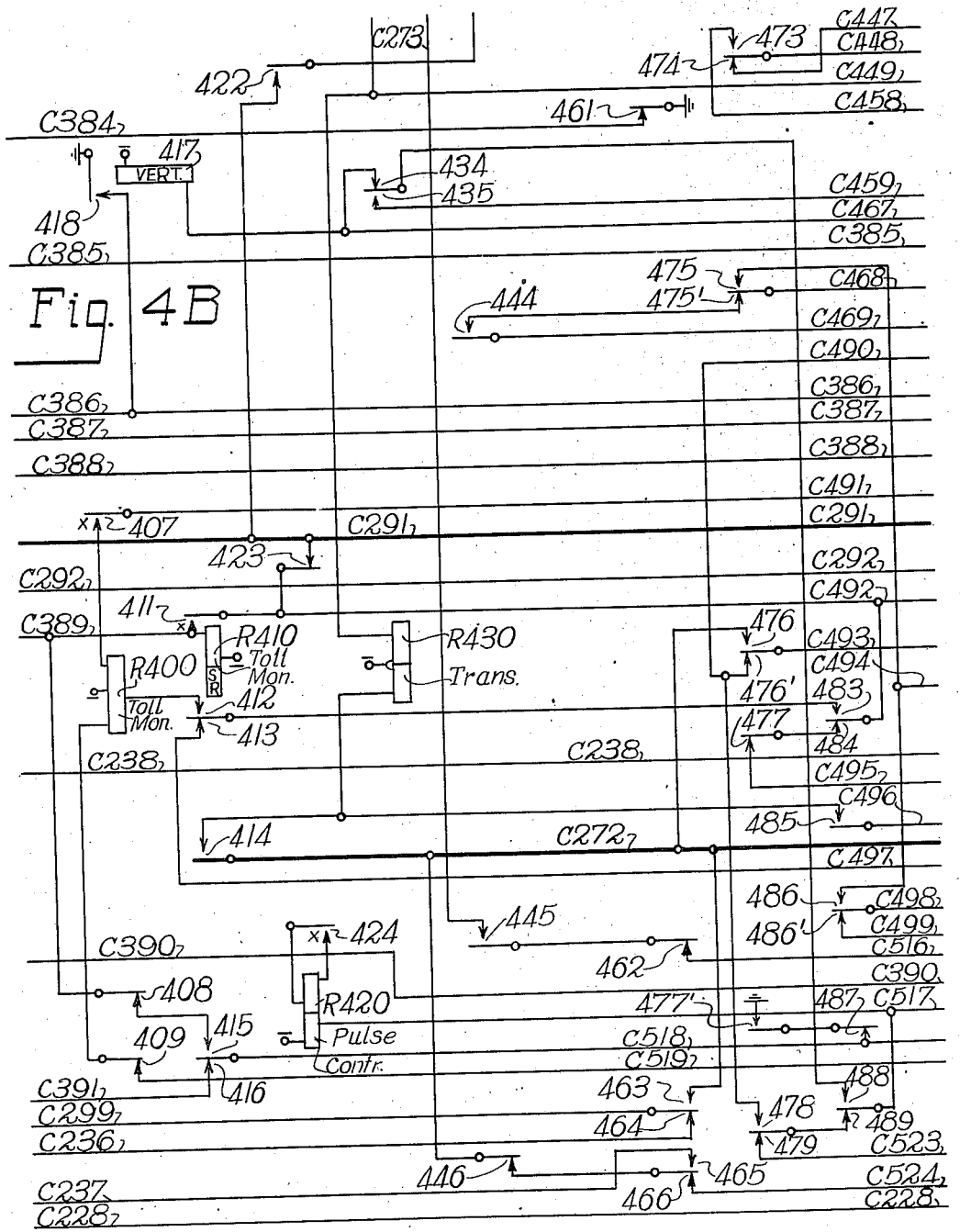

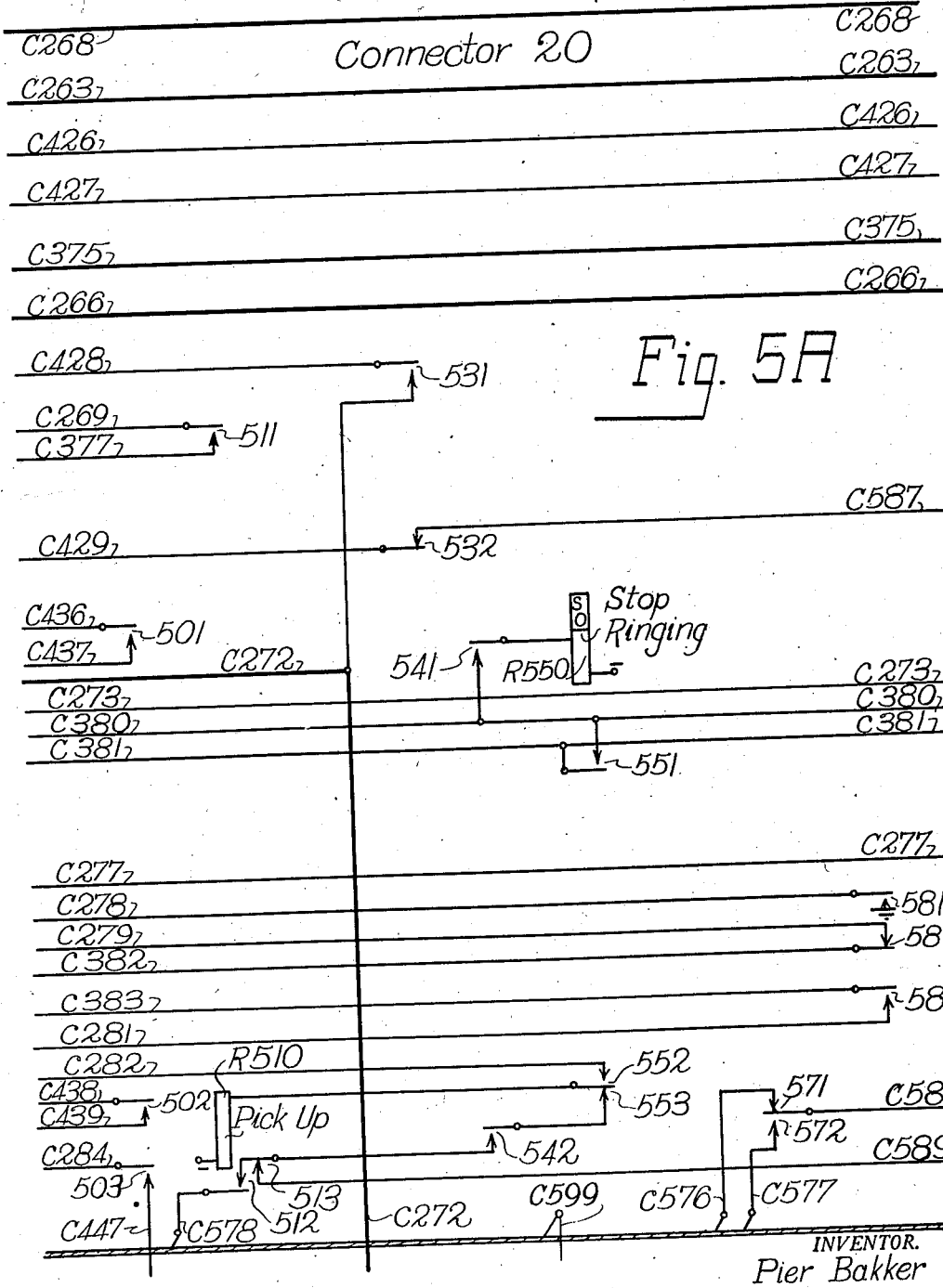

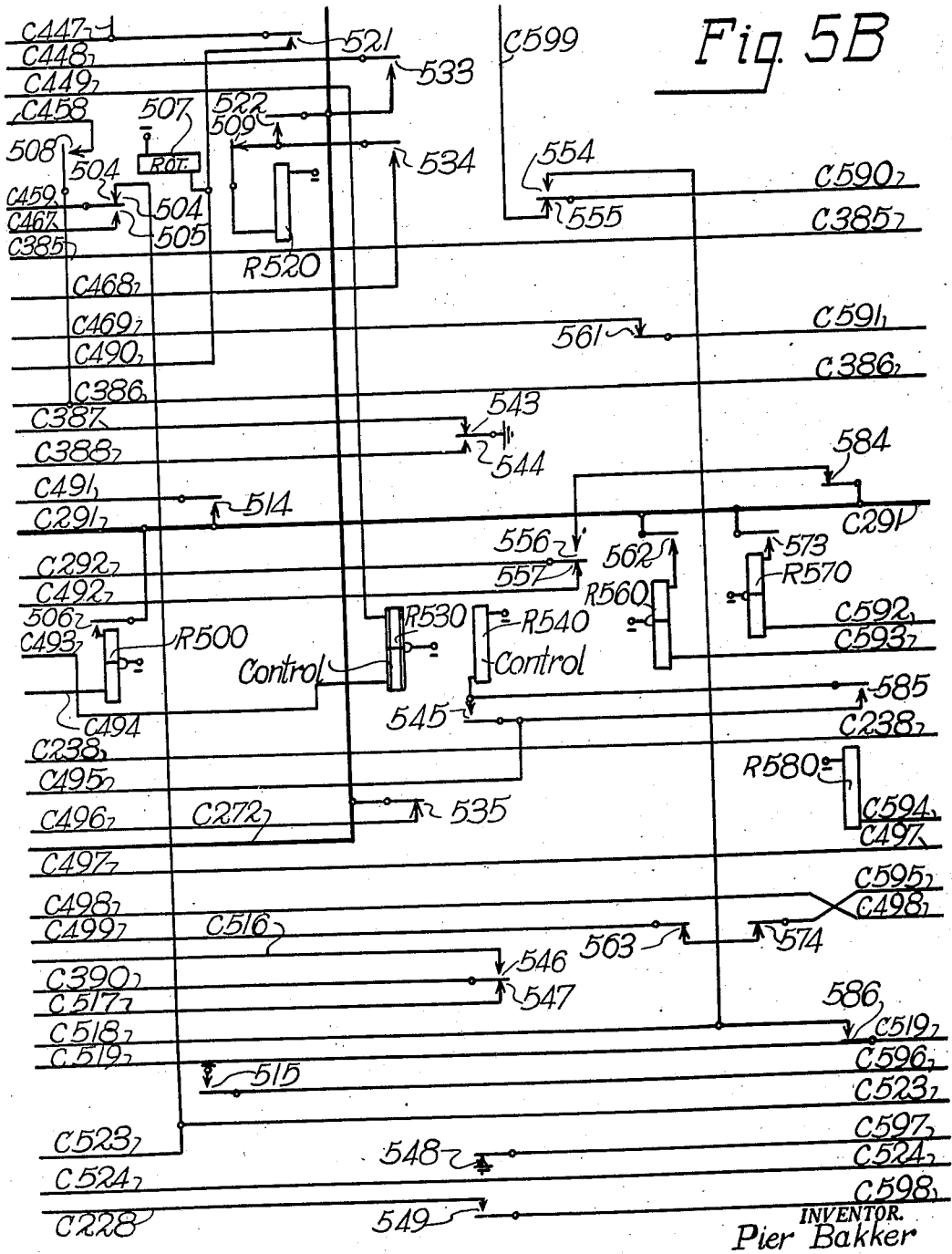

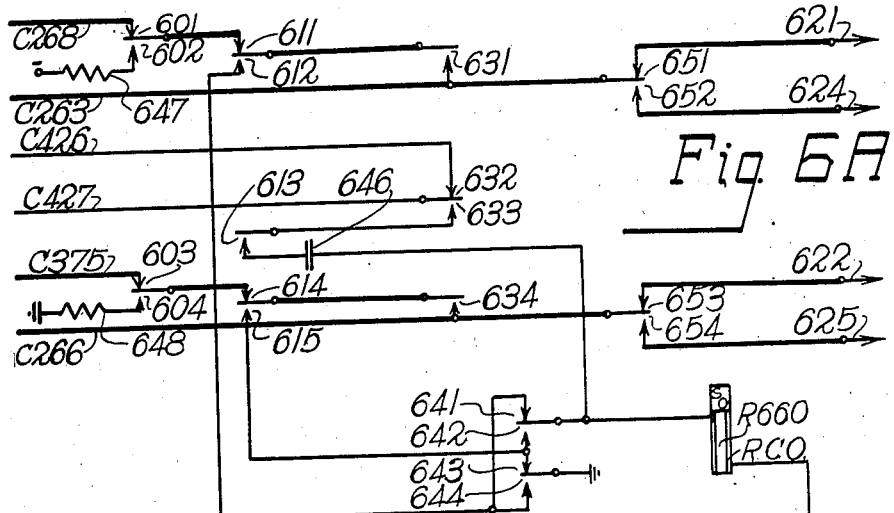
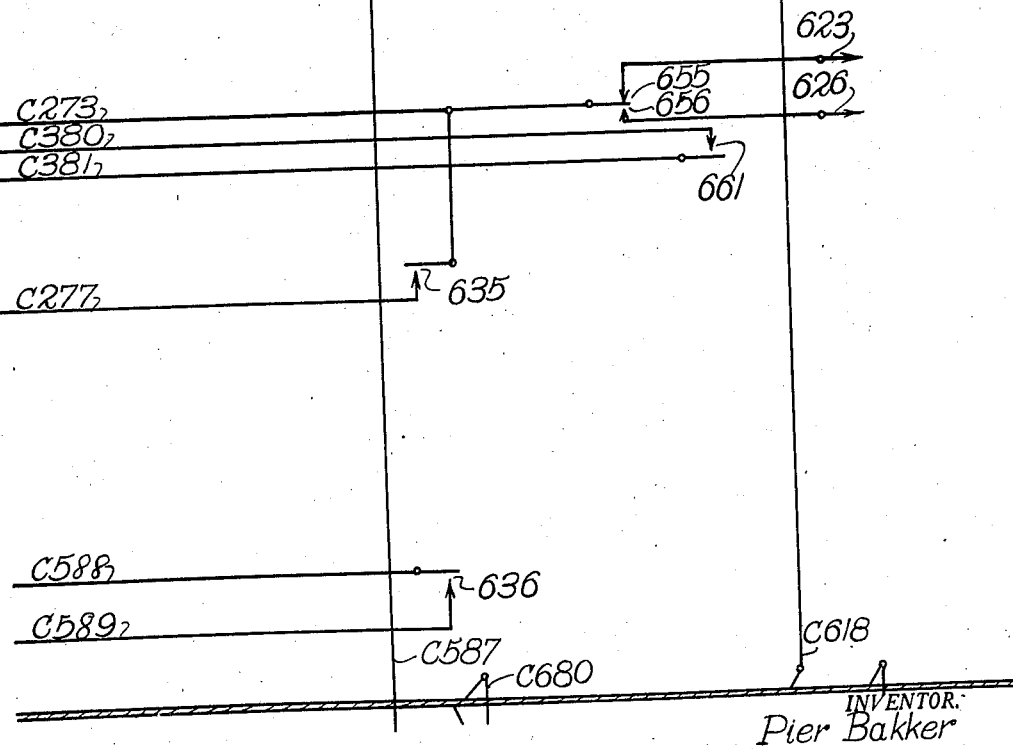

Fig. 6B

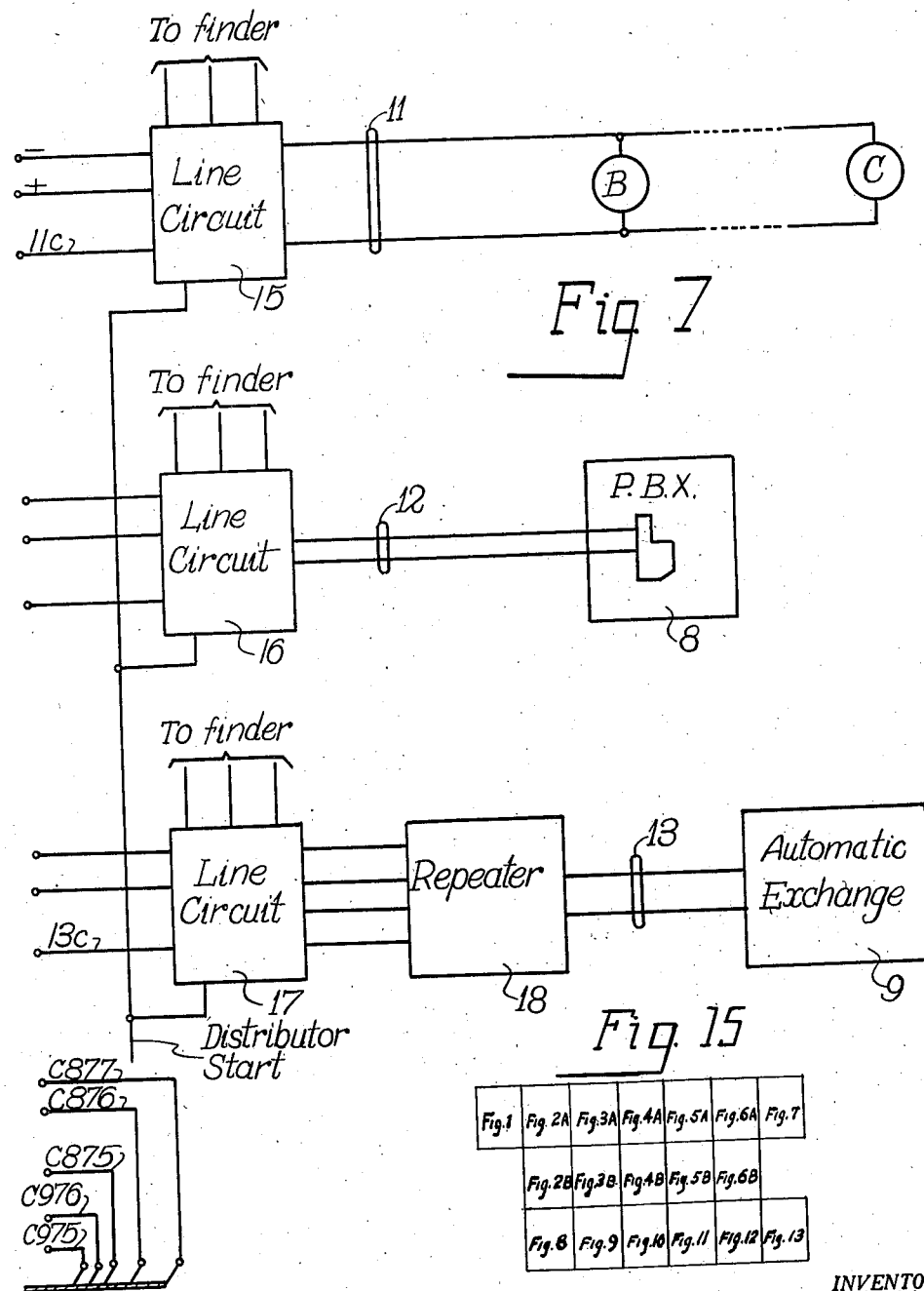

Dec. 21, 1943.    P. BAKKER    2,337,365
TELEPHONE SYSTEM
Filed Dec. 15, 1941    19 Sheets-Sheet 14

Fig. 9

INVENTOR.
Pier Bakker
BY Davis, Lindsey, Smith & Shonts
Attorneys

Dec. 21, 1943.      P. BAKKER      2,337,365
TELEPHONE SYSTEM
Filed Dec. 15, 1941      19 Sheets-Sheet 15

Dec. 21, 1943.   P. BAKKER   2,337,365
TELEPHONE SYSTEM
Filed Dec. 15, 1941   19 Sheets-Sheet 16

INVENTOR
Pier Bakker
BY
Davis, Lindsey, Smith & Shonts
ATTORNEYS

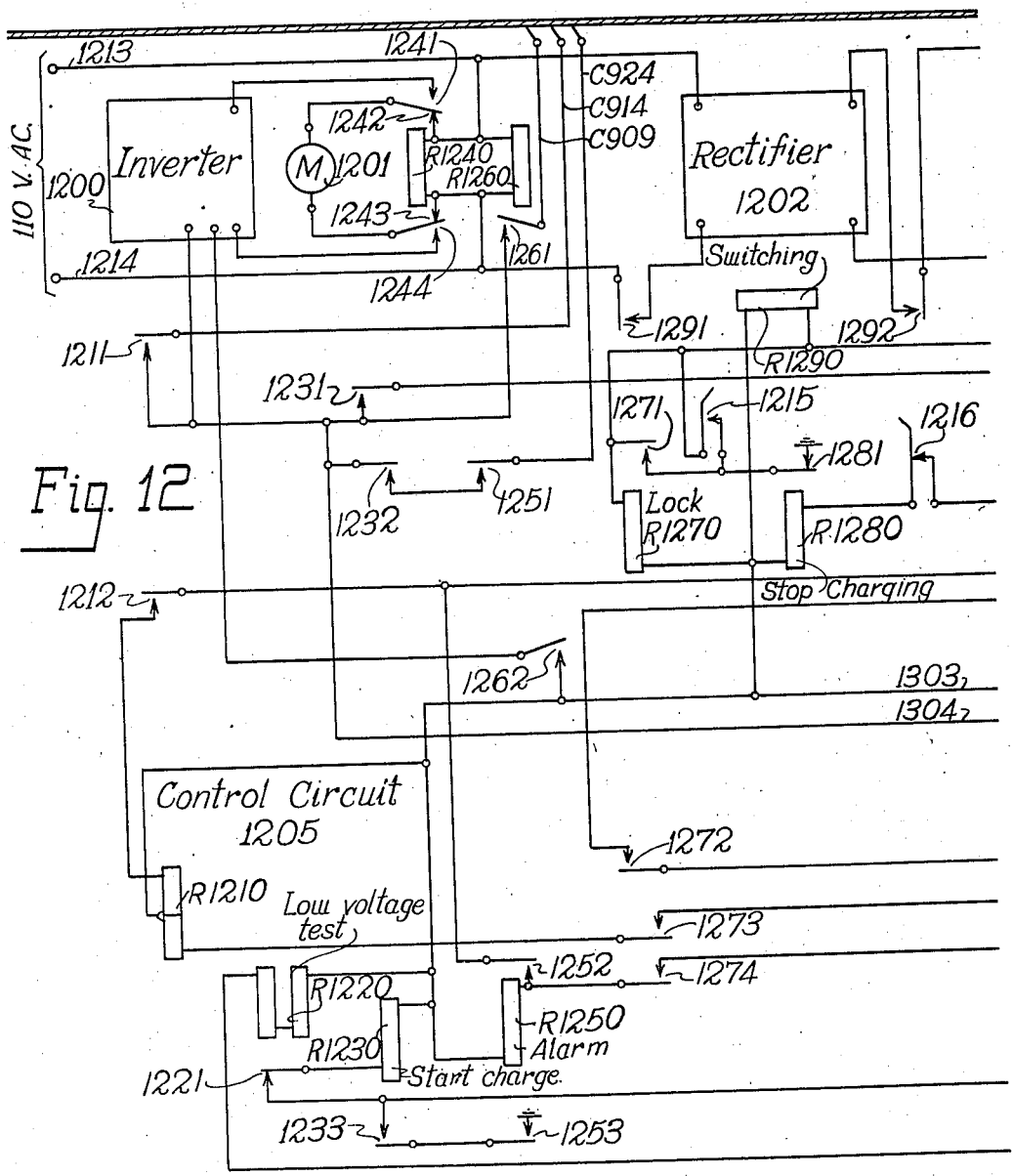

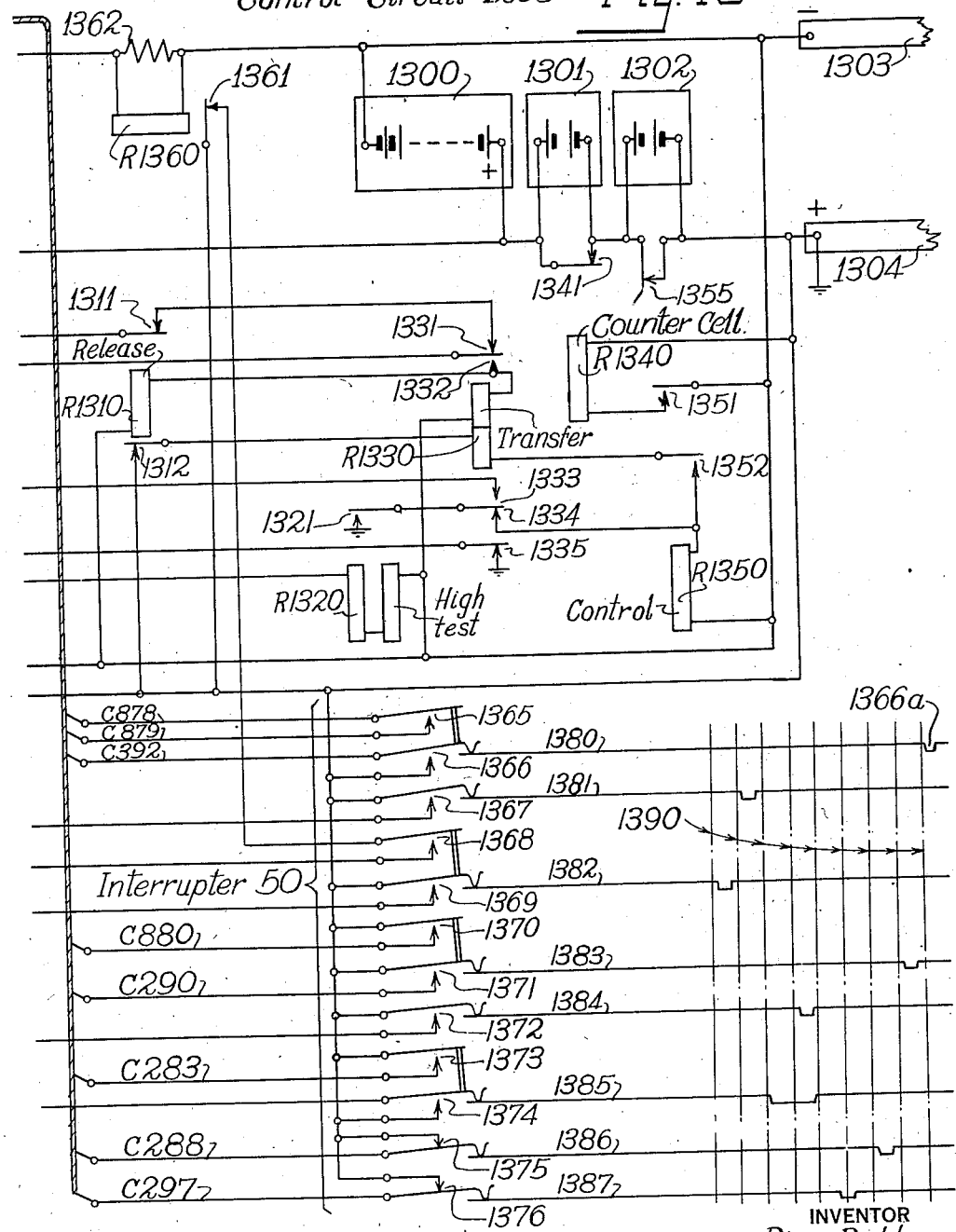

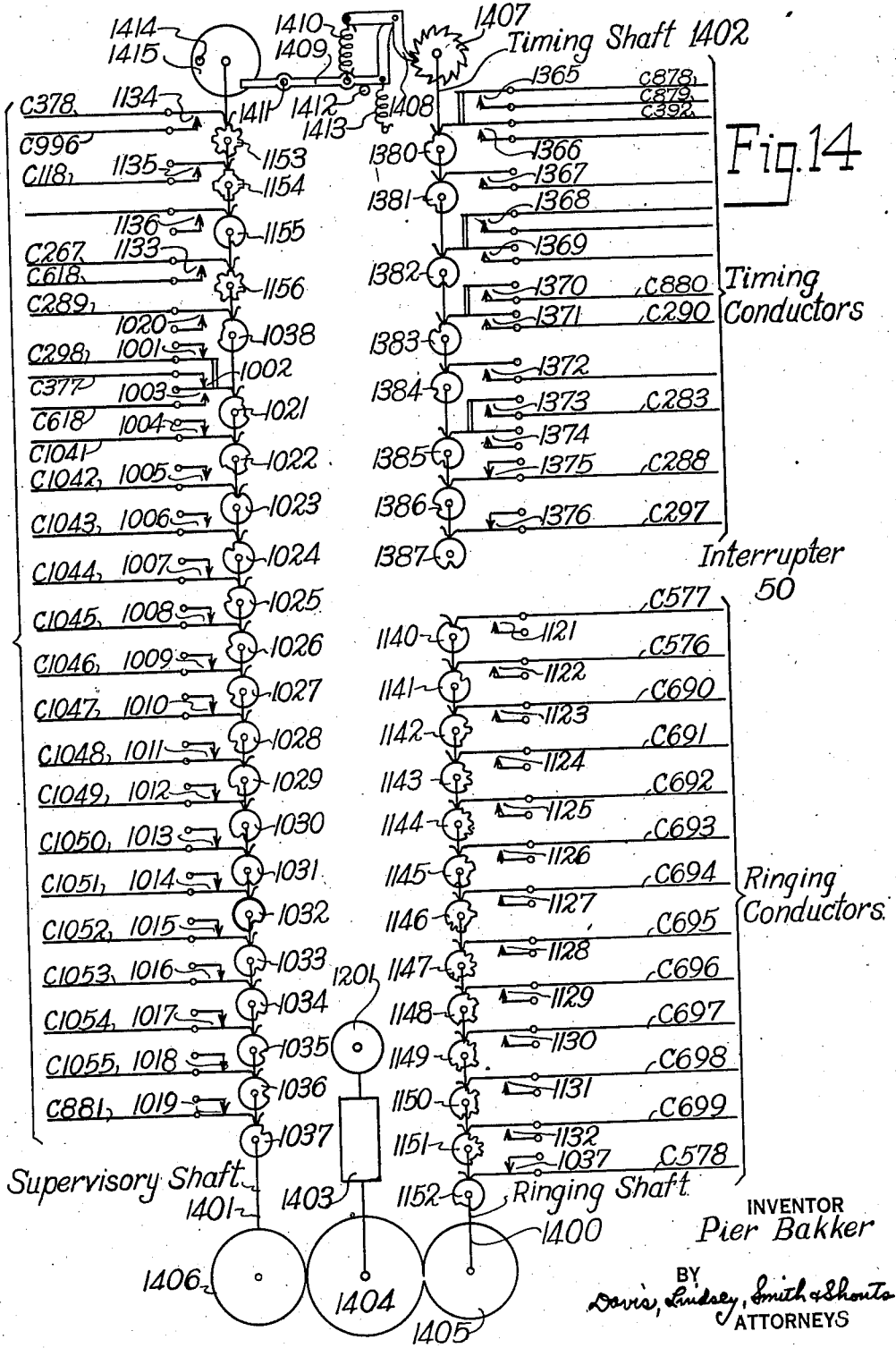

Patented Dec. 21, 1943

2,337,365

UNITED STATES PATENT OFFICE 2,337,365

TELEPHONE SYSTEM

Pier Bakker, Chicago, Ill., assignor to Automatic Electric Laboratories, Inc., a corporation of Delaware Application December 15, 1941, Serial No. 423,063

17 Claims. (Cl. 179—27)

The present invention relates to telephone systems and has for one of its objects the provision of improved apparatus for setting up monitoring connections through automatic switching equipment to busy called lines.

It is another object of the invention to provide in an automatic system of the character described, improved facilities for permitting toll operators to obtain access to busy called lines without permitting the subscribers of the system to have this service.

According to another object of the invention, provisions are made in each connector of the system whereby the monitoring facilities are to a large extent used in the performance of other circuit control operations, thus minimizing the amount of equipment required in each connector.

In accordance with still another object of the invention, each connector of the system is equipped with an impulse counting device which is utilized to control the monitoring facilities therein and also to perform additional circuit control operations that are required in setting up connections to the lines of different types which are accessible to the connector.

The invention, both as to its organization and method of operation, together with further objects and advantages thereof, will best be understood by reference to the specification taken in connection with the accompanying drawings in which Figs. 1, 2A and 2B, 3A and 3B, 4A and 4B, 5A and 5B, 6A and 6B, 7 and 8 to 13, inclusive, when combined in the manner shown in Fig. 15 illustrate an automatic telephone system having embodied therein the features of the invention as briefly outline above, and Fig. 14 illustrates in schematic form the arrangement of the interrupter forming a part of the power supply and supervisory signaling equipment included in the system.

Referring now more particularly to the drawings, the telephone lines, automatic switching apparatus and power supply and supervisory signaling equipment there illustrated may comprise, for example, a small, unattended automatic exchange designed to serve a suburban area of limited population which is geographically adjacent several larger cities or towns, each of which is served by a central exchange. Inter-office trunks are used to provide communication facilities between the small community exchange and the offices provided in the adjacent larger cities. For example, the automatic switching equipment of the community exchange is illustrated as having access to the automatic exchange 9 over a group of trunks which includes the trunk 13. Similarly, groups of trunks are provided which extend between the community exchange and each of the other central offices. The trunk 13 is shown as terminating in the community exchange in a repeater 18 which is accessible to the links of the exchange through a line circuit 17.

The subscriber lines terminating at the community exchange may comprise single party or private lines, full metallic multiparty lines arranged for bridged ringing, full metallic multiparty lines arranged for divided ringing, and ground return lines. The illustrated line 10 is shown as being of the single party type and is arranged to serve only the substation A which may be either a private substation or a paystation. This line terminates in the community exchange in a line circuit 14 which is of the form disclosed and claimed in Patent No. 2,199,534, granted May 7, 1940, Pier Bakker, and includes a mechanically interlocked line relay R100 and cut-off relay R110. The line circuit 14 also includes an outgoing call meter 125 which operates to register calls initiated on the line 10 only, and a total call meter 130 which functions to register all calls involving the line 10 regardless of whether they are outgoing or incoming calls. A second subscriber line 11 is illustrated in Fig. 7 of the drawings as being of the multiparty type arranged to serve the two substations B and C. The lines extending to the line terminals of the links of the community exchange may also include one or more groups of branch exchange trunks. One such trunk 12 is illustrated as terminating in the community exchange in the line circuit 16 and as extending to the switchboard of a private branch exchange 8. The indicated line circuit as well as the line circuits terminating the inter-office trunks and the line circuits terminating the other subscriber lines are each identical with the line circuit 14 described above.

The automatic switching apparatus provided in the exchange for setting up connections between the various lines terminating thereat comprises a plurality of finder-connector links each having a finder capacity of one hundred lines and a connector capacity of two hundred lines. One such link is illustrated in Figs. 1, 2A, 2B, 3A, 3B, 4A, 4B, 5A, 5B, 6A and 6B of the drawings as comprising a finder 19 and a connector 20. The links are divided into two groups which are individual to different groups of lines. More specifically, the links in one group include finders having access to one group of one hundred lines, and the links in the other group include finders which have access to a different group of one hundred lines. The connectors, on the other hand, each have access to the lines in both groups. Each group of lines and links has an allotter or distributor individually associated therewith. For example, a distributor 21 is provided in association with the first group of links. This distributor is preferably of the preselecting type, and is arranged to initiate the operation of the finder portion of a preselected link to search for a calling line in the associated line group each time one of the distributor start leads 121, etc., is connected to ground in the line circuit associated with a calling line in the associated line group. Since the finder 19 and the distributor 21 are identical in arrangement with the corresponding switching elements disclosed and claimed in co-pending application, Serial No. 414,258, filed October 9, 1941, Pier Bakker, these switching units have been only schematically illustrated in the drawings. It is pointed out, however, that the terminals 31 to 43, inclusive, as shown in Figs. 1 and 2A of the drawings, are intended for connection to the correspondingly numbered terminals shown in this co-pending application.

The connector 20 is illustrated in Figs. 2A, 2B, 3A, 3B, 4A, 4B, 5A, 5B, 6A and 6B of the drawings as being of the well-known Strowger type having its contact field divided into ten levels of bank contacts. The four lowermost levels of the contact field are utilized to terminate the different groups of inter-office trunks extending to the community exchange, while the ninth and tenth levels are utilized to terminate the branch exchange trunks. As will be explained more fully hereinafter, these levels may also be entirely or partially utilized for the termination of subscriber lines. The fifth to eighth levels, inclusive, of the contact field in the connector are used for subscriber line termination exclusively.

Referring now in greater detail to the connector 20, the Strowger switching mechanism thereof comprises six wipers 621 to 626, inclusive, and the usual vertical and rotary magnets 417 and 507 which are respectively operative, in conjunction with their associated ratchet and pawl mechanism, not shown, to impart vertical and rotary movement to the enumerated wipers. The mechanism is also equipped with a release magnet 257 which, when energized, permits the wipers 621 to 626, inclusive, to be returned to rotary and vertical normal, and four sets of vertical off-normal springs 224, 225, 259 and 425 which perform various circuit control operations described with particularity hereinafter. The switching mechanism further comprises a PBX arc 628 which is mounted upon the vertically extending frame rods of the mechanism opposite the inner side of the contact bank and is connected to ground. This arc, which is in the form of a metallic plate, is provided with ten sets of horizontally aligned openings which are vertically disposed one above the other at positions which correspond to the ten vertical off-normal positions of the wiper carriage structure. These openings are adapted to receive contact pins 41, 42, 43, 91, 92, 93, etc., which may be removed and inserted at will and are arranged to be traversed by the wiper 627 which is mounted upon the wiper carriage structure and moves with the wipers 621 to 626, inclusive.

Figure 6B:
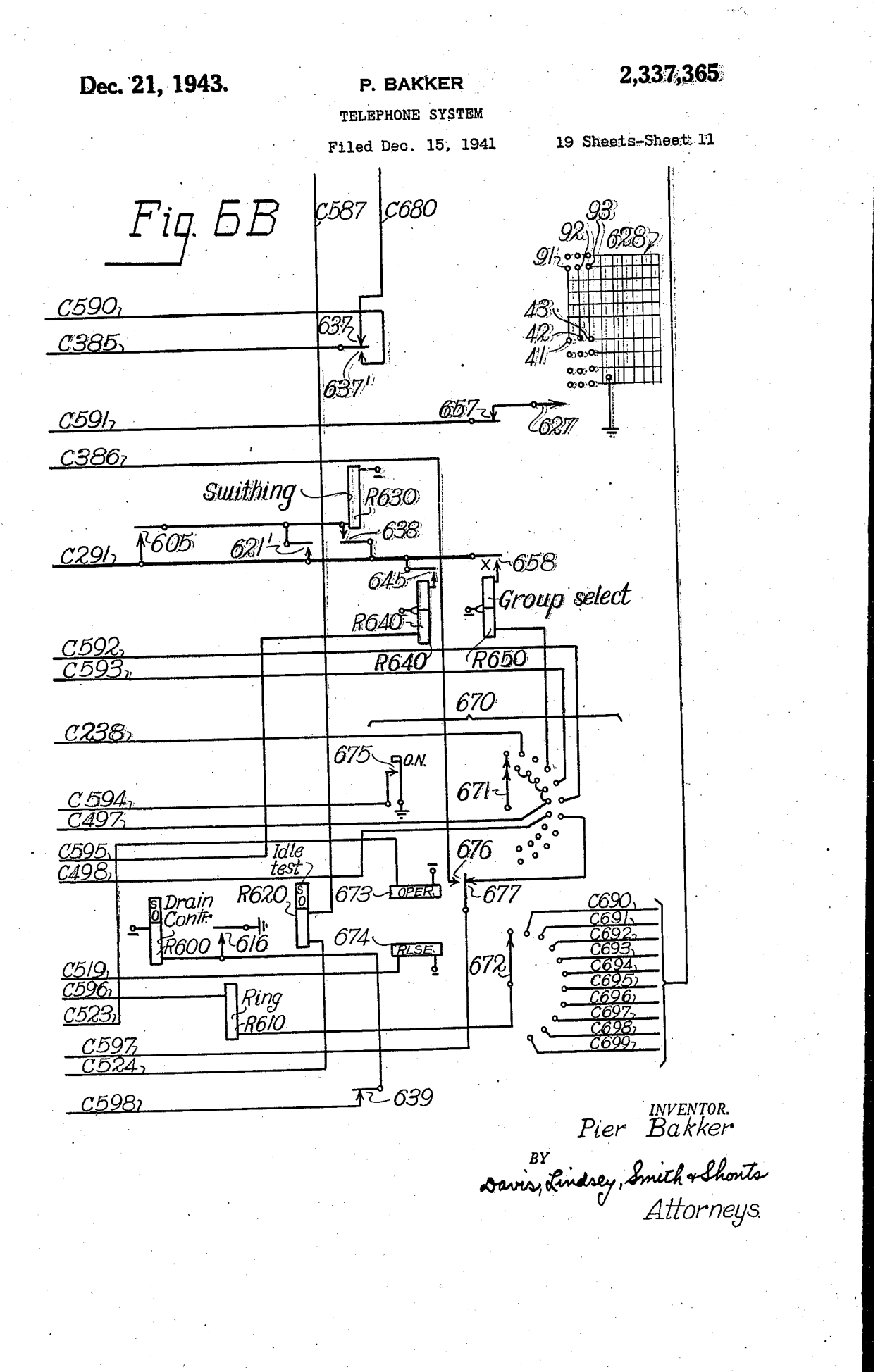

The equipment for controlling the vertical, rotary and release magnets of the switching mechanism embodied in the connector 20 and for performing the auxiliary control operations required incident to the setting up of the various types of connections, includes a pair of line relays R260 and R300 which are arranged to be energized in series over the two link talking conductors C257 and C258, a slow-acting hold relay R370, a hold slave relay R360, a pulsing relay R310, a battery reversing relay R320, a trunk call identification relay R330, a back-bridge relay R340, a battery feed coil 350, a switch-through relay R240, a reverting call relay R250, and four timing relays R200, R210, R220 and R230. Additional relays embodied in the connector are shown in Figs. 4A and 4B of the drawings as including a pair of toll monitoring relays R400 and R410, an impulse-controlled relay R420, a busy test relay R440, a trunk call relay R460, and four transfer relays R430, R450, R470 and R480. The relay equipment illustrated in Figs. 5A and 5B of the drawings comprises a first digit pulse transfer relay R500, a ring pickup relay R510, a trunk hunting relay R520, a slow-acting control relay R530, a control relay R540, a stop ringing relay R550, a pair of ringing control relays R560 and R570, and a control relay R580. Additional relays embodied in the connector 20 are illustrated in Figs. 6A and 6B of the drawings as including a slow-to-operate drain relay R600, a ringing relay R610, a slow-to-operate idle test relay R620, a line switching relay R630, a ring transfer relay R640, a group selecting relay R650, and a slow-acting ring cut-off relay R660.

The control equipment of the connector 20 also includes a minor switch 670 which functions to perform a variety of circuit control operations, all of which are described with particularity hereinafter. This switch, which is of the front-stepping type, is provided with an eleven point contact field having three sets of contacts, the first two of which are arranged to be traversed by the wiper 671 and the last of which is arranged to be traversed by the wiper 672. These wipers are operated away from the illustrated normal positions thereof under the control of an operating magnet 673, and are spring-biased to return to normal when the release magnet 674 is energized. The operating mechanism of this switch also includes a set of off-normal springs 675 which is arranged to control the relay R580.

The power supply and supervisory signaling equipment provided in the exchange is illustrated in Figs. 8, 9, 10, 11, 12 and 13 of the drawings. More specifically, the signal generating equipment is illustrated in Fig. 9 of the drawings as including a dial tone generator 990, a busy tone generator 995, and ringing apparatus 901 which includes duplicate sets of ringing current generators and a group of transfer control relays that automatically function to effect a transfer of either ringing current generator for the other in the event a fault occurs in the generator which is in use. The transfer relays of the ringing apparatus are also remotely controllable through any one of the finder-connector links to effect a transfer from either generator to the other in order that a supervisory operator may test the condition of the two generators at will.

For the purpose of providing the various ringing codes and timed ground pulses required for control of the finder-connector links and the battery charging equipment, and the additional purposes of producing interrupted signal voltages and a supervisory signal indicative of the condition of the equipment provided in the exchange, an interrupter 50 is provided. This interrupter is best illustrated in Fig. 14 of the drawings as comprising a ringing shaft 1400, a supervisory shaft 1401 and a timing shaft 1402. The two shafts 1400 and 1401 are arranged to be driven at the same speed, preferably of the order of six revolutions per minute, from a constant speed alternating current motor 1201 through a speed reducing gearbox 1403 and a gear train which comprises a driving gear 1404 and driven gears 1405 and 1406 mounted on the ends of the shafts 1400 and 1401, respectively. The timing shaft 1402 is driven step-by-step at a reduced speed by means of a ratchet and pawl driving connection between this shaft and the supervisory shaft 1401. More specifically, this connection comprises a ratchet wheel 1407 mounted upon the end of the shaft 1402 and having teeth adapted to be engaged by an operating pawl 1408 which is carried on one end of a pivoted arm 1409. The pawl 1408 is biased to engage the teeth of the ratchet wheel 1407 by means of a biasing spring 1410. The armature 1409 is pivotally mounted on a pin 1411 and is biased normally to engage a stop pin 1412 by means of a biasing spring 1413. The operating end of this arm is arranged to be engaged by a pin 1414 carried by a disc 1415 which is mounted upon the supervisory shaft 1401. From the above explanation it will be understood that during each revolution of the shaft 1401, the pin 1414 carried by the disc 1415 engages the end of the arm 1409 to rock this arm in a counterclockwise direction and thus advance the pawl 1408 over one tooth of the ratchet wheel 1407. When the pin 1414 is rotated out of engagement with the end of the arm 1409, this arm is rotated in a clockwise direction under the influence of the spring 1413 until it engages the stop 1412. During such movement of the arm 1409 and the pawl 1408 carried thereby, the ratchet wheel 1407 is moved to advance the shaft 1402 one step.

From an inspection of Figs. 10, 11 13 and 14 of the drawings it will be seen that all of the code forming cams 1142 to 1151, inclusive, the code cycle cut-off cam 1152, and the two pickup pulse cams 1140 and 1141 of the interrupter 50 are mounted upon the ringing shaft 1400. These cams are arranged to control interrupter springs 1123 to 1132, inclusive, 1037, 1121 and 1122, respectively. By virtue of this arrangement, the shaft 1400 may be detached from the interrupter at will for the purpose of changing the code forming cams, without in any way altering the structure of the other parts of the interrupter. Moreover, since the pickup and code cycle cut-off cams are carried by the same shaft as the code forming cams, the predetermined timed relationship between the pickup and cut-off pulses and the produced combinations of coded ringing pulses can not be disturbed by improper assembly of the ringing shaft 1400 in the interrupter after a code forming cam has been changed or altered. The timing shaft 1402 carries eight cams, 1380 to 1387, inclusive, which are arranged respectively to control the timing or interrupter springs 1365 to 1376, inclusive. A portion of the stop points, i. e., the relative positions of rest of the timing cams and interrupter springs after different steps thereof, are indicated in Fig. 13 by the vertically extending lines 1390. The remaining cams, i. e., the cams 1021 to 1038, inclusive, and 1153 to 1156, inclusive, are all mounted upon the supervisory shaft 1401 and are arranged respectively to control the interrupter springs 1001 to 1020, inclusive, and 1133 to 1136, inclusive. The functions of the various enumerated interrupter springs are referred to in detail in the following portion of the specification.

Figure 8:
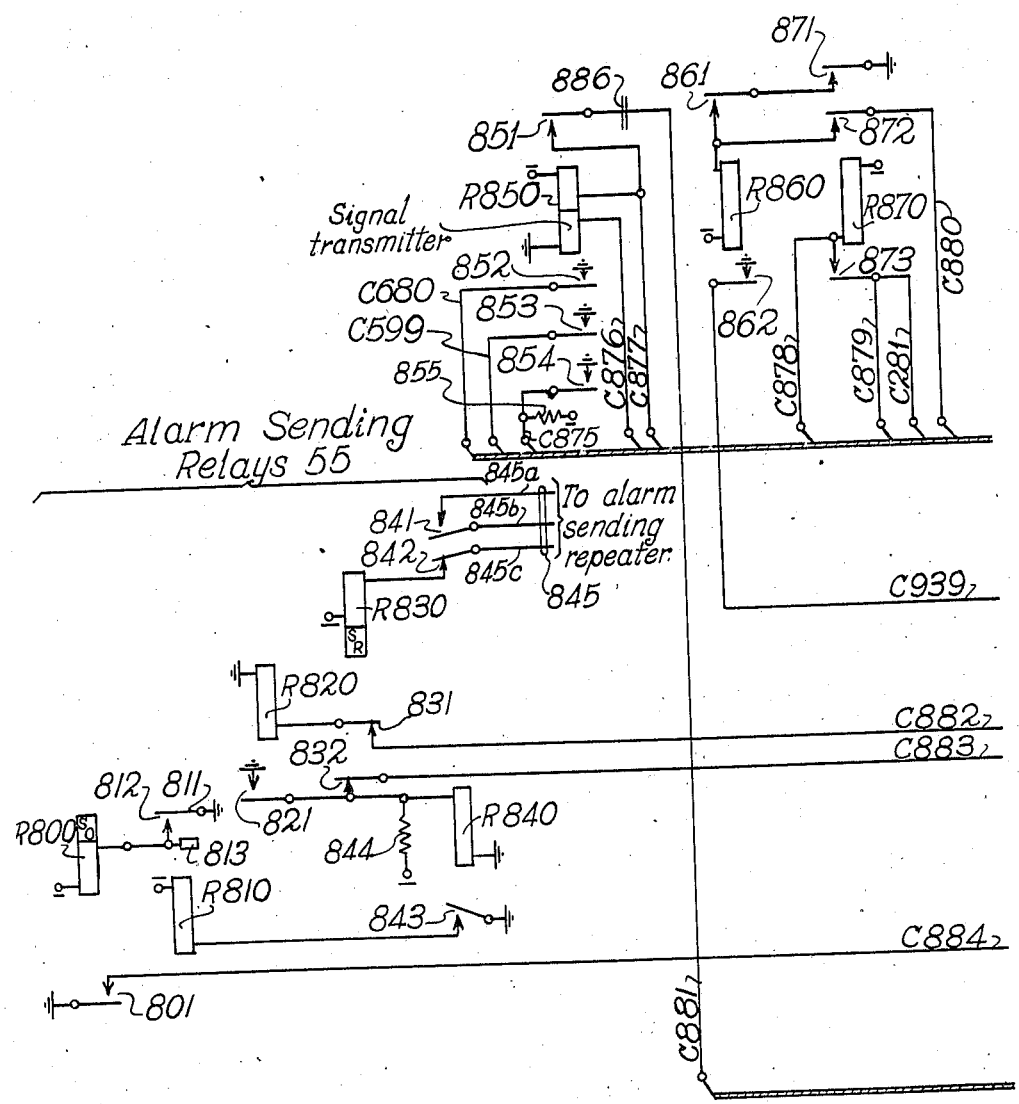

The supervisory signaling and alarm sending equipment provided in the exchange is illustrated in Figs. 8 and 9 of the drawings as comprising a group of alarm sending relays 55, a signal transmitting relay R850 which is accessible to the connectors of the switch links, and a pair of release alarm relays R860 and R870.

The alarm sending relays 55 are arranged to control the repeater associated with an inter-office trunk extending to an operator switchboard in one of the distant manual offices. To this end, the trunk 845, which comprises the positive, negative and test conductors 845a, 845b and 845c, is wired to the incoming terminals of one of the inter-office repeaters provided in the community exchange to terminate one of the trunks extending to the distant central office. This group of relays includes a pair of start relays R820 and R840, a slow-to-operate test relay R830, a timing relay R810, and a slow-to-operate control relay R800.

The supervisory signaling and alarm sending equipment further comprises a group of alarm relays R905, R910, R915, R920, R925, R930, R935, R940, R945, R950, R955 and R960, which are arranged to control the alarm sending relays 55 and the supervisory signaling circuit. The enumerated alarm relays, in combination, function as a register in which the different types of abnormal conditions to which the associated exchange equipment is subject may be registered. More specifically, the three relays R905, R910 and R920 are provided to register different abnormal conditions which may be present in the current supply system illustrated in Figs. 12 and 13 of the drawings; the relay R915 is controlled over the conductor C919 to register the setting of the transfer control relays forming a part of the ringing apparatus 991; the relay R930 is controlled over the conductor C120 to register a permanent calling line condition which may be present in the exchange; the relays R940, R955 and R960 are controlled over the alarm bars 981, 983 and 985, respectively, and in each instance function to register the presence of a defective fuse as indicated by the presence of a predetermined potential upon the associated alarm bar; and the relay R945 is controlled over the lead C949 to indicate the presence of a defective fuse in one of the finder-connector links. In the arrangement illustrated, the relay R925 is not wired, but it will be understood from the following explanation that this relay may be wired to indicate an additional abnormal condition that may occur in the exchange.

The system for supplying direct current to the switchgear of the exchange is generally similar to that disclosed and claimed in Figs. 2 and 3 of co-pending application, Serial No. 378,646, filed February 12, 1941, Clarence E. Lomax, and is illustrated in Figs. 12 and 13 of the drawings as comprising an exchange battery 1300, a constant current rectifier 1202 which is preferably of the thermionic type, and a charge control circuit 1205. The battery 1300 is of the type conventionally used in telephone exchanges and preferably comprises twenty-four series-connected cells having a capacity of 100 amperes or more. The rectifier 1202 is arranged to deliver direct current to the current distributing bus bars 1303 and 1304 of the exchange and also functions to charge the exchange battery 1300. Alternating current is delivered to the input side of the rectifier 1202 from the current supply terminals 1213 and 1214 which terminate opposite sides of a 110 volt alternating current feeder circuit. The storage battery 1300 is normally connected across the system bus conductors 1303 and 1304, from which branch circuits extend to the component control elements of the switchgear provided in the exchange. In accordance with well established telephone engineering practice, the positive bus conductor 1304 is connected to ground. It will be understood that all of the relay and magnet terminals which are shown connected to ground are actually connected to the bus conductor 1304 and that all terminals identified in the drawings by the negative polarity sign are connected to the conductor 1303.

In order to stabilize the exchange voltage during periods when the charging rectifier 1202 is connected to deliver current to the battery 1300 and the exchange load in parallel, a source of counter E. M. F. in the form of a pair of series-connected counter cells 1301 each having a voltage of approximately 2 volts, is provided. Still further to stabilize the system voltage during those periods when the exchange battery 1300 is being subjected to an equalizing charge, two additional series-connected counter cells 1302 are provided which are normally short-circuited through the contacts of a manually operable switch 1355.

The control circuit 1205 is provided for the purpose of automatically rendering the rectifier 1202 active and inactive, and of controlling the inclusion of the counter cells 1301 in the current supply circuit. In brief, this circuit comprises an alarm relay R1210, a low voltage test relay R1220, a start charging relay R1230, a second alarm relay R1250, a locking relay R1270, a stop charging relay R1280, a switching relay R1290, a release relay R1310, a high voltage test relay R1320, a transfer relay R1330, a counter cell switching relay R1340, a control relay R1350, and a current responsive test relay R1360. The control circuit also includes an equalizing charge control key 1215, a control key 1216, and the timing cams 1381, 1382, 1384 and 1385 and interrupter springs 1367, 1368, 1369, 1372 and 1374 of the interrupter 50. The driving motor 1201 of the interrupter is normally energized through the contacts of the switching relay R1240 from the alternating current feeding circuit terminating at the current supply terminals 1213 and 1214. Provisions, including a D.C.-A.C. inverter 1200 of the mechanical vibrating type, are made for delivering alternating current to the motor 1201 in the event of commercial power failure. For the purpose of transmitting a signal to the alarm sending equipment described above, indicative of a failure of the commercial current source, an additional alarm relay R1260 is provided in the control circuit 1205.

OPERATION OF THE CHARGE CONTROL CIRCUIT

In considering the operation of the control circuit 1205, it may first be assumed that the rectifier 1202 is not operating; the battery 1300 is charged to a voltage of approximately 48 volts; the low voltage test relay R1220 operates on any voltage exceeding 46 volts; and the high voltage test relay R1320 operates on any voltage above 52 volts. With the system in this condition, current is supplied through the bus conductors 1303 and 1304 to the exchange load solely from the battery 1300, and the low voltage test relay R1220 is energized and operates at two minute intervals for low voltage test periods of ten seconds each. Thus during each revolution of the cam 1385 the interrupter springs 1374 are closed for ten seconds to bridge the windings of the low voltage test relay R1220 across the bus conductors 1303 and 1304. So long as the system voltage, i. e., the voltage across the conductors 1303 and 1304 exceeds 46 volts, the low voltage test relay R1220 operates each time it is energized. In operating, the relay R1220 opens its contacts 1221 to interrupt the operating circuit for the start charging relay R1230 and thus prevent the latter relay from operating during the last half of each low voltage test period. Immediately the voltage of the storage battery 1300 drops below a value of 46 volts, the low voltage test relay R1220 fails to operate during the next succeeding low voltage test period. During the last half of this test period the interrupter springs 1372 are momentarily engaged under the control of the cam 1384 to complete the prepared operating circuit for the start charging relay R1230. This circuit extends from ground by way of the interrupter springs 1372, the contacts 1221 and the winding of R1230 to the negative bus conductor 1303. When thus energized the relay R1230 closes its contacts 1233 to prepare a locking circuit for itself and closes its contacts 1232 to prepare a path for impressing ground potential upon the low voltage alarm conductor C924. At its contacts 1231, the relay R1230 completes a circuit for energizing the switching relay R1290 and the locking relay R1270 in parallel, this circuit extending from ground by way of the contacts 1231, 1331 and 1311 and the parallel-connected windings of the two relays R1270 and R1290 to the negative bus conductor 1303. When thus energized the relay R1270 operates and locks to ground through the contacts 1271 and 1281. At its contacts 1271, the relay R1270 also completes an obvious locking circuit for the relay R1290. At its contacts 1272, the relay R1270 prepares the high voltage test circuit over which the relay R1320 is periodically bridged across the bus conductors 1303 and 1304 under the control of the interrupter springs 1367. At its contacts 1273, the relay R1270 prepares the operating circuit for the alarm relay R1210. At its contacts 1274, the relay R1270 prepares the operating circuit for the alarm relay R1250.

The switching relay R1290, upon operating, closes its contacts 1291 to connect the input terminals of the rectifier 1202 to the alternating current feeder circuit. At its contacts 1292, the relay R1290 connects the output terminals of the rectifier to the terminals of the storage battery 1300. Thus the charging operation is initiated.

During the revolution of the cams 1380 to 1387, inclusive, which next succeeds the relay operations just described, the interrupter springs 1369 are closed under the control of the cam 1382 to complete the prepared operating circuit for the alarm relay R1250. When thus energized the relay R1250 operates and locks up in a circuit which extends from ground by way of the contacts 1335 and 1252, and the winding of R1250 to the negative bus conductor 1303. At its contacts 1251, the relay R1250 prepares the above-mentioned path for impressing ground potential upon the alarm conductor C924. In this regard it is noted that the start charging relay R1230 is initially energized only for a period of approximately five seconds, and restores following the operation of the two relays R1270 and R1290. At its contacts 1253, the relay R1250 prepares a locking circuit for the start charging relay R1230. Shortly following the operation of the alarm relay R1250 the interrupter springs 1374 are again closed to initiate another low voltage test period. In this regard it may be pointed out that immediately the rectifier 1202 is started the voltage across the conductors 1303 and 1304 should rise to a value exceeding 46 volts. Accordingly, the low voltage test relay R1220 normally operates to open its contacts 1221 and thus interrupt the operating circuit for the start charging relay R1230 during the low voltage test period next succeeding the operation of the alarm relay R1250. If, however, an extremely heavy exchange load is imposed upon the supply system, such that the voltage across the conductors 1303 and 1304 fails to rise to a value exceeding 46 volts during the interval which elapses between the operation of the relay R1250 and the next low voltage test period, the relay R1220 fails to operate at the beginning of this period. Accordingly, the above-traced circuit for the start charging relay R1230 is completed during the last half of the test period. In operating, the relay R1230 closes its contacts 1233 to complete the prepared locking circuit for itself. At its contacts 1231, the relay R1230 again completes the above-traced operating circuit for the two relays R1270 and R1290. At its contacts 1232, the relay R1230 completes the path through the contacts 1251 for impressing ground potential upon the low voltage alarm conductor C924. The resulting response of the alarm sending equipment illustrated in Figs. 8, 9 and 10 of the drawings is described with particularity hereinafter. It will be apparent from the preceding explanation that when the voltage across the bus conductors 1303 and 1304 ultimately rises to a value exceeding 46 volts, the low voltage test relay R1220 operates and opens its contacts 1221 to interrupt the above-traced locking circuit for the start charging relay R1230. When the relay R1230 is thus caused to release it opens its contacts 1232 to disconnect the alarm conductor C924 from ground, and opens its contacts 1233 further to interrupt its own locking circuit. At its contacts 1231, the relay R1230 opens the above-traced operating circuit for the two relays R1270 and R1290, but the latter relays are held operated over their locking circuits as described above.

With the rectifier 1202 in operation, charging current is passed through the battery 1300 so that ultimately the voltage across the terminals of this battery, and hence the voltage across the conductors 1303 and 1304, rises to a value exceeding 52 volts. When this occurs, the high voltage test relay is sufficiently energized over the periodically completed high voltage test circuit to operate. This test circuit may be traced as extending from the grounded conductor 1304 by way of the interrupter springs 1367, the contacts 1272, and the windings of R1320 to the negative conductor 1303. In operating, the relay R1320 closes its contacts 1321 to complete a circuit through the contacts 1334 for energizing the control relay R1350. The relay R1350 now operates and closes its contacts 1352 to complete a path for short-circuiting the lower winding of the transfer relay R1330, this path extending from ground by way of the contacts 1321, 1334 and 1352, the lower winding of R1330, and the contacts 1312 to the grounded conductor 1304. At the end of the high voltage test period in progress, the interrupter springs 1367 are disengaged to cause the deenergization and release of the high voltage test relay R1320. This relay, upon restoring, opens its contacts 1321 to interrupt the above-traced short-circuiting path and thus permit the lower winding of the relay R1330 to be energized in series with the winding of the relay R1350 over a circuit which extends from the positive conductor 1304 by way of the contacts 1312, the lower winding of R1330, the contacts 1352 and the winding of R1350 to the negative conductor 1303. The current traversing this circuit is sufficient to maintain the relay R1350 operated and to cause the operation of the transfer relay R1330. In operating, the relay R1330 opens its contacts 1335 to interrupt the locking circuit for the relay R1250 and thus cause the release of the latter relay. At its contacts 1334, the relay R1330 further interrupts the above-traced operating circuit for the relay R1350 and the path for short-circuiting its own lower winding. At its contacts 1332, the relay R1330 prepares the operating circuit for the release relay R1310. At its contacts 1331, the relay R1330 opens a point in the above-traced operating circuit for the relays R1290 and R1270. At its contacts 1332, the relay R1330 also prepares a circuit for energizing its own upper winding. At its contacts 1333, the relay R1330 prepares the operating circuit for the stop charging relay R1280.

The control relay R1350, upon operating in the manner explained above, also closes its contacts 1351 to complete an obvious circuit for energizing the counter cell switching relay R1340. In operating, the relay R1340 opens its contacts 1341 to interrupt the path short-circuiting the counter cells 1301 and thus includes these cells in the connection between the positive terminal of the battery 1300 and the positive bus conductor 1304. Thus the exchange voltage, i. e., that impressed upon the exchange load and the high and low voltage test circuits, is decreased to a value which is substantially 4 volts less than the voltage across the terminals of the battery 1300. This decrease in the system voltage prevents the high voltage test relay R1320 from operating during the high voltage test periods which immediately follow the relay operations described above. It will be understood, however, that since the system voltage exceeds 48 volts even following the operation of the counter cell switching relay R1340, the low voltage test relay R1220 periodically operates to prevent the operation of the start charging relay R1230 during the last half of each low voltage test period. It will also be understood that the alarm relay R1250 is energized for a short period during each revolution of the cam 1382. The periodic operation of the latter relay is without effect, however.

If, following the operation of the counter cell switching relay R1340 in the manner just explained, the peak traffic period of the exchange starts, such that a sustained heavy load is imposed upon the supply system, the system voltage may drop to a value less than 46 volts. Accordingly, the low voltage test relay R1220 will fail to operate at the beginning of the low voltage test period which first occurs after the drop in the system voltage. As a result the start charging relay R1230 is energized and operates during the last half of this test period. In operating, the relay R1230 closes its contacts 1231 to complete the prepared circuit for energizing the upper winding of the relay R1330 in parallel with the winding of the release relay R1310. This circuit extends from the grounded conductor 1304 by way of the contacts 1231 and 1332 and the parallel-connected windings of the relays R1310 and R1330 to the negative conductor 1303. When thus energized the relay R1310 opens its contacts 1311 further to interrupt the operating circuit for the relays R1270 and R1290. At its contacts 1312, the relay R1310 interrupts the previously traced circuit for energizing the lower winding of R1330 in series with the winding of the relay R1350. When thus deenergized the relay R1350 opens its contacts 1352 further to interrupt the series circuit extending through its own winding and the lower winding of the relay R1330. At its contacts 1351, the relay R1350 opens the operating circuit for the counter cell switching relay R1340. The latter relay now restores and closes its contacts 1341 to short-circuit the counter cells 1301, thus equalizing the system voltage and the voltage of the storage battery 1300. Shortly following the release of the two relays R1350 and R1340 the interrupter springs 1372 are disengaged under the control of the cam 1384 to cause the deenergization and release of the start charging relay R1230. This relay, in restoring, opens its contacts 1231 to interrupt the above-traced circuit for energizing the relay R1310 in parallel with the upper winding of the relay R1330. Thus the two relays R1310 and R1330 are caused to restore. From the above explanation it will be apparent that when a heavy load is imposed upon the current supply system at a time when the counter cells 1301 are included in the connection between the positive bus conductor 1304 and the positive terminal of the exchange battery 1300, these counter cells are short-circuited to increase the system voltage so that it equals the voltage across the battery 1300 and the operation of the rectifier 1202 is not arrested. When the load imposed on the system is subsequently decreased, the system voltage will ultimately rise to a value exceeding 52 volts, whereby the high voltage test relay R1320 is again sufficiently energized to operate. When this occurs the three relays R1350, R1330 and R1340 are caused to operate in the exact manner described above so that the counter cells 1301 are again included in the positive connection between the battery 1300 and the bus conductor 1304.

With the counter cells 1301 included in the positive connection between the battery 1300 and the conductor 1304, and the rectifier 1202 in operation, the system voltage will ultimately again rise to a value exceeding 52 volts. When this occurs the high voltage test relay R1320 operates and closes its contacts 1321 to complete the prepared circuit for energizing the stop charging relay R1280, this circuit extending from ground by way of the contacts 1321 and 1333, the contacts of the key 1216, and the winding of R1280 to the negative conductor 1303. When thus energized the relay R1280 opens its contacts 1281 to interrupt the previously traced locking circuits for the two relays R1270 and R1290, causing both of these relays to restore. At the end of the high voltage test period, the relay R1320 and the stop charging relay R1280 are sequentially deenergized in an obvious manner. The relay R1270, upon restoring, opens its contacts 1271 further to interrupt the locking circuit for itself and the switching relay R1290. At its contacts 1273 and 1274, the relay R1270 opens the prepared operating circuits for the alarm relays R1210 and R1250. At its contacts 1272, the relay R1270 opens the high voltage test circuit to prevent further operation of the relay R1320. The switching relay R1290, in releasing, opens its contacts 1291 and 1292 to interrupt the input and output circuits of the rectifier 1202. Thus the charging operation is arrested.

It will be noted that the charging circuit is opened without releasing the three relays R1330, R1340 and R1350 to exclude the counter cells 1301 from the connection between the storage battery 1300 and the positive bus conductor 1304. The purpose of this arrangement is to prevent a relatively high system voltage at the end of each charging operation. Thus it will be apparent from the above explanation that at the end of the charging operation the voltage of the battery 1300 is slightly in excess of 56 volts, which is substantially above the normal system voltage. If an appreciable load current is delivered to the switch gear of the exchange from the storage battery 1300 after the charging circuit is opened, the voltage of the battery 1300 quickly drops to its normal value, which ranges from 48 to 50 volts. This, of course, means that during a low voltage test period occurring shortly after the charging circuit is opened, the low voltage test relay R1220 will fail to operate. Accordingly, the start charging relay R1230 is energized and operates during the last half of the test period. In operating, the relay R1230 completes the previously traced circuit for energizing the relay R1310 in parallel with the upper winding of the transfer relay R1330, whereby the two relays R1350 and R1340 are caused sequentially to restore in the manner previously explained. At the end of the low voltage test period the three relays R1230, R1310 and R1330 are also caused to restore in the manner described above. Following the release of these relays the control circuit is fully restored to normal.

In order to subject the battery 1300 to an equalizing charge, the equalizing charge control key 1216 is operated to open the operating circuit for the stop charging relay R1280, and the key 1215 is operated to complete an obvious alternative circuit for energizing the relays R1270 and R1290 in parallel. When thus energized the two indicated relays both operate, assuming that they are not already in their operated positions. In operating, the switching relay R1290 closes the input and output circuits of the rectifier 1202 to complete the charging circuit. The locking relay R1270, in operating, performs the functions described above. Concurrently with the operation of the two keys 1215 and 1216 to initiate the equalizing charge, the switch 1355 is operated to open the path normally short-circuiting the counter cells 1302, so that these cells are serially included in the positive connection between the battery 1300 and the bus conductor 1304. The system voltage is accordingly dropped to a value substantially 4 volts less than the voltage across the terminals of the battery 1300. Following the operation of the two keys 1215 and 1216 and the switch 1355, the high and low voltage test relays and the counter cell switching relays are free to operate in the exact manner described above, the only difference being that with the key 1216 operated the stop charging relay R1280 can not be energized in response to the operation of the high voltage test relay R1320. It will be understood, however, that when the keys 1215 and 1216 are manually restored to normal, the stop charging relay R1280 is immediately rendered operative under the control of the high voltage test relay R1320, to cause the deenergization and release of the two relays R1270 and R1290, whereby the operation of the rectifier 1202 is arrested. Preferably, the switch 1355 is held open for a short period after the keys 1215 and 1216 have been released to cause the interruption of the charging circuit. If this procedure is followed the system voltage, i. e., that across the bus conductors 1303 and 1304, is prevented from rising to an unduly high value due to the highly charged condition of the battery 1300. In this regard it will be understood that after the battery 1300 has been subjected to the exchange load for a short time interval, the voltage thereof is reduced to normal so that the switch 1355 may be closed to short-circuit the counter cells 1302 without causing an objectionable rise in the voltage across the bus conductors 1303 and 1304.

Figure 10:
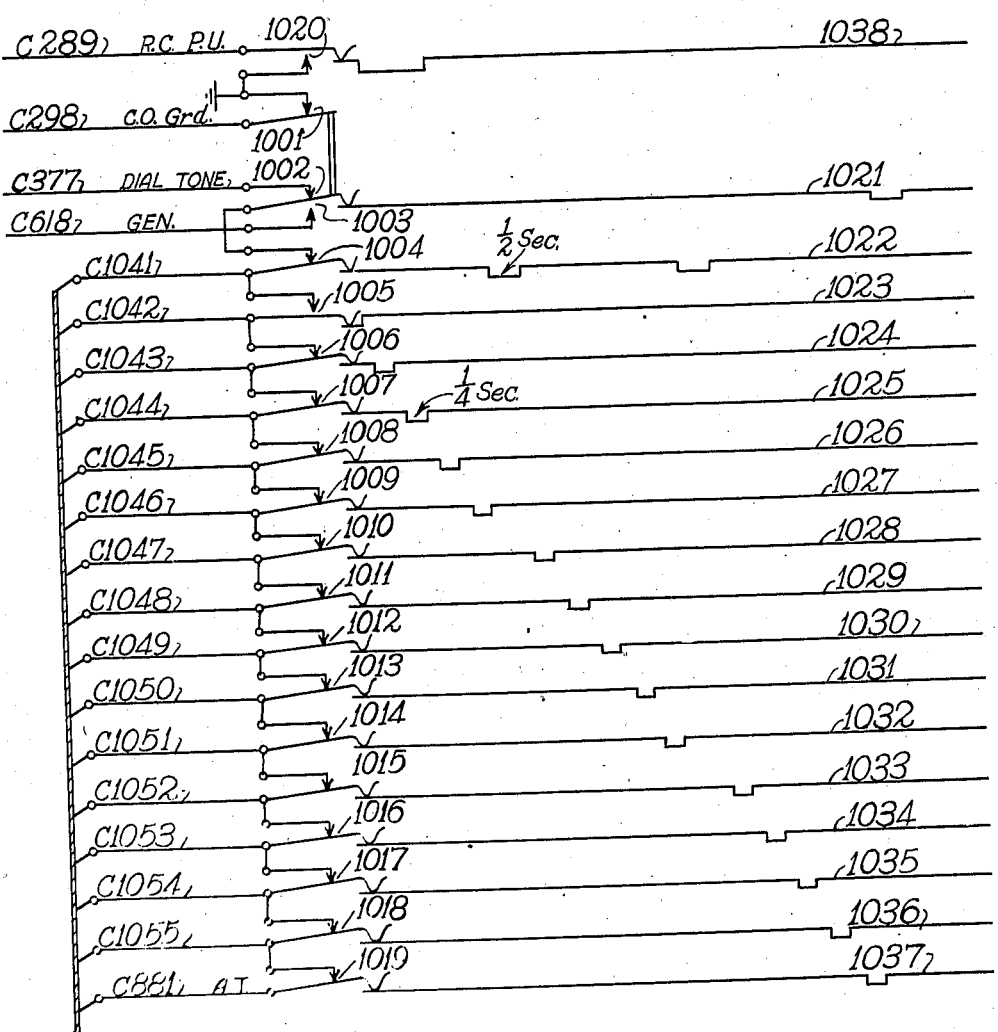

The current responsive relay R1360, operating in conjunction with the alarm relay R1210, functions to control the alarm sending equipment shown in Figs. 8, 9 and 10 of the drawings in a manner such that an alarm is transmitted to an operator position in the distant central office if for any reason the rectifier 1202 fails to operate. Thus it will be understood from the preceding explanation that during normal operation of the rectifier to deliver current to the storage battery 1300 and the exchange load in parallel, the relay R1360 is energized and remains in its operated position. With this relay operated the operating circuit for the alarm relay R1210 is held open at the contacts 1361. On the other hand, when the rectifier 1202 is not in operation, the operating circuit for the alarm relay R1210 is held open at the contacts 1273 of the restored locking relay R1270. If, however, the two relays R1270 and R1290 are operated so that the rectifier 1202 is connected to deliver current to the storage battery 1300 and the exchange load, and no current traverses the connection between the output terminals of the rectifier and the terminals of the storage battery, the relay R1360 remains in its restored position or releases, as the case may be, further to prepare the operating circuit for the alarm relay R1210. If this condition prevails for a sustained time interval the operating circuit for the alarm relay is completed. More specifically, this circuit is closed at the interrupter springs 1368 under the control of the cam 1382, and may be traced as extending from the grounded conductor 1304 by way of the contacts 1361, the interrupter springs 1368, the contacts 1273 and the lower winding of R1210 to the negative conductor 1303. In operating, the relay R1210 prepares or completes a locking circuit for itself, depending upon the position of the transfer relay R1330. This circuit extends from ground by way of the contacts 1335 and 1212, and the upper winding of R1210 to the negative conductor 1303. It will be apparent, therefore, that if the relay R1330 is operated the circuit just traced is only prepared, whereas if the relay R1330 is restored the circuit is completed. Assuming that the relay R1210 is energized over this locking circuit it remains in its operated position wherein the contacts 1211 are closed to impress ground potential upon the alarm conductor C914. When this conductor is connected to ground, an alarm signal is transmitted to the distant operator position in the manner fully explained hereinafter. If the transfer relay R1330 is operated, the transmission of the alarm signal is delayed until the voltage of the battery 1300 drops to normal to cause the release of the three relays R1330, R1340 and R1350 in the manner explained above. During this period the relay R1210 is periodically energized for short time intervals over its operating circuit as traced above and functions to impress ground pulses upon the alarm conductor C914. These ground pulses are of insufficient duration to cause the transmission of an alarm signal to the distant operator position. It may occur that the fault responsible for the release of the relay R1360 or the failure of this relay to operate will automatically be cleared before the locking circuit for the alarm relay R1210 is completed through the release of the transfer relay R1330. In such case the relay R1360 operates and opens its contacts 1361 to interrupt the operating circuit for the alarm relay R1210 and thus prevent further operation of the latter relay.

As indicated above, so long as alternating voltage is impressed across the current supply terminals 1213 and 1214 the two alternating current relays R1240 and R1260 are held energized. In the event the commercial current source should fail, however, these two relays are deenergized and restore. In releasing, the relay R1240 opens its contacts 1242 and 1243 to disconnect the motor 1201 from the current supply terminals 1213 and 1214, and closes its contacts 1241 and 1244 to connect the motor to the output terminals of the inverter 1200. The relay R1260, upon restoring, closes its contacts 1261 to connect the alarm conductor C909 to ground. At its contacts 1262, the relay R1260 bridges the input terminals of the inverter 1200 across the bus conductors 1303 and 1304, whereby operation of the inverter is initiated. This inverter operates in a well-known manner to convert the direct current derived from the storage battery 1300 into alternating current of the correct voltage and frequency to energize the motor 1201. Thus the operation of this motor is sustained to maintain the interrupter in operation during the period of commercial power failure. When the alarm conductor C909 is connected to ground, the alarm sending equipment illustrated in Figs. 8, 9 and 10 of the drawings operates to transmit an alarm signal to the distant operator position, in the manner pointed out below. Obviously, when alternating current is again delivered to the current supply terminals 1213 and 1214 the two relays R1240 and R1260 reoperate. The relay R1240, upon operating, disconnects the motor 1201 from the output terminals of the inverter 1200 and reconnects the motor to the current supply terminals 1213 and 1214. The relay R1260, upon operating, opens its contacts 1261 to disconnect the alarm conductor C909 from ground, and opens its contacts 1262 to interrupt the input circuit to the inverter 1200.

DIRECTORY NUMBERING ARRANGEMENT

The manner in which the lines of different types are terminated in the banks of the finders and connectors is such that the following directory numbering scheme is utilized, it being arbitrarily assumed that each trunk group includes four trunks:

Single digit "7"—inter-office trunks in the first contact level and the first line group.
Single digit "8"—inter-office trunks in the second contact level and the first line group.
Single digit "9"—inter-office trunks in the third contact level and the first line group.
Single digit "0"—inter-office trunks in the fourth contact level and the first line group.
291X—private branch exchange trunks with automatic trunk hunting.
201X—private branch exchange trunks with automatic trunk hunting.
205X—200X—subscriber lines in the first line group.
295X—290X—subscriber lines in the first line group.
215X—210X—subscriber lines in the first line group.
225X—220X—subscriber lines in the first line group.
235X—230X—subscriber lines in the first line group.
245X—240X—subscriber lines in the first line group.
251X—280X—subscriber lines in the first line group.
310X—300X—subscriber lines in the second line group.

It is noted that the subscriber lines in the first group of one hundred lines include all multi-party lines serving more than twenty substations. These lines may, if desired, also be designated by the directory numbers having a first digit of "4" or "5," in order to effect partial selection of the desired ringing code. A first digit of "4" or "5" when included in a private branch exchange number, such, for example, as the number "491," is used in providing night service to the private branch exchange to which the designated trunks extend. The subscriber lines forming the second group of one hundred lines may be of the multiparty type, although each line may not serve more than ten substations. It is further pointed out that the first digit "1" is reserved as a prefix digit which, when dialed at an operator position in a distant exchange, results in the setting up of a toll monitoring connection to a busy called line. If a first digit "1" is dialed at a subscriber substation, the call will necessarily fail.

LOCAL CALLS

Referring now more particularly to the operation of the illustrated finder-connector link to set up a connection between two lines terminating in the bank contacts thereof, a call originating at the substation A and intended for the substation B may be considered by way of example. When the handset provided at the calling substation A is removed from its supporting hook or cradle, a loop circuit is completed by way of the line 10 and the contacts 111 and 113 to cause the energization and operation of the line relay R100. In operating, this relay closes its contacts 101 to impress ground potential upon the private conductor 10c of the line 10, whereby this line is marked as busy in the bank contacts of the various connector switches. At its contacts 102, the relay R100 opens a point in one of the operating circuits for the cut-off relay R110. At its contacts 103, the relay R100 completes an obvious path for impressing negative battery potential upon the test conductor 10d, whereby the line 10 is marked as a calling line in the bank contacts of the various finders. At its contacts 106, the relay R100 opens a point in the path over which ground potential may be impressed upon the alarm conductor C120. At its contacts 104 and 105, the relay R100 completes a path including the contacts 117 for impressing ground potential upon the distributor start lead 121, whereby the vertical position of the calling line 10 as marked in the bank contacts of the finders and operation of the distributor 21 to control the searching operation of the finder 19 is initiated.

The manner in which the distributor 21 functions to control the finder 19 in its operation to seize the calling line 10 is explained in detail in the above-referred to co-pending application of Pier Bakker, Serial No. 414,258, wherein the details of this equipment are disclosed. In brief, the relay equipment of the distributor 21 responds to the application of ground potential to the start lead 121 by first operating to transmit a series of pulses to the vertical magnet of the finder 19, whereby the wipers of this finder are elevated to a position opposite the marked level of bank contacts wherein the conductors individual to the line 10 are terminated. When this level is found a transfer operation is effected, whereby stepping pulses are transmitted from the relays of the distributor 21 to the rotary magnet of the finder 19 to effect rotation of the finder wipers into engagement with the contacts at which the conductors of the line 10 are terminated. When the line 10 is thus seized, the calling loop circuit is switched through to the connector 20, the link is marked as busy in the test switch of the distributor 21, and operation of the distributor to select another idle link is initiated. Incident to the switch-through operation of the finder, the positive and negative conductors of the line 10 are connected to the conductors C258 and C257, respectively, the test lead 10d individual to the line 10 is connected to the conductor C270, and a circuit including the release conductor C272 is completed for maintaining the switch-through relay of the finder 19 energized.

Seizing the connector

Incident to the seizure of the link in the manner just explained, a resistor is bridged across the link line conductors C257 and C258 by the start relay of the finder, whereby the line relays R260 and R300 are energized. This bridge is opened incident to the switch-through operation of the finder to extend the calling loop circuit to the connector.

As extended to the connector through the finder 19, the calling loop circuit includes the conductors C257, C258, C262 and C265, the repeating coil windings 346 and 347, the contacts 241, 243, 251, 252, 322 and 324, and the windings of the two relays R260 and R300 in series. When energized, the relay R260 closes its contacts 261 to prepare the operating circuit for the battery reversing relay R320. In this regard it will be noted that if the calling line 10 is of the ground return type, such that the positive line terminal thereof is connected to ground, the relay R260 will be short-circuited incident to the extension of the call to the connector 20 and, accordingly, will not operate to prepare the operating circuit for the battery reversing relay R320. It will be understood, therefore, that in no case can the control equipment of the connector function to reverse the battery connections to a calling line of the ground return type.

The line relay R300, upon operating, opens its contacts 303 to interrupt an incomplete priming circuit for itself. At its contacts 302, the relay R300 prepares a locking circuit for the slow-acting hold relay R370. At its contacts 301, the relay R300 completes a circuit through the contacts 366 for energizing the pulsing relay R310.

The relay R310, upon operating, locks to ground over a path including the contacts 301, the resistor 304, the contacts 311, C307 and the contacts 543. At its contacts 313, the relay R310 opens a point in the available but incomplete circuits for transmission impulses to the relay R420 and the three magnets 673, 417 and 507. At its contacts 312, the relay R310 completes the operating circuit for the hold relay R370, this circuit extending from ground by way of the contacts 218 and 246, C296, the contacts 312 and the winding of R370 to battery.

The relay R370, upon operating, closes its contacts 371 to prepare the above-mentioned priming circuit for the line relay R300. At its contacts 373, the relay R370 completes a circuit for energizing the trunk identification relay R330 in series with the upper winding of the cut-off relay R110, this circuit extending from ground by way of the winding of R330, the contacts 373, C270, the contacts of the operated switch-through relay in the finder 19, the test wiper of the finder, the conductor 10d, the contacts 103 and the upper winding of R110 to battery. It will be noted that the operating magnet of the outgoing call meter 125 is energized in parallel with the upper winding of the cut-off relay R110 when this circuit is completed. Incident to the operation of this magnet the call is registered by the meter 125. When energized in the above-traced circuit the two relays R110 and R330 both operate. At its contacts 374, the relay R370 completes a circuit including the winding of R330 for energizing the hold slave relay R360. At its contacts 374, the relay R370 also completes a circuit for energizing the transfer relay R480, this circuit extending from ground by way of the winding of R330, the contacts 374, C381, the off-normal springs 425 and the lower winding of R480 to battery.

The trunk identification relay R330, upon operating, closes its contacts 331 to prepare the operating circuit for the timing relay R200. At its contacts 332, the relay R330 opens a point in the operating circuit for the toll monitoring relay R410.

The relay R110, upon operating, first closes its contacts 112 to complete a circuit including the resistor 123 for energizing the lower winding of the line relay R100. After this locking circuit is completed, the relay R110 opens its contacts 111 and 113 to disconnect the windings of the line relay from the line 10. At its preliminary make contacts 116, the relay R110 also completes a circuit including the grounded test conductor 10d for energizing its lower winding in parallel with the operating magnet of the total call meter 130. When this magnet is energized the meter 130 operates to register the call. At its contacts 115 and 116, the relay R110 completes an alternative path, including the grounded conductor 10d, for impressing ground potential upon the private conductor 10c of the line 10. At its contacts 114, the relay R110 interrupts the initially traced path for impressing ground potential upon the private conductor 10c. At its contacts 117, the relay R110 disconnects the distributor start lead 121 from ground, thereby to release the distributor 21 for use in handling other calls.

As explained in the previously cited Patent No. 2,199,534, Bakker, incident to the operation of the cut-off relay R110 the mechanical interlock between the armature of this relay and the armature of the line relay R100 functions to release the contact springs 103, 105 and 106. At the contact springs 103, the above-traced circuit for energizing the upper winding of the relay R110 in parallel with the operating magnet of the outgoing call meter 125 is broken. At the contact springs 105 another point is opened in the path over which the distributor start lead 121 was initially connected to ground. At the contact springs 106, a path is prepared for impressing ground potential upon the alarm conductor C120.

The hold slave relay R360, upon operating, closes its contacts 361 to connect the release conductor C272 to ground and thus prepare several operating and locking circuits which are described with particularity hereinafter. When ground potential is impressed upon this conductor a locking circuit is completed for the operated switch-through relay of the finder 19. At its contacts 362, the relay R360 opens a point in the path individual to the illustrated finder-connector link over which the all-links-busy relay of the distributor 21 is controlled. In this regard it is noted that the path just mentioned is initially opened in the finder 19 incident to the operation of this finder to seize the calling line 10. Similar paths individual to the other links are connected in parallel with the path individual to the illustrated link and the all-links-busy relay of the distributor is energized so long as any one of these paths is completed. When, however, all of these paths are opened to indicate that all of the links are busy, the all-links-busy relay of the distributor is released to cause the operation of a signal control relay. The signal control relay in operating connects the tone lead C118 to one electrode of the condenser 107 of the illustrated line circuit 14 and to corresponding condensers provided in the other line circuits which are equipped with all-links-busy signaling paths. The purpose of this arrangement is described more fully hereinafter with reference to incoming inter-office calls.

The hold slave relay R360, upon operating, also opens its contacts 363 to interrupt an incomplete path over which ground potential may be impressed upon the release alarm conductor C281. At its contacts 364, the relay R360 prepares a locking circuit for itself. At its contacts 364', the relay R360 opens a point in the operating circuit for the release magnet 257. At its contacts 365, the relay R360 further prepares the operating circuit for the timing relay R200. At its contacts 365', the relay R360 completes a path including the conductor C365 and the contacts 637 for impressing ground potential upon the tone start conductor C339, thereby to initiate the operation of the dial tone generator 999 and the busy tone generator 995, in a manner well understood in the art. At its contacts 366, the relay R360 opens the initially completed operating circuit for the pulsing relay R310. At its contacts 366', the relay R360 completes an obvious path for impressing ground potential upon the hold conductor C291, thereby to prepare certain operating and locking circuits described with particularity hereinafter. At its contacts 367, the relay R360 completes the above-mentioned locking circuit for the hold relay R370, this circuit extending from ground by way of the contacts 218 and 246, C296, the contacts 302 and 367, and the winding of R370 to battery. At its contacts 368, the relay R360 prepares the common portion of the above-mentioned circuits for transmitting current pulses to the relay R420 and the three magnets 673, 507 and 417. At its contacts 369, the relay R360 opens a point in one branch of the operating circuit for the release magnet 674 of the minor switch 670.

The transfer relay R480, upon operating, closes its contacts 482 to prepare a locking circuit for itself. At its contacts 481, the relay R480 opens a point in the operating circuit for the transfer relay R450. At its contacts 483, the relay R480 prepares a path for impressing ground potential upon the wiper 671 of the minor switch 670. At its contacts 484, the relay R480 opens a point in the operating circuit for the relay R540. At its contacts 485, the relay R480 completes a circuit for energizing the transfer relay R430, this circuit extending by way of the grounded release conductor C272, the contacts 535, C496, the contacts 485 and the lower winding of R430 to battery. At its contacts 486, the relay R480 prepares the operating circuits for the pulse transfer relay R500 and the trunk hunting relay R520. At its contacts 486', the relay R480 opens a point in the operating circuit for the ring transfer relay R640. At its contacts 487, the relay R480 opens a point in one of the operating circuits for the release magnet 674. At its contacts 488, the relay R480 further prepares the circuit for transmitting current pulses to the operating magnet 673 of the minor switch 670. At its contacts 489, the relay R480 opens other incomplete circuits over which current pulses may be transmitted to the rotary magnet 507 and the operating magnet 673.

The transfer relay R430, upon operating, closes its contacts 433 to prepare a circuit for energizing its own upper winding in parallel with the upper winding of the relay R530. At its contacts 434, the relay R430 opens one of the circuits over which impulses may be transmitted to the vertical magnet 417. At its contacts 435, the relay R430 further prepares one of the circuits for transmitting impulses to the operating magnet 673 of the minor switch 670. At its contacts 431, the relay R430 completes a circuit for transmitting the usual dial tone signal over the established loop circuit to the calling substation A. This signaling circuit may partially be traced as extending from the high potential side of the dial tone generator 990 by way of dial tone conductor C377, the contacts 431, 471 and 401, C426, the contacts 632, C427, and the contacts 451 to the negative link line conductor C268. From this point the dial tone signal current is transmitted through the repeating coil 345 and over the calling end of the connection to energize the receiver of the handset provided at the calling substation A. Following the operation of the transfer relay R430, the connector 20 is conditioned to respond to the impulses of the first digit dialed at the calling substation.

*Dialing the first digit*

Assuming that the called line 11 is included in the second group of one hundred lines and, more specifically, that the directory number designating the desired substation B is "3453," the first digit dialed at the calling substation A will necessarily comprise three impulses. During the open circuit period of each impulse the two relays R260 and R300 both restore. These relays obviously reoperate at the end of each open circuit period and remain operated at the end of each digit. The response of the relay R260, if any, is of no effect. The line relay R300, upon restoring at the beginning of the first impulse, opens its contacts 301 to interrupt the locking circuit for the pulsing relay R310. At its contacts 302, the relay R300 opens the above-traced locking circuit for the hold relay R370. At its contacts 303, the relay R300 closes the above-mentioned priming circuit for itself, this circuit extending from ground by way of the contacts 218 and 246, C296, the contacts 303, the resistor 305, the contacts 371 and the winding of R300 to battery. The current traversing this circuit is insufficient to cause the reoperation of the relay R300, but serves to render this relay exceedingly fast to operate when the loop circuit is subsequently recompleted at the calling substation.

The relay R310, upon restoring in response to the release of the line relay R300, opens its contacts 311 further to interrupt its own locking circuit, and opens its contacts 312 to interrupt the operating circuit for the hold relay R370. At its contacts 313, the relay R310 completes the prepared operating circuit for the magnet 673, this circuit extending from ground by way of the contacts 218 and 246, C296, the contacts 313 and 368, C390, the contacts 547, C517, the contacts 488 and 435, C459, the contacts 504, C523, and the winding of the magnet 673 to battery. A parallel branch of this circuit extends from the conductor C517 through the lower winding of the pulse-controlled relay R420. When thus energized the relay R420 first closes its preliminary make contacts 424, thereby to short-circuit its upper winding and thus render itself slow to release. At its contacts 423, the relay R420 opens a point in the above-mentioned path for impressing ground potential upon the wiper 671 of the minor switch 670. At its contacts 422, the relay R420 completes the above-mentioned circuit for energizing the upper winding of the transfer relay R430 in parallel with the upper winding of the control relay R530, this circuit extending from ground by way of the contacts 366', C291, the contacts 422, and the contacts 433 to the conductor C449 where it divides, one branch extending through the upper winding of the transfer relay R430 to battery and the other branch extending through the upper winding of the relay R530 to battery. At its contacts 421, the relay R420 completes a path for short-circuiting the winding of the relay R260, thereby to exclude this winding from the calling loop circuit. This path may be traced as extending from ground by way of the resistor 419, the contacts 421, C264, and the winding of R260 back to ground.

When its upper winding is energized in the manner just explained, the relay R530 operates and opens its contacts 535 to interrupt the operating circuit for the transfer relay R430. At its contacts 534, the relay R530 prepares the operating circuit for the trunk hunting relay R520. At its contacts 533, the relay R530 prepares one of the operating circuits for the rotary magnet 507. At its contacts 532, the relay R530 opens a point in the operating circuit for the idle test relay R620. At its contacts 531, the relay R530 completes the operating circuit for the transfer relay R470, this circuit extending from the grounded release conductor C272 by way of the contacts 531, C428, the contacts 453, and the upper winding of R470 to battery.

When thus energized, the relay R470 closes its contacts 472 to prepare a locking circuit for itself and the relay R480, and opens its contacts 471 to interrupt the previously traced dial tone signaling circuit. At its contacts 473, the relay R470 prepares one of the several available circuits for energizing the pulsing relay R310. At its contacts 474, the relay R470 opens a point in one of the operating circuits for the rotary magnet 507. At its contacts 475, the relay R470 further prepares the operating circuit for the trunk hunting relay R520. At its contacts 475', the relay R470 opens a point in another circuit over which the trunk hunting relay R520 may be energized. At its contacts 476 the relay R470 completes a locking circuit for the control relay R530, this circuit extending by way of the grounded release conductor C272, the contacts 476, C493 and the lower winding of R530 to battery. At its contacts 476', the relay R470 opens a point in the circuit for energizing the lower winding of the control relay R530 in parallel with the rotary magnet 507. At its contacts 477, the relay R470 opens another point in the operating circuit for the relay R540. At its contacts 477', the relay R470 prepares one of the available operating circuits for the release magnet 674. At its contacts 478, the relay R470 prepares the circuit over which current pulses may be transmitted to the rotary magnet 507 under the control of the pulsing relay R310. At its contacts 479, the relay R470 opens a point in the available alternative circuit over which current pulses may be transmitted to the operating magnet 673 of the minor switch 670.

From the above explanation it will be understood that the relays R420, R530 and R470 are caused to operate when the pulsing relay R310 releases at the beginning of the open circuit period of the first impulse. At the end of this period the line relay R300 reoperates and closes its contacts 301 to reprepare the operating circuit for the pulsing relay R310. At its contacts 303, the relay R300 opens the above-traced priming circuit for itself. At its contacts 302, the relay R300 recompletes the locking circuit for the hold relay R370.

When its winding is energized over the above-traced pulsing circuit the rotary magnet 673 attracts its associated armature and thus causes the two wipers 671 and 672 to be stepped one step from the illustrated normal positions thereof into engagement with their associated first contacts. Incident to the off-normal movement of these wipers the off-normal springs 675 are closed to energize the relay R580 over a circuit including the conductor C594. This relay, in operating, closes its contacts 581 to impress ground potential upon the link guard conductor C273 and thus maintain the busy marking of the illustrated link in the distributor 21. At its contacts 582, the relay R580 opens another point in the previously described all-links-busy path individual to the illustrated link. At its contacts 583, the relay R580 prepares a path for impressing ground potential upon the release alarm conductor C281. At its contacts 584, the relay R580 opens a point in one of the available locking circuits for the timing relay R200. At its contacts 585, the relay R580 prepares the operating circuit for the relay R540. At its contacts 586, the relay R580 prepares the operating circuits for the release magnet 674 of the minor switch 670.

In operating, the magnet 673 also closes its contacts 676 to prepare or complete an alternative operating circuit for the pulsing relay R310, this circuit extending from ground by way of the contacts 548, C597, the contacts 676, C386, the contacts 301 and the winding of R310 to battery. Assuming that the line relay R300 is reoperated before the rotary magnet 673 completes its operation, this circuit is completed at the contacts 676 incident to the operation of the magnet 673. On the other hand, if the magnet 673 completes its operation prior to the reoperation of the line relay R300, this circuit is first prepared at the contacts 676 and is completed at the contacts 301 incident to the reoperation of the relay R300. In reoperating, the relay R310 closes its contacts 311 to recomplete its locking circuit as traced above and opens its contacts 313 to interrupt the above-traced circuit for energizing the magnet 673 in parallel with the lower winding of the pulse-controlled relay R420. At its contacts 312, the relay R310 recompletes the operating circuit for the hold relay R370. Due to the slow-to-release characteristics thereof, the hold relay R370 does not restore during impulsing and the pulse-controlled relay R420 is maintained in its operated position throughout each series of impulses transmitted thereto. During each of the two succeeding impulses of the first digit the two relays R300 and R310 interact with the operating magnet 673 of the minor switch 670 in the exact manner explained above. Thus three current pulses are transmitted to the parallel-connected windings of the magnet 673 and the relay R420. It will be understood, therefore, that the wipers 671 and 672 are operated to engage their respective associated third contacts in response to the dialing of the first digit "3" at the calling substation A.

At the end of the digit and during the interdigit pause separating this digit from the second digit, the two relays R300 and R310 are held operated for a sufficient time interval to permit the release of the pulse-controlled relay R420. In releasing, this relay opens its contacts 424 to interrupt the path short-circuiting its upper winding. Thus the relay R420 is rendered fast to operate. At its contacts 421, the relay R420 opens the path short-circuiting the winding of the relay R260, permitting the latter relay to again be energized in series with the line relay R300 over the calling loop circuit. At its contacts 423, the relay R420 completes the operating circuit for the group select relay R650, this circuit extending by way of the grounded hold conductor C291, the contacts 423, C492, the contacts 483 and 413, C497, the wiper 671 and its engaged third contacts, and the lower winding of R650 to battery. When thus energized the relay R650 first locks to the grounded hold conductor C291 through its preliminary make contacts 658. After this locking circuit is completed, the relay R650 opens its contacts 651, 653 and 655, and closes its contacts 652, 654 and 656, thereby to disconnect the line and control conductors of the link from the wipers 621, 622 and 623 individual to the first group of one hundred lines, and to connect these conductors to the wipers 624, 625 and 626 individual to the lines forming the second one hundred line group. At its contacts 657, the relay R650 opens a point in the circuit over which the trunk hunting relay R520 is energized during a trunk hunting operation.

At its contacts 422, the relay R420, in releasing, opens the above-traced circuit for energizing the respective upper windings of the two relays R430 and R530 in parallel. At this time the relay R430 is full deenergized and restores. In releasing, the relay R430 opens its contacts 431 further to interrupt the above-traced dial tone signaling circuit, and closes its contacts 432 to prepare a locking circuit for the two transfer relays R470 and R480. At its contacts 433, the relay R430 further interrupts the circuit for energizing its upper winding in parallel with the upper winding of the relay R530. At its contacts 435, the relay R430 opens the circuit over which current pulses were transmitted to the operating magnet 673 during the dialing of the first digit. At its contacts 434, the relay R430 prepares a circuit for transmitting current pulses to the vertical magnet 417 during the dialing of the second digit.

Dialing the second digit

When the second digit "4" is dialed at the calling substation A, the two relays R300 and R310 cooperate to transmit four current pulses to the winding of the vertical magnet 417 and the lower winding of the pulse controlled relay R420 in parallel. Thus when the pulsing relay R310 first restores the lower winding of the relay R420 is energized over its operating circuit as traced above. With the transfer relay R430 in its restored position, a branch of this circuit extends from the conductor C517 by way of the contacts 488 and 434 through the winding of the vertical magnet 417 to battery. Upon reoperating at the beginning of the second digit, the relay R420 recloses its contacts 421 to again exclude the winding of the relay R260 from the calling loop circuit, and opens its contacts 423 to disconnect the minor switch wiper 671 from ground. At its contacts 422, the relay R420 completes the above-mentioned locking circuit for the two transfer relays R470 and R480, this circuit extending by way of the grounded hold conductor C291, the contacts 422 and 432 to the contacts 472 where it divides, one branch extending through the lower winding of R470 to battery and the second branch extending through the contacts 482 and the upper winding of R480 to battery.

Each time the vertical magnet 417 is energized in response to the release of the pulsing relay R310, it cooperates with its associated ratchet and pawl mechanism to elevate the wipers 621 to 626, inclusive, one step, and closes its contacts 418 to reprepare or recomplete the operating circuit for the pulsing relay R310, depending upon the position of the line relay R300. This circuit, which now extends from ground by way of the contacts 418, C386, the contacts 391 and the winding of R310 to battery, is obviously completed at the contacts 418 if the line relay R300 reoperates before the magnet 417 completes its operation. On the other hand this circuit is only prepared at the contacts 418 and is recompleted at the contacts 391 in the event the vertical magnet 417 fully operates before the line relay R300 reoperates.

Incident to the first vertical step of the wipers 621 to 626, inclusive, the vertical off-normal springs 425 are disengaged to deenergize the lower winding of the transfer relay R480; the off-normal springs 259 are moved into engagement to prepare the operating circuit for the release magnet 257; the off-normal springs 225 are disengaged to open another point in the previously traced all-links-busy circuit individual to the illustrated link; and the off-normal springs 224 are engaged to complete an obvious multiple path for impressing ground potential upon the link guard conductor C278. It will be understood that since four impulses are transmitted to the line relay R300 during the second digit, the wipers 621 to 626, inclusive, are left standing in a position opposite the fourth level of contacts in the associated contact field at the end of the digit. During the inter-digit pause between the second and third digits the two relays R300 and R310 are held operated for an interval sufficient to cause the release of the pulse-controlled relay R420. This relay, in restoring, opens its contacts 422 to interrupt the above-traced locking circuits for the two transfer relays R470 and R480. When thus fully deenergized the relay R480 restores and closes its contacts 481 to prepare the operating circuit for the transfer relay R450. At its contacts 482, the relay R480 opens another point in its own locking circuit. At its contacts 483, the relay R480 disconnects the minor switch wiper 671 from ground. At its contacts 484, the relay R480 prepares the operating circuit for the relay R540. At its contacts 485, the relay R480 opens another point in the operating circuit for the transfer relay R430. At its contacts 487, the relay R480 completes the prepared operating circuit for the release magnet 674, this circuit extending from ground by way of the contacts 477' and 487, C518, the contacts 586, C519 and the winding of the magnet 674 to battery. When energized in this circuit the magnet 674 attracts its associated holding pawl to permit the wipers 671 and 672 to be returned to their illustrated normal positions. Incident to the release of the minor switch 670, the off-normal springs 675 thereof are disengaged to deenergize the relay R580. This relay, in restoring, closes its contacts 584 to reprepare one of the locking circuits for the timing relay R200. At its contacts 586, the relay R580 opens the above-traced operating circuit for the release magnet 674. At its contacts 585, the relay R580 opens the incomplete operating circuit for the toll monitor relay R540. At its contacts 581, the relay R580 interrupts the path initially completed in the connector 20 for impressing ground potential upon the guard conductor C278. At its contacts 582, the relay R580 reprepares the all-links-busy circuit individual to the illustrated link. At its contacts 583, the relay R580 opens another point in the prepared path for impressing ground potential upon the release alarm conductor C281.

The transfer relay R480, upon restoring, also opens its contacts 488 and closes its contacts 489, whereby the impulsing circuit controlled by the pulsing relay R310 is transferred from the vertical magnet 417 to the rotary magnet 507. Following the operations just described the connector 20 is conditioned to respond to the impulses of the third digit of the directory number designating the desired substation.

Dialing the third digit

During the dialing of the third digit "5" the two relays R300 and R310 cooperate to transmit five current pulses to the lower winding of the pulse-controlled relay R420 and the rotary magnet 507 in parallel. In this case the current pulses are transmitted to the rotary magnet 507 over a circuit which extends from ground by way of the contacts 218 and 246, C296, the contacts 313 and 368, C390, the contacts 547, C517, the contacts 489 and 478, C490 and the winding of the magnet 507 to battery. Upon reoperating at the beginning of the third digit, the relay R420 again closes its contacts 422 to recomplete the previously traced locking circuit for the transfer relay R470. At the contacts 422 a circuit is also completed for energizing the transfer relay R450, this circuit extending by way of the grounded hold conductor C291, the contacts 422, 432, 472 and 481, and the lower winding of R450 to battery. At its contacts 421, the relay R420 completes the previously traced path for short-circuiting the winding of the relay R260.

The transfer relay R450, upon operating, locks to the grounded release conductor C272 over a circuit which includes its upper winding, the contacts 454, C428, and the contacts 531. At its contacts 451, the relay R450 opens another point in the previously traced dial tone signaling circuit. At its contacts 453, the relay R450 opens the previously traced operating circuit for the transfer relay R470. At its contacts 455, the relay R450 opens another point in the operating circuit for the idle test relay R620. At its contacts 456, the relay R450 prepares a test circuit over which the busy test relay R440 may be operated in the event the called line is busy. At its contacts 457, the relay R450 opens a point in the locking circuit for the busy test relay R440.

Each time the rotary magnet 507 is energized over the previously traced circuit, it functions to step the wipers 621 to 626, inclusive, one step in the rotary direction, so that at the conclusion of the third digit these wipers are left standing in engagement with the contacts terminating the conductors of the called line 11. Each time the magnet 507 operates it also closes its contacts 508 to prepare or complete the operating circuit for the pulsing relay R310, in the exact manner previously described with reference to the operation of the vertical magnet 417 and the operating magnet 673 of the minor switch 670. In the present case, however, the rotary magnet 507 prepares or completes a slightly different circuit for energizing the pulsing relay R310, this circuit extending from the grounded release conductor C272 by way of the contacts 523, C448, the contacts 473, C458, the contacts 508, C386, the contacts 301, and the winding of R310 to battery.

Incident to the rotary movement of the wipers 62 to 626, inclusive, over the contacts of the selected fourth level, the busy test relay R440 is operated each time the test wiper 626 encounters a contact terminating the private conductor of a busy line. The resulting operation and release of this relay which occurs during the indicated movement of the enumerated wipers, is without effect.

*Busy test*

In the event the called line 11 is busy at the time it is selected in the manner just explained, the private conductor 11c thereof is marked with ground potential, so that the busy test relay R440 is energized in the above-mentioned test circuit incident to the operation of the wiper 626 into engagement with the contact terminating this conductor. This circuit may now be traced as extending from ground by way of the conductor 11c, the wiper 626, the contacts 656, C273, the contacts 456, and the upper winding of R440 to battery. In operating, the relay R440 closes its contacts 443 to prepare a locking circuit for itself, and closes its contacts 442 to prepare a circuit for energizing the reverting call relay R250. At its contacts 441, the relay R440 prepares a circuit for transmitting busy tone signaling current over the calling end of the connection. At its contacts 444, the relay R440 prepares one of the available circuits for energizing the trunk hunting relay R520. At its contacts 446, the relay R440 opens a point in the operating circuits for the switch-through relay R240 and the idle test relay R620.

Shortly following the operation of the busy test relay R440 to perform the functions just described, the pulse-controlled relay R420 restores and opens its contacts 422 to deenergize the transfer relay R470. The latter relay, upon restoring, opens its contacts 476 to deenergize the slow-acting relay R530. At its contacts 478, the relay R470 opens another point in the above-traced circuit for transmitting current pulses to the rotary magnet 507. At its contacts 479, the relay R470 prepares the previously mentioned alternative circuit for transmitting current pulses to the operating magnet 673 of the minor switch 670 during the dialing of the fourth digit. At its contacts 471, the relay R470 reprepares the above-described dial tone signaling circuit. The relay R530, upon restoring, opens its contacts 531 to deenergize the transfer relay R450, and closes its contacts 532 to prepare the operating circuit for the idle test relay R620. At its contacts 535, the relay R530 reprepares the operating circuit for the transfer relay R430.

The transfer relay R450, upon restoring, closes its contacts 457 to complete the prepared locking circuit for the busy test relay R440, this circuit extending by way of the grounded release conductor C272, the contacts 404, 443 and 457, and the winding of R440 to battery. After this circuit is completed the relay R450 opens its contacts 456 to interrupt the operating circuit for the busy test relay, and closes its contacts 455 to prepare the operating circuit for the idle test relay R620. At its contacts 454, the relay R450 opens another point in its own locking circuit. At its contacts 453, the relay R450 reprepares the operating circuit for the transfer relay R470. At its contacts 451, the relay R450 completes the above-mentioned busy tone signaling circuit. This circuit may partially be traced as extending from the high potential terminal of the busy tone generator 995 by way of the busy tone lead C996, the interrupter springs 1134, C378, the contacts 441 and 401, C426, the contacts 632, C427, and the contacts 451 to the negative link line conductor C268. From this point the interrupted busy tone current is transmitted through the windings of the repeating coil 345 and over the calling end of the connection to energize the receiver of the handset provided at the calling substation A. The resulting busy signal serves to inform the calling party that the desired connection cannot be obtained.

*Idle test*

In the event the called line 11 is idle at the time it is selected in the manner explained above, the private conductor 11c thereof is marked with negative battery potential so that the upper winding of the busy test relay R440 is short-circuited over the test circuit as traced above and does not operate. Shortly thereafter, and when the relays R420, R470, R530 and R450 sequentially restore in the order named and in the manner previously explained, the operating circuit for the idle test relay R620 is completed, this circuit extending from ground by way of the release conductor C272, the contacts 446 and 466, C524, the winding of R620, C587, the contacts 532, C429, the contacts 455, C273, the contacts 656, the wiper 626, the private conductor 11c, and the cut-off winding of the cut-off relay provided in the line circuit 15, to battery. When energized in this circuit the relay R620 operates after a short interval and closes its contacts 621' to complete a circuit including the grounded hold conductor C291 for energizing the switching relay R630.

In operating, the relay R630 first locks to the grounded hold conductor C291 through its contacts 638. At its contacts 631 and 634, the relay R630 prepares a talking connection between the calling and called lines and prepares a circuit for transmitting ringing current over the called line 11. At its contacts 632, the relay R630 opens a point in the common portion of the previously traced dial and busy tone signaling circuits. At its contacts 633, the relay R630 prepares a circuit for transmitting ringing current over the calling end of the connection to produce the usual ringback tone signal during the ringing operation. At its contacts 635, the relay R630 completes a circuit for short-circuiting the winding of the idle test relay R620, this path extending from ground by way of the contacts 254, C271, the contacts 635, C273, the contacts 455, C429, the contacts 532, C587, the winding of R620, C524, the contacts 466 and 446, and the release conductor C272 back to ground. At its contacts 635, the relay R630 also completes a path including the conductor C271, the contacts 254 and 656, and the wiper 626 for impressing ground potential directly upon the private conductor 11c in order to maintain the busy marking of the line 11. It will be noted from a consideration of the line circuit 14 that when ground potential is impressed upon the private conductor 11c, the cutoff relay, the line relay and the total call meter of the line circuit 15 are energized and operate. The cut-off relay, in operating, functions to disconnect the windings of its associated line relay from the talking conductors of the line 11.

In operating, the switching relay R630 also closes its contacts 636 to prepare the operating circuit for the pickup relay R510. At its contacts 637, the relay R630 disconnects the tone start conductor C680 from ground in the connector 20, whereby operation of the two signal generators 990 and 995 is arrested in the event the start conductor 680 is disconnected from ground in all of the other connectors of the exchange. At its contacts 637', the relay R630 prepares an alternative circuit for energizing the release magnet 674 of the minor switch 670. At its contacts 639, the relay R630 opens a point in one of the available circuits for energizing the drain control relay R600. Following the operation of the switching relay R630 to perform the functions just described, the control equipment of the connector 20 is conditioned to respond to the fourth digit of the directory number designating the desired substation B.

*Dialing the fourth digit*

During the dialing of the fourth digit "3" designating the particular ringing code assigned to the substation B, the two relays R300 and R310 cooperate to transmit three current pulses to the lower winding of the pulse-controlled relay R420 and the operating magnet 673 in parallel. In this case the current pulses are transmitted to the magnet 673 over a circuit which extends from ground by way of the contacts 218 and 246, C296, the contacts 313 and 368, C390, the contacts 547, C517, the contacts 489 and 479, C523, and the winding of the magnet 673 to battery. The relay R420, upon operating at the beginning of the digit, recloses its contacts 421 to again short-circuit the winding of the relay R260. Each time the operating magnet 673 is energized over the above-traced circuit it steps the wipers 671 and 672 one step and closes its contacts 676 to prepare or complete the previously traced circuit for energizing the pulsing relay R310. It will be understood, therefore, that at the end of the digit the wipers 671 and 672 are left standing in engagement with their respective associated third contacts. Incident to the off-normal movement of these wipers the off-normal springs 675 are closed to again energize the relay R580. This relay, upon operating, closes its contacts 586 to reprepare the operating circuit for the release magnet 674, and closes its contacts 585 to reprepare the operating circuit for the relay R540. At its contacts 584, the relay R580 opens a point in one of the available locking circuits for the timing relay R200.

Shortly following the end of the fourth digit, the relay R420 restores and opens its contacts 421 to remove the short circuit from the winding of the relay R260. At its contacts 423, the relay R420 completes the operating circuit for the relay R540, this circuit extending by way of the grounded hold conductor C291, the contacts 423, C492, the contacts 484 and 477, C495, the contacts 585 and the winding of R540 to battery. Upon operating, the relay R540 locks to ground over a path including its contacts 545, C495, the contacts 477 and 484, C492, the contacts 423, and the hold conductor C291. At its contacts 547, the relay R540 opens a point in the previously traced circuits for transmitting current pulses to the relay R420 and the three magnets 673, 507, and 417. At its contacts 546, the relay R540 prepares the previously mentioned circuit for energizing the reverting call relay R250. At its contacts 548, the relay R540 opens a point in the operating circuit for the ring transfer relay R640. At its contacts 549, the relay R540 prepares one of the operating circuits for the drain control relay R600. At its contacts 543, the relay R540 opens a point in the initially traced locking circuit for the pulsing relay R310. At its contacts 544, the relay R540 completes an alternative locking circuit for the relay R310, this circuit extending from ground by way of the contacts 544, C388, the resistor 304, the contacts 301, and the winding of R310 to battery. At its contacts 541, the relay R540 prepares the operating circuit for the relay R550. At its contacts 542, the relay R540 prepares the operating circuit for the pickup relay R510.

From the above explanation it will be understood that the pulse-controlled relay R420 is energized and remains operated throughout each digit of each directory number transmitted to the connector 20. This relay is arranged in the manner disclosed and claimed in copending application, Serial No. 374,073, filed January 11, 1941, Clarence E. Lomax, to assist in the quick release of the line relay R300 when the loop circuit extending to the connector 20 over a calling line is broken, and the fast operation of this line relay when the calling loop circuit is recompleted. In this regard it may be pointed out that the three relays R300, R370 and R420 are of the horizontal type and are mounted close together on a suitable base above the Strowger switching mechanism with the line relay R300 disposed between the two relays R370 and R420. Although each relay has a separate heel piece, the magnetic circuits thereof are in such close proximity to each other that a certain amount of leakage flux from the core or magnetic circuit of one relay links the core or magnetic circuit of each adjacent relay. Moreover, since the line relay R300 is in the center, i. e., disposed between the other two relays, it is in a position to influence and to be influenced to the greatest extent by the leakage flux produced by energization of each of the other two relays. This influence is greatly enhanced if the line relay R300 is provided with a brass heel piece in order substantially to increase the leakage flux. The three enumerated relays are mounted with their armature ends facing in the same direction and are wound in a manner such that if the armature end of the line relay R300 is a north magnetic pole, for example, the armature end of the hold relay R370 is also a north pole, and the armature end of the relay R420 is a south pole.

With the three relays R300, R370 and R420 arranged in the manner just described, it will be noted that each time the line relay is energized it causes a circuit to be closed for the hold relay R370. The leakage flux produced by the energization of the hold relay will oppose the flux traversing the core or magnetic circuit of the line relay. Accordingly, when the circuit of the line relay is broken it will be deenergized more quickly than it would in the absence of the leakage flux linking therewith. On the other hand, when the circuit of the line relay R300 is again closed after the first interruption, the energization of the release relay is at a minimum, but the change-over or pulse control relay R420 is fully energized. The polarity of the latter relay is such that the leakage flux produced thereby and linking with the magnetic circuit of the line relay assists in the magnetization of the latter relay. Thus an electromagnetic priming action of the line relay R300 occurs at the end of the open circuit period of each impulse transmitted to the connector 20, whereby the speed of operation of this relay is enhanced. It will be recalled from the preceding explanation that this priming action of the relay R420 as exerted on the line relay R300 is obtained during each of the four digits transmitted to the connector 30 in setting up a connection to a called subscriber line. Accordingly, the advantages achieved by arranging the three relays R300, R370 and R420 in the manner just described are retained throughout each of the four digits transmitted to the connector.

Ringing the called substation

Shortly following the operation of the relay R540 to perform the functions described above, the pickup springs 1122 of the interrupter are closed by the cam 1141 to transmit a ground pulse over the first pickup lead C576, thereby to energize the pickup relay R510. More specifically, the operating circuit for this relay extends from ground by way of the contact springs 1122, C576, the contacts 571, C588, the contacts 636, C589, the contacts 513, 542 and 553, and the winding of R510 to battery. From an examination of the portion of the interrupter shown in Fig. 11 of the drawings, it will be noted that this pickup pulse occurs just prior to the beginning of each of the available ten ringing codes. When energized over the pickup circuit traced above, the relay R510 operates and locks to ground over a path which includes the contacts 553, 542 and 512, the hold conductor C578, and the normally closed interrupter springs 1037. After this locking circuit is completed the relay R510 opens its contacts 513 to interrupt its operating circuit as traced above. At its contacts 514, the relay R510 opens a point in the locking circuit for the relay R400. At its contacts 511, the relay R510 prepares an alternative circuit for transmiting a dial tone signal over a connection set up through the connector 20. At its contacts 515, the relay R510 prepares the operating circuit for the ringing relay R610. In this regard, it will be recalled that the wiper 672 of the minor switch 670 is left standing in engagement with the contact terminating the third code lead C692 at the end of the fourth digit dialed at the calling substation. Accordingly, the ringing relay R610 is controlled in accordance with the ground pulses transmitted over this lead through the interrupter springs 1125. Thus each time the cam follower portion of the upper contact spring 1125 is riding in one of the depressions 1125a, 1125b, 1125c or 1125d, the ringing relay R610 is energized over a circuit which extends from ground by way of the contact springs 1125, C692, the wiper 672, the winding of R610, C596, and the contacts 515 to battery. This circuit is obviously interrupted at the contact springs 1125 each time the cam follower portion of the upper spring is riding on the raised portion of the cam which separates any two of the four depressions. It will be apparent, therefore, that the selected third ringing code comprises four short rings.

Each time the ringing relay R610 operates, it closes its contacts 616 to complete an obvious circuit for energizing the slow-acting drain control relay R600. The latter relay, upon operating, closes its contacts 605 to complete an obvious multiple locking circuit for the switching relay R630. At its contacts 601 and 603, the relay R600 disconnects the line wipers 624 and 625 from the link line conductors C268 and C375. At its contacts 602 and 604, the relay R600 prepares a low resistance path through which the charge accumulated on the line 11 during each ringing interval may be dissipated before the line wipers are again connected to the link line conductors C268 and C375.

Upon operating, the ringing relay R610 also completes a circuit for transmitting ringing current over the called line 11. As will be pointed out more fully, the path traversed by this current depends upon the setting of the ring transfer relay R640 and the character of the called line. In the present case the relay R640 occupies its restored position and it may be assumed that the line 11 is of the full metallic type. Accordingly, the ringing current traverses a circuit which may be traced as extending from the output terminal of the ringing generator in use by way of the ringing current conductor C618, the winding of R660, the contacts 641, 612, 631 and 652, the wiper 624, the negative side of the line 11, the parallel-connected ringers bridged across the conductors of this line, the positive side of the line, the wiper 625, the contacts 654, 634, 615 and 643, and the exchange battery to the opposite terminal of the ringing generator. This circuit is obviously interrupted at the contacts 612 and 615 each time the ringing relay R610 restores at the end of a ringing period. Each time the relay R610 restores it also completes the above-mentioned low resistance path for draining the line 11 of accumulated charges thereon. Thus it will be noted that, with the relay R600 operated and the relay R610 released, the exchange battery is bridged across the conductors of the line 11 in series with the two resistors 647 and 648 over a path which includes the contacts 602, 604, 611, 614, 631, 634, 652 and 654, and the line wipers 624 and 625. Each time the ringing relay R610 restores it also opens its contacts 616 to deenergize the relay R600. Accordingly, the latter relay restores shortly after each ringing interval to again connect the link line conductors C268 and C375 to the line wipers 624 and 625. The purpose of providing the above described arrangement for draining the line 11 of accumulated static charges at the end of each ringing period is to prevent a transient current pulse from causing the premature operation of the back-bridge relay R340 before the call is answered at the called substation.

At the end of each ringing code cycle as determined by the operation of the ringing interrupter, the cam follower portion of the lower contact spring 1037 drops into the depression 1037a to disconnect the hold conductor C578 from ground and thus interrupt the previously traced locking circuit for the ring pickup relay R510. Upon restoring, the relay R510 opens its contacts 512 further to interrupt its locking circuit, and closes its contacts 513 to reprepare its operating circuit. At its contacts 515, the relay R510 opens the previously traced circuit for energizing the ringing relay R610 in accordance with the coded ground pulses transmitted over the code conductor C592. After an appropriate spacing interval as determined by the operation of the interrupter, a ground pulse is again transmitted by the contract springs 1122 over the first pickup lead C576 to cause the reoperation of the pickup relay R510. From this point on the manner in which the ringing equipment continues to operate to transmit the coded ringing current over the called line 11 is exactly the same as described above. It will be understood from this explanation that each ringing code comprises four short ringing periods in the case under consideration. The character of this code indicates to the subscribers at the various substations served by the line 11 that only the subscriber at the substation B is being called.

The manner in which the ringing control equipment functions to transmit ringing current coded in accordance with the coded ground pulses transmitted over any one of the first five code leads C690 to C694, inclusive, over the called line 11 is exactly the same as explained above. In the event one of the sixth to tenth codes is assigned to the desired substation B, a fourth or ringing digit comprising from six to ten impulses will necessarily be dialed at the calling substation during the dialing operation. Accordingly, the wipers 671 and 672 will be operated to one of the sixth to tenth off-normal positions thereof during the dialing of the ringing digit. Incident to the release of the operating magnet 673 at the end of the sixth current pulse transmitted to this magnet, a circuit is completed for energizing the ring transfer relay R640, this circuit extending from ground by way of the contacts 548, C597, the contacts 677, the wiper 671 and the engaged sixth contacts of the associated contact sets C498, the contacts 486', C499, the contacts 563 and 574, C595, and the lower winding of R640 to battery. When energized over this circuit the relay R640 locks to the grounded hold conductor C291 through its preliminary make contacts 645. At its contacts 641 to 644, inclusive, the relay R640 rearranges the ringing current transmission circuit so that ringing current is projected over the positive side of the line and returned over the negative side of the line. More specifically, with the relay R640 occupying its operated position, the circuit traversed by the ringing current during each ringing interval extends from one terminal of the ringing current generator by way of the ringing conductor C618, the winding of R660, the contacts 642, 615, 634 and 654, the wiper 625, the positive conductor of the line 11, the ringers bridged across the conductors of this line, the negative side of the line, the wiper 624, the contacts 652, 631, 612 and 644, and the exchange battery to the opposite terminal of the ringing current generator.

In the event the called line 11 is arranged for divided ringing, as many as five of the ringers associated therewith may be connected between the negative side of the line and ground, and as many as five additional ringers may be connected between the positive side of the line and ground. In such case ringing codes corresponding to the first five off-normal positions of the minor switch 670 are assigned to the substations having ringers connected between the negative side of the line and ground, and the remaining five codes, i. e., those corresponding to the sixth to tenth off-normal positions of the minor switch 670 are assigned to the substations having ringers connected between the positive side of the line and ground. With the substation ringers arranged in this manner, if a substation is called having a ringer thereat which is connected between the negative side of the line and ground, the ring transfer relay R640 occupies its restored position during the ringing operation. In such case the circuit traversed by the ringing current extends from the ringing current conductor by way of the winding of R660, the contacts 641, 612, 631 and 652, the wiper 624, the negative side of the line, the ringers connected between this side of the line and ground, and the exchange battery to the ringing current generator. On the other hand, if a substation having a ringer connected between the positive side of the line and ground is called, the ring transfer relay R640 occupies its operated position during the ringing period. Accordingly, ringing current is, during each ringing interval, transmitted over a circuit which extends from the conductor C618 by way of the winding of R660, the contacts 642, 615, 634 and 654, the wiper 625, the positive side of the line 11, the ringers connected between this side of the line and ground, and the exchange battery to the ringing current generator. In either case the one of the five available ringing codes which is selected determines the character of the signal produced by the energized ringers, thereby selectively to signal the subscribers as to which substation is being called.

Regardless of the circuit utilized for transmitting ringing current through the ringer provided at the called substation, a portion of the ringing current is transmitted over the calling end of the connection during each ringing interval to produce the usual ring-back tone signal at the calling substation. The path traversed by this portion of the ringing current may partially be traced as extending from the ringing current conductor C618 by way of the winding of the ring cut-off relay R660, the condenser 646, the contacts 613 and 633, C427, and the contacts 451 to the negative link line conductor C268. From this point the ringing current is transmitted through the windings of the repeating coil 345 and over the calling end of the connection to energize the receiver of the handset provided at the calling substation A, whereby the usual ring-back tone signal is produced at this substation. Obviously, this circuit is opened at the contacts 613 incident to the release of the ringing relay R610 at the end of each ringing period.

The call is answered

When the call is answered at the called substation B a direct current bridge is established between the conductors of the line 11 to cause the energization and operation of the slow-acting ring cut-off relay R660. The circuit over which this relay is energized depends upon the setting of the ring transfer relay R640. In the event this relay occupies its restored position the ring cut-off relay R660 is energized over a circuit which extends from ground by way of the contacts 643, 615, 634 and 654, the wiper 625, the positive side of the line 11, the direct current bridge across the conductors of this line, the negative side of the line, the wiper 624, the contacts 652, 631, 612 and 641, the winding of R660 and the direct current path through the ringing current generator to the negative terminal of the exchange battery. On the other hand, if the ring transfer relay R640 occupies its operated position at the time the call is answered, the ring cut-off relay R660 is energized in a circuit which extends from ground by way of the contacts 644, 612, 631 and 652, the wiper 624, the negative side of the line 11, the direct current bridge established between the conductors of this line at the substation B, the positive side of the line, the wiper 625, the contacts 654, 634, 615 and 642, the winding of R660 and the direct current path through the ringing current generator to the negative terminal of the exchange battery.

When energized over either of the two circuits traced above, the relay R660 operates after an interval and closes its contact 661 to complete the prepared operating circuit for the stop ringing relay R550, this circuit extending from ground by way of the winding of R330, the contacts 374, C381, the contacts 661, C389, the contacts 541 and the winding of R550 to battery. When energized in this circuit the relay R550 locks to ground over a path including the contacts 541 and 551, C381, the contacts 374 and the winding of R330. At its contacts 553, the relay R550 opens a point in the above-traced operating and locking circuits for the pickup relay R510, causing the latter relay to release, if operated. At its contacts 552, the relay R550 prepares an alternative operating circuit for the pickup relay R510. At its contacts 555, the relay R550 disconnects the ring start conductor C599 from ground, thereby to arrest the operation of the ringing apparatus 901 in the event none of the other connectors of the exchange are in the ringing position. At its contacts 556, the relay R550 prepares an alternative locking circuit for the timing relay R200. At its contacts 557, the relay R550 opens the first prepared locking circuit for the indicated timing relay. At its contacts 554, the relay R550 completes the prepared alternative operating circuit for the release magnet 674, this circuit extending from ground by way of the contacts 365', C385, the contacts 637', C590, the contacts 554 and 586, C519, and the winding of the magnet 674 to battery. When thus energized the magnet 674 attracts its associated holding pawl to permit the release of the wipers 671 and 672. Incident to the return movement of these wipers the off-normal springs 675 are disengaged to deenergize the relay R580. In releasing, the relay R580 opens its contacts 586 to deenergize the release magnet 674, and opens its contacts 585 to interrupt the previously traced operating circuit for the relay R540. At its contacts 584, the relay R580 further prepares the above-mentioned alternative locking circuit for the timing relay R200.

Incident to the release of the relay R510, the contacts 515 are opened to deenergize the ringing relay R610, if operated. In restoring, the ringing relay opens its contacts 616 to deenergize the drain control relay R600, and closes its contacts 611 and 614 to complete the above-described low resistance discharge path. At its contacts 611 and 614, the relay R610 also prepares an answering loop circuit which extends from the called substation B to the repeating coil 345. At its contacts 612 and 615, the relay R610 opens two points in each of the several ringing current circuits traced above. At its contacts 613, the relay R610 opens the above-traced circuit for transmitting ringing current over the calling end of the connection, whereby the ring-back tone signal is terminated. Incident to the release of the ringing relay R610, two points are opened in either of the two traced above circuits for energizing the ring cut-off relay R660. The latter relay, in restoring, opens its contacts 661 to interrupt the previously traced operating circuit for the stop ringing relay R550.

The drain control relay R600 restores shortly following the release of the ringing relay R610, and opens its contacts 602 and 604 to interrupt the low resistance discharge path. At its contacts 601 and 603, the relay R600 completes the answering loop circuit between the called substation B and the repeating coil 345. This circuit may be traced as extending from ground by way of the winding of the line balancing coil 350, the repeating coil winding 349, C375, the contacts 603, 614, 634 and 654, the wiper 625, the positive side of the line 11, the bridge across the conductors of this line at the substation B, the negative side of the line, the wiper 624, the contacts 652, 631, 611 and 601, C268, the repeating coil winding 348 and the winding of R340 to battery.

In operating, the back-bridge relay R340 closes its contacts 341 to complete a multiple holding circuit for the stop ringing relay R550, this circuit extending from ground by way of the winding of R330, the contacts 374 and 341, C380, the contacts 541 and the winding of R550 to battery. At its contacts 343, the relay R340 opens a point in one of the multiple operating circuits for the timing relay R200. At its contacts 344, the relay R340 prepares a locking circuit for the hold relay R370. At its contacts 342, the relay R340 prepares or completes the operating circuit for the battery reversing relay R320. In the present case, wherein the call originated on a subscriber line, the operating circuit for the battery reversing relay R320 is held open at the normal post springs controlled by the Strowger switching mechanism of the finder 19 and through which the two conductors C274 and C275 may be connected together. Accordingly, the relay R320 does not operate and the direction of current flow over the calling line is not reversed incident to the operation of the backbridge relay R340. Following the operation of this relay the desired conversational connection between the calling and called substations is fully completed. In this regard, it will be noted that talking battery is applied to the conductors of the calling line 10 through the windings of the relays R260 and R300 and the windings 346 and 347 of the repeating coil 345. Talking battery is applied to the conductors of the line 11 through the winding of the impedance element 350 and the winding of the back-bridge relay R340.

*Selecting a called line in the first group of one hundred lines*

The manner in which the relay equipment and the Strowger switching mechanism of the connector 20 are controlled to select a desired line in the first group of one hundred lines is substantially similar to the mode of operation of this equipment to select a line in the second group of one hundred lines as explained above. It will be recalled, however, that in order to select a line in the first group, a first digit of two, four or five impulses is dialed at the calling substation. These impulses are repeated through operation of the two relays R300 and R310 to the operating magnet 673 of the minor switch 670 and the pulse-controlled relay R420 in parallel. If the dialed first digit comprises only two impulses the wipers 671 and 672 are left standing in engagement with their respective associated second contacts at the end of the digit. Accordingly, the previously traced circuit for energizing the group select relay R650 is not completed incident to the release of the relays R420 and R430 at the end of the digit. With the group select relay R650 occupying its restored position the contacts 651, 653 and 655 are closed so that the link line conductors C268, C375 and C273 are connected to the wipers 621, 622 and 623 through which the connector has access to the lines forming the first one hundred line group. In handling a call of this character the group select relay R650 remains in its restored position for the duration of the call. It will be understood, therefore, that the succeeding operations of the connector 20 serve to effect the selection of a line in the first one hundred line group and the selective signaling of the desired substation served by this line, these succeeding operations being accomplished in a manner clearly apparent from the preceding explanation.

It will be understood that if a first digit of four or five impulses is dialed into the connector 20 from a calling substation, the wipers 671 and 672 are left standing in engagement with their respective associated fourth or fifth contacts at the end of the digit, so that the operating circuit for the group select relay R650 is not completed incident to the release of the two relays R420 and R430 at the end of the digit. Thus if any first digit other than the digit "3" is dialed into the connector 20 from a calling substation, the group select relay R650 is not energized and remains in its restored position for the duration of the call.

*Ringing over 20-party and grounded lines*

From the preceding explanation it will be recalled that all lines serving more than ten substations are included in the lines forming the first one hundred line group. In order to provide the code selecting facilities required for signaling over lines of this character, the first digit is utilized to effect a partial selection of the ringing code. More specifically, first digits of four and five impulses respectively designate different groups of ringing codes each including ten different codes. Thus if a first digit of four impulses is dialed into the connector from a calling substation, the wipers 671 and 672 are positioned to engage their respective associated fourth contacts at the end of the digit. With the wiper 671 standing in this position a circuit is completed for energizing the relay R560 incident to the release of the relay R420 at the end of the digit. This circuit extends by way of the grounded hold conductor C291, the contacts 423, C492, the contacts 483 and 413, C497, the wiper 671 and its associated enegaged fourth contacts, C593, and the lower winding of R560 to battery. When energized in this circuit the relay R560 locks to the grounded hold conductor C291 through its preliminary make contacts 562, and opens its contacts 563 to prevent the ring transfer relay R640 from being energized during the dialing of the succeeding digit. At its contacts 561, the relay R560 opens a point in the circuit which is utilized to energize the trunk hunting relay R520 during a trunk hunting operation. It will be noted that with the relay R560 operated, any one of the available ten codes may be utilized to control the ringing relay R610, depending upon the position of the minor switch wipers 671 and 672 at the end of the tenth digit. It will also be apparent that the ring transfer relay R640 can not be energized during the dialing of the fourth digit. Accordingly, regardless of the code selected, ringing current is transmitted from the conductor C618 through the winding of the ring cut-off relay R660 and over the negative side of the called line to energize the ringers provided at the substations served by this line. If the line is of the ground return type, a ground path is utilized as a return circuit for the ringing current.

In the event a first digit comprising five impulses is dialed into the connector 20 from the calling substation, the wipers 671 and 672 are positioned to engage their respective associated fifth contacts at the end of the digit. In this case the relay R570 is energized in response to the release of the relay R420 at the end of the digit, the circuit for energizing the first-mentioned relay extending from the grounded hold conductor C291 by way of the contacts 423, C492, the contacts 483 and 413, C497, the wiper 671 and its engaged fifth contacts, C592, and the lower winding of R570 to battery. In operating, the relay R570 first locks to the grounded hold conductor C291 over a path including its preliminary make contacts 573, and then opens its contacts 574 to prevent the ring transfer relay R640 from being energized during the dialing of a subsequent code selecting digit comprising more than five impulses. Thus the transmission of ringing current over the negative side of the line to be selected is insured. At its contacts 571, the relay R570 opens a point in the previously traced operating circuit for the ring pickup relay R510. At its contacts 572, the relay R570 prepares an alternative circuit for energizing the ring pickup relay.

After the desired line has been selected and the ringing digit has been dialed into the minor switch 670 in the manner previously explained, the switching relay R630 is energized and operates further to prepare the operating circuit for the pickup relay R510. In this case the pickup relay is energized over a circuit which includes the second pickup conductor C577. More specifically, when the interrupter functions to close the contact springs 1121, a pickup pulse is transmitted to the relay R510 over a circuit which extends from ground by way of the contact springs 1121, C577, the contacts 572, 588, the contacts 636, C589, the contacts 513, 542 and 553 and the winding of R510 to battery. Upon operating, the relay R510 locks to the grounded hold lead C578 and closes its contacts 515 to prepare the operating circuit for the ringing relay R610.

Figure 11:
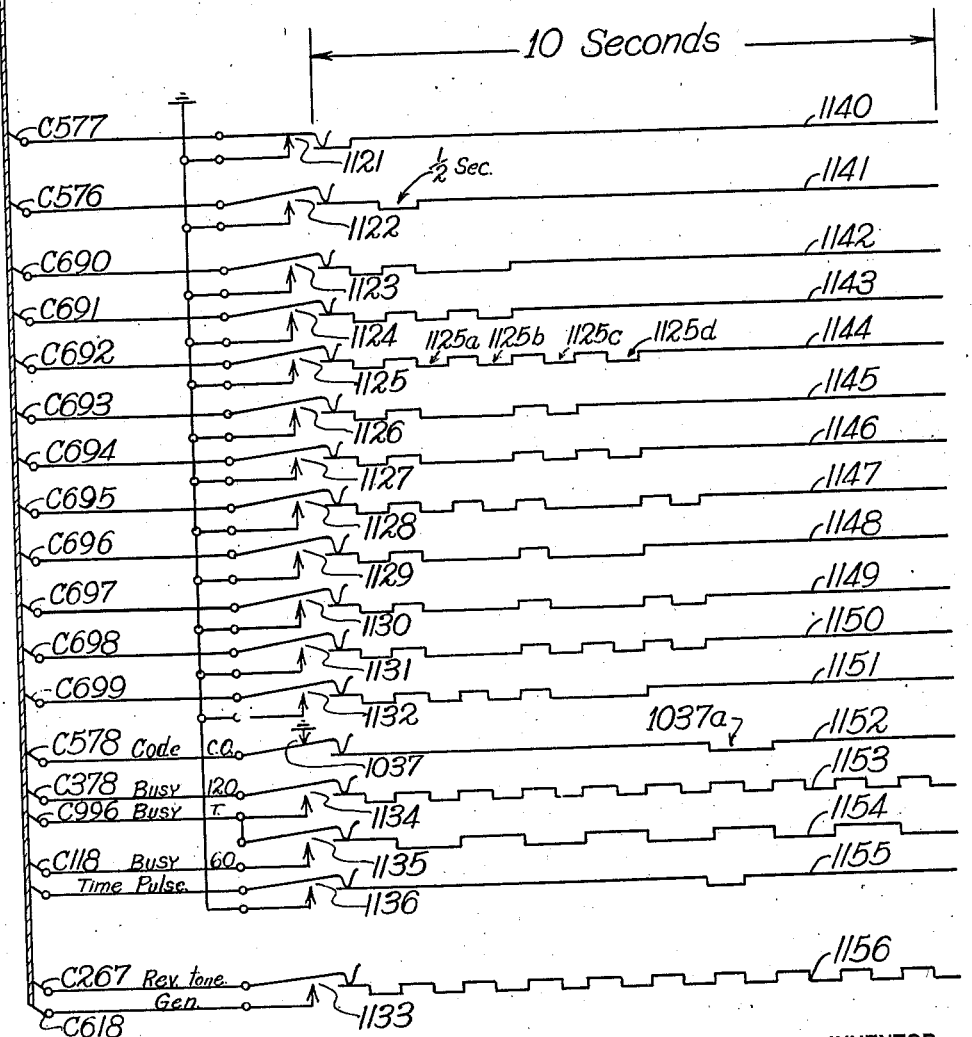

From an examination of the portion of the interrupter shown in Fig. 11, it will be noted that the pickup pulse transmitted over the second pickup lead C577 occurs prior to a short preliminary ringing period which is common to the available ten codes. Thus a short ringing interval, which precedes the main portion of the selected code, is introduced into the code, thereby to produce a different code. For example, with the relay R570 operated and the minor switch 670 positioned to select the sixth ringing code, the ringing relay R610 is controlled in accordance with a code which comprises a short preliminary ringing period followed by two additional short ringing periods, a long ringing period and a short ringing period. On the other hand, if the relay R570 occupies its restored position such that the pickup relay R510 is controlled in accordance with the pickup pulse transmitted over the first pickup lead C576 and the sixth ringing code is selected, the transmitted code comprises only two short ringing periods followed by a long ringing period and a short ringing period, in the order named.

As indicated above, when either of the two relays R560 and R570 operate, ringing current may only be transmitted over the negative side of a selected called line. This arrangement precludes the possibility of attempting to ring over the grounded side of a line of the ground return type. It will be noted that the arrangement of the ring cut-off relay R660 and the stop ringing relay R550 provides an additional safeguard against this possibility. Thus if a line of the ground return type is selected by dialing the number "265," for example, and a code selecting digit comprising more than six impulses is then dialed, it is possible to condition the ringing equipment to transmit ringing current over the positive or grounded side of the selected line. In such case when the ringing relay R610 operates to close the ringing current transmission circuit, the ring cut-off relay is immediately energized in a circuit which extends from the grounded line terminal engaged by the wiper 622, the contacts 653, 634, 615 and 642, the winding of R660 and the direct current path through the ringing current generator to the negative terminal of the exchange battery. When thus energized the relay R660 operates to complete the prepared operating circuit for the stop ringing relay R550. The stop ringing relay, in turn, locks to ground through its contacts 551, and opens its contacts 553 to deenergize the pickup relay R510. The pickup relay, upon restoring, opens its contacts 515 to prevent further operation of the interrupter from producing any further response of the ringing relay R610. By virtue of the various safeguards against ringing over the ground return side of a grounded line, the ringing current generator is protected against short-circuits or heavy overloads.

*Release*

The release of the connection as set up between the substations A and B is entirely under the control of the calling subscriber at the substation A. Thus if the connection is cleared out at the called substation B prior to its release at the substation A, the only resulting operation is the deenergization and release of the back-bridge relay R340, which relay in restoring closes its contacts 343 to reprepare one of the multiple operating circuits for the timing relay R200. When, however, the handset provided at the substation A is restored to its supporting hook or cradle the calling loop circuit set up between this substation and the connector 20 is interrupted to cause the deenergization and release of the two relays R260 and R300. The relay R260, upon restoring, opens its contacts 261 further to interrupt the incomplete operating circuit for the battery reversing relay R320. The line relay R300, upon restoring, opens its contacts 301 to interrupt the operating and locking circuits for the pulsing relay R310. At its contacts 302, the relay R300 interrupts the locking circuit for the hold relay R370. The relay R310, upon restoring, opens its contacts 312 to interrupt the operating circuit for the hold relay R370. The latter relay, upon restoring, opens its contacts 373 to deenergize the trunk identification relay R330 and the lower winding of the cut-off relay R110. At its contacts 374, the relay R370 opens the previously traced operating and locking circuits for the relays R360 and R550.

When its lower winding is deenergized in the manner just explained, the cut-off relay R110 restores. In releasing, this relay opens its contacts 112 to deenergize the lower winding of the line relay R100, and closes its contacts 111 and 113 to again connect the windings of the line relay to the conductors of the line 10. Following the release of the line relay the line circuit 14 is fully restored to normal and the line 10 is marked as idle in the connectors having access thereto.

The hold slave relay R360, upon restoring, opens its contacts 361 to disconnect the release conductor C272 from ground and thus initiate the release of the finder 19 in the manner fully explained in the previously cited copending application, Serial No. 414,258. At its contacts 362, the relay R360 reprepares the all-links-busy marking path individual to the illustrated finder-connector link and extending to the distributor 21. At its contacts 363, the relay R360 reprepares one of the available circuits provided in the connector 20 for impressing ground potential upon the release alarm conductor C281. At its contacts 365, the relay R360 opens the prepared operating circuit for the timing relay R200. At its contacts 366, the relay R360 reprepares the operating circuit for the pulsing relay R310. At its contacts 366', the relay R360 disconnects the hold conductor C291 from ground. At its contacts 367, the relay R360 opens another point in the above-traced locking circuit for the hold relay R370. At its contacts 368, the relay R360 opens a point in the common portion of the previously traced circuits for transmitting current pulses to the pulse-controlled relay R420 and the three magnets 673, 417 and 507. At its contacts 369, the relay R360 prepares an alternative circuit for energizing the release magnet 674 of the minor switch 670. At its contacts 364', the relay R360 completes the prepared operating circuit for the release magnet 257, this circuit extending from ground by way of the contacts 461, C384, the contacts 364', C286, the off-normal springs 259, and the winding of the magnet 257 to battery. When thus energized the release magnet 257 closes its contacts 258 to impress ground potential upon the release alarm conductor C281 and attracts its associated holding pawl to permit the wiper carriage structure of the Strowger switching mechanism to be returned to rotary and vertical normal. Incident to the release of the Strowger switching mechanism the off-normal springs 259 are disengaged to deenergize the release magnet 257, whereby the contacts 258 are opened to disconnect the release alarm conductor C281 from ground. Also incident to the release of the Strowger switching mechanism, the off-normal springs 225 are closed to recomplete the all-links-busy marking path individual to the illustrated finder-connector link and extending to the distributor 21; the off-normal springs 224 are opened to disconnect the guard conductor C278 from ground, whereby the illustrated link is marked as idle in the distributor 21; and the off-normal springs 425 are engaged to reprepare the operating circuit for the transfer relay R480.

When the hold slave relay R360 restores to disconnect the release conductor C272 from ground in the manner explained above, the busy test relay R440, if operated, is deenergized and restores. In this regard it will be noted that the locking circuits for the transfer relays R450, R470, R480, R430 and R530 commonly extend to ground over the release conductor C272. Accordingly, if a call routed to the connector 20 is abandoned before the dialing operation is completed, the operated ones of the enumerated relays are all deenergized and restore when the release conductor C270 is disconnected from ground. If the minor switch 670 is off-normal at the time the call is abandoned, the release magnet 674 thereof is energized incident to the release of the relay R360. In this case the magnet 674 is energized over a circuit which extends from ground by way of the contacts 369, C391, the contacts 416, C518, the contacts 586, C519 and the winding of the magnet 674 to battery. Incident to the resulting release of the minor switch wipers, the relay R580 is deenergized and opens its contacts 586 to deenergize the magnet 674. When the hold conductor C291 is disconnected from ground the operated ones of the relays R560, R570, R630, R640 and R650 are all deenergized and restore. Thus, it will be apparent that when ground potential is removed from the two conductors C272 and C291, all of the operated relays in the connector are deenergized and restore. Following the release of the Strowger switching mechanism and the operated relays, the connector 20 is fully restored to normal and may be allotted for use in handling another call.

Conversation timing

The conversation timing facilities provided in the connector 20 are conditioned for operation when the call is answered. In this regard it will be recalled that when the hold slave relay R360 and the trunk identification relay R330 operate, the operating circuit for the timing relay R200 is prepared at the contacts 331, 343 and 365. Depending upon the position of the interrupter cams at the time the call is extended to the connector 20, this operating circuit may be completed one or more times before the desired connection is finally established between the calling and called lines. Thus each time the cams are moved to a position such that the upper contact spring 1366 rides in the cam depression 1366a, ground potential is impressed upon the pulse lead C392 to energize the timing relay R200 over a circuit which includes this lead, the contacts 365, the parallel-connected contacts 343 and 331, C287, the contacts 213, and the upper winding of R200 to battery. This circuit is only held completed for the short time interval required to move the cam 1380 from one predetermined position thereof to the next succeeding position. Accordingly, the operating circuit for the relay R200 is only completed for a short time interval. When thus energized the relay R200 locks up in a circuit which includes its lower winding, the contacts 203 and 214, C292, the contacts 557, C492, the contacts 423 and the grounded hold conductor C291. Since this circuit is controlled at the contacts 423, by the relay R420, it will be understood that the circuit is broken at these contacts each time a digit is dialed into the connector 20. Thus the timing relay R200 may be caused to operate and restore one or more times as the connection to the called line is built up. When, however, the call is answered to cause the operation of the stop ringing relay R550 in the manner explained above, the locking circuit for the timing relay R200 is extended to the grounded hold conductor C291 through the contacts 556 and 534. In this regard it will be recalled that the relay R580 is deenergized and restores shortly after the stop ringing relay R550 operates. By virtue of the arrangement just described, the conversation timing interval is not started until the desired connection between the calling and called substations is fully completed. When the timing relay R200 next operates after the connection is set up, it locks to the grounded hold conductor C291 over the altered locking circuit as described above, and closes its contacts 204 to prepare the operating circuit for the timing relay R210. At its contacts 205, the relay R200 prepares a locking circuit for the hold relay R370. At its contacts 201, the relay R200 opens a point in the circuit for transmitting a warning signal over the connection. At its contacts 202, the relay R200 opens a point in an alternative operating circuit for the pickup relay R510.

Approximately two minutes after the timing relay R200 is operated, following the completion of the connection between the calling and called lines, the interrupter contacts 1371 are closed under the control of the cam 1383, to complete the prepared operating circuit for the timing relay R210, this circuit extending from ground by way of the contacts 1371, the pulsing lead C290, the contacts 204, and the lower winding of R210 to battery. When thus energized the relay R210 locks to the grounded hold conductor C291 through its contacts 216, and opens its contacts 213 to interrupt the incomplete operating circuit for the timing relay R200. At its contacts 217 and 218, the relay R210 opens the initially completed operating and locking circuits for the hold relay R370, and completes an alternative circuit for energizing this relay. This alternative circuit extends from ground by way of the hold conductor C291, the contacts 344, C295, the contacts 205, 217 and 246, C296, the contacts 312, and the winding of R370 to battery. It will be noted that this locking circuit extends through the engaged contacts 344 of the operated back-bridge relay R340. Accordingly, if the connection is cleared out at the called substation to cause the release of the back-bridge relay during the interval when both of the timing relays R200 and R210 are operated, the connection is released in the manner described above.

The timing relay R210, in operating, also closes its contacts 215 to complete an alternative locking circuit for the timing relay R200, and then opens its contacts 214 to interrupt the locking circuit for the timing relay R200 as traced above. More specifically, the alternative locking circuit for the relay R200 extends from ground by way of the normally engaged interrupter contacts 1375, C288, the contacts 215 and 203, and the lower winding of R200 to battery. At its contacts 212, the relay R210, in operating, prepares the above-mentioned alternative operating circuit for the pickup relay R510. At its contacts 211, the relay R210 prepares the above-mentioned warning tone signaling circuit.

After an additional time interval measured by the continued operation of the interrupter, the cam 1386 is operated through a position wherein the contacts 1375 are disengaged to disconnect the conductor C288 from ground and thus deenergize the timing relay R200. In releasing, the relay R200 opens its contacts 203 further to interrupt its locking circuit, and opens its contacts 204 further to interrupt the operating circuit for the timing relay R210. At its contacts 206, the relay R200 establishes an alternative locking circuit for the hold relay R370, this circuit extending from ground by way of the normally closed interrupter contacts 1376, the conductor C297, the contacts 206, 217 and 246, C296, the contacts 312 and the winding of R370 to battery. After this locking circuit is completed, the relay R200 opens its contacts 205 to interrupt the first completed alternative locking circuit for the relay R370. At its contacts 201, the relay R200 further prepares the above-mentioned warning tone signaling circuit. At its contacts 202, the relay R200 further prepares the above-mentioned alternative operating circuit for the pickup relay R510.

After an additional time interval measured by the continued operation of the interrupter, the cam 1385 is stepped to a stop position wherein the interrupter contacts 1373 are engaged to complete the alternative operating circuit for the pickup relay R510. This circuit extends from ground by way of the contacts 1373, C283, the contacts 212 and 202, C282, the contacts 552 and the winding of R510 to battery. Upon operating, the relay R510 closes its contacts 511 to complete the above-mentioned warning tone signaling circuit. This circuit may partially be traced as extending from the output terminal of the dial tone generator 990 by way of the dial tone conductor C377, the contacts 511, C269, the contacts 211 and 201, and the condenser 207, to the link line conductor C268. From this point the dial tone current is transmitted over the calling and called ends of the connection to energize the receivers provided at the calling and called substations. The resulting signal produced at each of these substations serves to inform the parties conversing over the established connection that the connection is about to be automatically released.

A short time interval after the warning tone signaling circuit is completed the interrupter cam 1385 is operated to a position wherein the contacts 1373 are disengaged to deenergize the pickup relay R510. This relay, upon restoring, opens its contacts 511 to interrupt the warning tone signaling circuit and thus terminate the signal reproduced at the calling and called substations. Almost immediately after the warning signal is thus arrested, the interrupter cam 1387 is operated to a position wherein the contacts 1376 are disengaged to disconnect the holding conductor C297 from ground and thus interrupt the above-traced alternative circuit for energizing the hold relay R370. This relay, upon restoring, opens its contacts 374 to deenergize the hold slave relay R360. At its contacts 373, the relay R370 disconnects the control conductor C270 from ground. The hold slave relay R360, upon restoring, opens its contacts 361 and 366' to disconnect the release conductor C272 and the hold conductor C291 from ground. When ground potential is removed from these two conductors the finder 19 is caused to release and the release of the connector 20 is initiated. During the release of the connector 20 the loop circuit extending to the called substation B is interrupted to cause the release of the back-bridge relay R340, and ground potential is removed from the private conductor 11c of the line 11, incident to the release of the switching relay R630. The timing relay R210 is deenergized and restores when ground potential is removed from the hold conductor C291. Aside from the release of these two relays the connector 20 is restored to normal in the exact manner previously described with reference to the call routed therethrough to the substation B.

When ground potential is removed from the control conductor C270, the cut-off relay R110 of the line circuit 14 is deenergized and restores. In releasing, this relay first closes its contacts 111 and 113 to again bridge the windings of the line relay R100 across the conductors of the line 10, so that the latter relay is held energized over the loop circuit extending to the substation A. After the calling loop circuit is thus re-established, the relay R110 opens its contacts 112 to interrupt the locking circuit for the line relay R100, and closes its contacts 114 to complete a path through the contacts 101 for maintaining guarding ground potential upon the private conductor 10c. At its contacts 115 and 116, the relay R110 opens additional points in its operating and locking circuits as traced above. At its contacts 117, the relay R110 completes a path through the contacts 104 and 106 for impressing ground potential upon the alarm lead C120. The line relay R100 is held in its operated position until the loop circuit extending to the substation A is broken at this substation. When the calling party at the substation A restores the handset provided at this substation to its supporting hook or cradle, the loop circuit is interrupted to cause the deenergization and release of the relay R100. At this time the line circuit 14 is fully restored to normal.

From a further consideration of the line circuit 14 associated with the calling line 10, it will be understood that when ground potential is removed from the private conductor 11c of the called line 11, the cut-off relay in the line circuit 15 is deenergized and restores to bridge the windings of its associated line relay across the conductors of the line 11. This line relay, when energized over the loop circuit extending to the called substation, is held in its operated position to maintain the busy marking on the private conductor 11c and to establish a ground path to the permanent alarm conductor C120. Moreover, with the line relay operated and the cut-off relay restored in the line circuit 15, ground potential is withheld from the distributor start conductor C121 to prevent the useless seizure of an idle one of the finder-connector links by the line 11. The manner in which this line circuit is restored to normal when the call is abandoned at the called substation will be clearly apparent from the above explanation with reference to the line circuit 14.

PRIVATE BRANCH EXCHANGE CALLS

The manner in which calls may be routed through the illustrated finder-connector link to the ring-down trunks extending to the private branch exchange 8, for example, is substantially similar to the mode of subscriber line selection as effected through this link in the manner explained above. In considering this type of service it may be assumed that the above-described call originating at the substation A and routed to the connector 20 is intended for a substation connected to a line which terminates at the switchboard of the private branch exchange 8. It may be assumed further that the group of four trunks extending to this branch exchange is designated by the directory number "2911."

When the two impulses of the first digit are dialed into the connector 20 from the substation A, the wipers 671 and 672 of the minor switch 670 are positioned to engage their respective associated second contacts in the manner explained above. Accordingly, the first group of one hundred lines is selected. At the end of the digit, and when the pulse-controlled relay R420 restores, the transfer relay R430 is deenergized and releases to transfer the pulsing circuit from the operating magnet 673 of the minor switch 670 to the vertical magnet 417 in the exact manner previously explained.

When the second digit of nine impulses is dialed into the connector 20, nine current pulses are transmitted to the parallel-connected windings of the relay R420 and the vertical magnet 417, whereby the wiper 627 is positioned opposite the contact 91 and the wipers 621 to 626, inclusive, are elevated to a position opposite the ninth level of contacts in the associated contact field, i. e., the level in which the conductors of the four trunks extending to the branch exchange 8 are terminated. Incident to the off-normal movement of the wiper carriage structure, the off-normal springs 224 are engaged; the off-normal springs 225 are disengaged; the off-normal springs 259 are moved into engagement and the off-normal springs 425 are disengaged to perform the functions previously described. Shortly following the end of the second digit, the relay R420 restores to cause the deenergization and release of the transfer relay R480. This transfer relay in restoring, closes its contacts 487 to complete the previously traced operating circuit for the release magnet 674, whereby the wipers of the minor switch 670 are restored to normal. Incident to the release of these wipers the off-normal springs 675 are disengaged to deenergize the relay R580, causing this relay to restore. In releasing, the transfer relay R480 also opens its contacts 488 to prevent further current pulses from being delivered to the vertical magnet 417, and closes its contacts 489 to prepare the previously traced circuit for transmitting current pulses to the rotary magnet 507.

When the third digit of one impulse is dialed into the connector 20 from the calling substation, a single current pulse is transmitted to the parallel-connected windings of the pulse-controlled relay R420 and the rotary magnet 507. When thus energized the relay R420 closes its contacts 422 to complete the previously traced locking circuit for the transfer relay R470 and the previously traced operating circuit for the transfer relay R450. The relay R450, upon operating, closes its contacts 456 to prepare the previously traced test circuit. The rotary magnet 507, upon operating, functions to rotate the wiper carriage structure so that the wiper 627 is operated to engage the contact point 91 and the wipers 621, 622, and 623 are moved into engagement with the contacts terminating the conductors of the first trunk 12 extending to the branch exchange 8. In the event this trunk is idle at the time it is thus selected, the private conductor thereof is marked with negative battery potential so that the prepared busy test circuit is not completed. Accordingly, the busy test relay R440 remains in its restored position.

Shortly following the end of the third digit of one impulse the relay R420 restores and opens its contacts 422 to cause the deenergization and release of the three relays R470, R450 and R530, in the manner previously explained. The two relays R450 and R530, upon restoring, complete the previously traced circuit for energizing the slow-to-operate idle test relay R620 in series with one winding of the cut-off relay embodied in the line circuit individual to the selected trunk extending to the branch exchange 8. When thus energized the relay R620 closes its contacts 621' to complete the operating circuit for the line switching relay R630. The latter relay, upon operating, locks to the grounded hold conductor C291 through its contacts 638, and prepares the ringing equipment for ringing current transmission in the manner previously explained.

When the fourth digit of one impulse is dialed into the connector 20, a single current pulse is transmitted to the parallel-connected windings of the relay R420 and the operating magnet 673, whereby the wipers 671 and 672 are positioned to engage their respective associated first contacts and the off-normal springs 675 are engaged to recomplete the operating circuit for the relay R580. From this point on the manner in which ringing current is transmitted over the selected trunk to energize the drop or other signal device individual to this trunk and provided at the branch exchange switchboard, is exactly the same as described above with reference to the signaling of the called subscriber B served by the line 11.

In the event the first trunk is busy at the time it is selected in the manner explained above, the private conductor thereof is marked with ground potential so that the busy test relay R440 is energized immediately the trunk is selected. In this case the relay R440, upon operating, closes its contacts 444 to prepare the operating circuit for the trunk hunting relay R520. Shortly after the first trunk of the group is selected and the busy test relay R440 operates, the two relays R420 and R470 are caused sequentially to restore in the manner previously explained. In releasing, the relay R470 closes its contacts 475' to complete the prepared operating circuit for the trunk hunting relay R520, this circuit extending from ground by way of the conductive P. B. X arc 628 and the contact 91 carried thereby, the wiper 627, the contacts 657, C591, the contacts 561, C469, the contacts 444 and 475′, C468, the contacts 534 and 509, and the winding of R520 to battery. In operating, the relay R520 locks to the grounded release conductor C272 through its contacts 522, and closes its contacts 521 to complete an alternative circuit for energizing the rotary magnet 507 and the slow-acting control relay R530 in parallel. This circuit extends by way of the grounded release conductor C272, the contacts 533, C448, the contacts 474, C447, and the contacts 521 to the conductor C490 where it divides, one branch extending through the winding of the magnet 507 to battery and the other branch extending by way of the contacts 476′, C493, and the lower winding of R530 to battery. When thus energized the magnet 507 steps the wipers 621 to 626, inclusive, into engagement with the contacts forming the second set of the selected level, thereby to select the second trunk of the group extending to the branch exchange 8. In operating, the magnet 507 also opens its contacts 509 to deenergize the trunk hunting relay R520. The relay R520 now restores and opens its contacts 522 to interrupt its locking circuit as traced above.

In the event the second trunk of the group is also busy, the private conductor thereof is marked with ground potential so that the busy test relay R440 is again energized. In reoperating, this relay again closes its contacts 444 to recomplete the operating circuit for the trunk hunting relay R520, the circuit in this case extending from the grounded P. B. X arc 628 through the second contact 92 to the wiper 627, and from this wiper through the winding of the relay R520. The relay R520, upon reoperating, again locks to the grounded conductor C272, and recloses the circuit for energizing the rotary magnet 507 and the control relay R530 in parallel. Thus the wipers 621 to 626, inclusive, are again stepped to select the third trunk of the selected group.

The above described operations are repeated until an idle trunk in the selected group is found, or until all of the trunks have been tested and found to be in a busy condition. During the trunk hunting operation the relay R530, due to its slow-to-release characteristic, remains operated to hold the transfer relay R450 energized. If any one of the tested trunks is found to be idle, the busy test relay R440 remains in its deenergized or restored position upon the selection of the idle trunk. Incident to the selection of an idle trunk, the trunk hunting operation is arrested and the call is extended over the idle trunk to the branch exchange 8 in the exact manner pointed out above.

From the above explanation, it will be understood that the starting of the trunk hunting operation occurs in response to the sequential release of the transfer relays R420 and R470 at the end of the third digit dialed into the connector 20. It will also be recalled that the two relays R450 and R530 are held operated during the trunk hunting operation. Following the release of the relay R470, the pulse controlled relay R420 is rendered ineffective to control any of the transfer relays R450, R460, R470 and R480, or the control relay R530. Moreover, neither of the two operated relays R450 and R530, utilized in effecting the trunk hunting operation, is used to control the above-traced pulsing circuit over which the impulses of the fourth or code selecting digit are repeated to the operating magnet 673 of the minor switch 670. Accordingly, it will be understood that the fourth or code selecting digit may be dialed into the connector 20 to set the minor switch 670 in the position corresponding to the desired ringing code, concurrently with the operation of the trunk-hunting facilities to select an idle trunk in the selected trunk group.

In the arrangement illustrated, wherein it is assumed that four trunks to the branch exchange 8 are provided, the P. B. X arc 628 is only equipped with trunk hunting contacts in the first, second and third rotary positions of the ninth level, i. e., the contacts 91, 92 and 93. Accordingly, after the wipers 621 to 626 have been operated four steps in the rotary direction, no further circuit is available for energizing the trunk hunting relay R520 and the trunk hunting operation is arrested. Assuming that the fourth trunk of the group is tested and found busy, the busy test relay is energized over a test circuit which includes the private conductor of this trunk. Shortly after the selection of the trunk is effected, the slow-acting control relay R530 and the transfer relay R450 are deenergized and restore in sequence. In releasing, the relay R450 completes the previously traced locking circuit for the busy test relay R440, and closes the previously described busy signaling circuit. Thus a busy signal is produced at the calling substation which informs the calling party that the desired connection cannot be obtained.

*Night service*

As indicated previously, provisions are made in the link circuit for disabling the trunk hunting facilities when predetermined branch exchange directory numbers are dialed into the connectors. This permits different directory numbers to be utilized for day and night service respectively, and permits the operator in the branch exchange 8 to connect a predetermined one of the trunks, such, for example, as the trunk 12, to a night telephone so that all calls incoming to the branch exchange will automatically be routed to this night telephone when the operator is off duty. For example, in the case assumed above, the night directory number designating the branch exchange 8 may be "4921." In such case, if a first digit of four impulses is dialed into the connector 20 from a calling substation, the relay R560 is energized and locks up at the end of the digit. In response to the dialing of the second, third and fourth digits the call is routed to the night service trunk extending to the branch exchange 8 in the exact manner described above with reference to the call routed over the line 11 to the substation B. With the relay R560 operated the previously traced circuit for energizing the trunk hunting relay R520 is held open at the contacts 561 for the duration of the call. Accordingly, trunk hunting on the part of the connector 20 is positively precluded, the single trunk extending to the branch exchange 8 and designated for night service being directly selected and tested in the same manner as a subscriber line.

INCOMING TRUNK CALLS

The manner in which a call routed to the illustrated community exchange switching equipment from a distant central office may be extended through the finder 19 and connector 20 to a subscriber line terminating at the community exchange is substantially similar to the mode of operation of this equipment to set up a connection between two local subscriber lines, in the manner explained above. Thus a connection may be routed from a toll operator position in a distant manual exchange, not shown, from a trunk connecting the two exchanges and through a repeater and line circuit to the finder 19, in the exact manner explained above. For purposes of explanation it may be assumed that the line circuit 14 is associated with the inter-office trunk in use. It may further be assumed that at the time the call is routed to the illustrated automatic switching equipment, all of the available links in the community exchange are busy. Under these circumstances the all-busy relay of the distributor 21 is operated so that the signal conductor C118 is connected to the lower electrode of the condenser 107. Accordingly, signaling current is transmitted over the inter-office trunk used to signal the operator handling the call in the distant manual office that no links are available for extension of the connection. The circuit traversed by this signaling current may partially be traced as extending from the output terminal of the busy tone generator 995 by way of the busy tone conductor C996, the interrupter springs 1135, C118, the condenser 107, and the contacts 111 to the negative side of the link line extending to the repeater which terminates the inter-office trunk in the community exchange. From this point the busy tone current is transmitted over the inter-office trunk to the headset of the operator handling the call in the distant manual office. The signal thus produced incident to the extension of the call to the switching equipment in the community exchange serves to inform the operator handling the call that no links are available for use in the community exchange.

Assuming that the finder 19 is utilized in handling the inter-office call under consideration, the wipers of this switch are positioned on the contacts terminating the conductors of the link line extending to the repeater which terminates the trunk, in response to the application of ground potential to the distributor start conductor C121 and the resulting operation of the common equipment included in this distributor. Incident to the vertical movement of the finder switch wipers the normal post springs provided in the Strowger switching mechanism of the finder are actuated to bridge the terminals 41 and 42 and thus connect the two conductors C238 and C239 together. Additional normal post springs, also included in the Strowger switching mechanism of the finder, operate incident to the vertical movement of the finder wipers to establish a bridge across the terminals 35 and 36 and thus connect the two conductors C274 and C275 together.

The connection between the two conductors C274 and C275 as established through the normal post springs of the Strowger switching mechanism in the finder 19 serves to provide an operating circuit for the battery reversing relay R320, which circuit is completed incident to the operation of the back-bridge relay R340 when the call is answered. In this regard it will be understood that after the connection is extended to the connector 20 it may be routed therethrough to the desired substation in the exact manner described above with reference to the connection set up between the substations A and B. When the inter-office trunk call is answered at the called substation to cause the operation of the back-bridge relay R340, this relay closes its contacts 342 to complete the prepared operating circuit for the battery reversing relay R320. This circuit includes two parallel branches, one of which extends from ground by way of the winding of R330, the contacts 374 and 364, C285, the contacts 233, C236, the contacts 464, C299, the contacts 342, C276, the contacts 261, C275, the operated normal post springs of the finder 19, C274, and the winding of R320 to battery. The parallel branch may be traced as extending from ground by way of the winding of R330, the contacts 373, C270, the contacts 219 and 223, C299, the contacts 342, C276, the contacts 261, C275, the operated normal post springs of the finder 19, C274, and the winding of R320 to battery. When energized over this circuit the relay R320 locks to the grounded lead C299 through its contacts 325. At its contacts 321 to 324, inclusive, the relay R320 reverses the direction of current flow over the loop circuit extending between the connector and the repeater associated with the inter-office trunk in use, whereby the usual off-hook supervisory signal is transmitted from the repeater over the trunk to produce an off-hook supervisory signal at the position of the operator handling the call in the distant manual office. It will be noted that both branches of the circuit for energizing the relay R320 are directly controlled by the back-bridge relay R340. Accordingly, the relay R320 is rendered controllable by the switchhook provided at the called substation to reverse the direction of current flow over the loop extending from the connector 20 to the inter-office repeater in use each time the switchhook contacts are opened or closed. Thus supervisory signals may be transmitted by the called subscriber to the position of the operator handling the call. In this regard it will be noted that when the call is released at the called substation the two relays R340 and R320 are sequentially deenergized and restore. The latter relay, in reversing the direction of current flow over the loop extending from the connector 20 to the repeater in use, causes the transmission of an on-hook supervisory signal to the distant operator position.

*Blocking the conversation timing facilities*

Provisions are made in the repeaters terminating toll trunks extending to a distant central office for projecting ground forward over the private or test conductors of such trunks for identification purposes. In the case of a call routed over a trunk of this character and through its terminating repeater and the finder 19 to the connector 20, the trunk identification relay R330 is short-circuited when the switch-through relay of the finder 19 operates. The short-circuiting path in a case of this character may be traced as extending from ground through the winding of the relay R330 by way of the contacts 373, C270, the operated make contacts of the switch-through relay in the finder 19, and the test wiper of the finder to the grounded test conductor of the line circuit associated with the toll trunk in use, this test conductor being connected through the contacts of the line and cut-off relays in the line circuit to ground in the toll trunk repeater occupied with the call. When thus short-circuited, the relay R330 remains in its restored position for the duration of the call. Accordingly, the operating circuit for the timing relay R200 is not prepared at the contacts 331 incident to the seizure of the connector 20. Until the desired connection is fully set up to the called substation the parallel branch of this operating circuit is prepared at the contacts 343 to permit the link to be forcibly released under the control of the interrupter, in the manner explained below. When, however, the call is answered at the called substation to cause the operation of the back-bridge relay R340, the contacts 343 are opened to interrupt the operating circuit for the timing relay R200. This operating circuit is held open at the contacts 331 and 343 so long as the toll connection is not released at the called substation. Accordingly, the operation of the two timing relays R200 and R210 forcibly to release the link under the control of the interrupter, is prevented. It will be noted, however, that if the connection is released at the called substation and the toll operator handling the call fails to clear out the connection, the timing relays R200 and R210 are again rendered operative forcibly to release the link.

*Toll monitoring*

As indicated previously, provisions are made in the connector 20 for permitting a toll operator to gain access to a busy called line in order to monitor the line and, if necessary, to break in upon a conversation being held thereover for the purpose of offering the toll call to the desired subscriber. To establish a connection of this character it is necessary that the toll operator dial the prefix digit "1" before dialing the regular subscriber directory number. Assuming that the finder 19 and the connector 20 are utilized in handling a call of this character, the trunk identification relay R330 is short-circuited and the two terminals 41 and 42 are bridged through the normal post springs of the finder 19 incident to the extension of the call to the connector 20.

When the prefix digit of one impulse is dialed into the connector 20 through the toll trunk repeater from the distant toll operator position, the two relays R300 and R310 operate to transmit a current pulse to the parallel-connected windings of the relay R420 and the operating magnet 673. Accordingly, at the end of the digit the relay R420 is operated and the wipers 671 and 672 are positioned to engage their respective associated first contacts. When the relay R420 restores shortly following the end of the digit, it closes its contacts 423 to complete the prepared operating circuit for the toll monitoring relay R410, this circuit extending from the grounded hold conductor C291 by way of the contacts 423, C492, the contacts 483 and 413, C497, the wiper 671 and its engaged first contacts, C238, the operated normal post springs of the finder 19, C239, the contacts 332, C339, and the winding of R410 to battery. In operating, the relay R410 first locks to ground over a path including its contacts 411, the contacts 423 and the hold conductor C291. After this locking circuit is completed the relay R410 opens its contacts 413 to interrupt its operating circuit as traced above, and closes its contacts 414 to complete an obvious alternative locking circuit for the transfer relay R430, whereby the latter relay is prevented from prematurely releasing. At its contacts 415, the relay R410 completes a circuit for energizing the release magnet 674, this circuit extending from the grounded conductor C389 by way of the contacts 408 and 415, C518, the contacts 586, and the winding of the magnet 674 to battery. At its contacts 415, 412 and 411, the relay R410 completes a path for short-circuiting the lower winding of the relay R400. This path extends from the upper terminal of the indicated winding by way of the contacts 412 and 483, C492, the contacts 411, 408 and 415, C518, the contacts 586, C519, and the contacts 409 to the lower terminal of the winding. Thus the relay R400 is prevented from operating until the minor switch 670 is fully released. The release of this switch occurs incident to the operation of the release magnet 674 and in the manner explained above. When the wipers 671 and 672 are restored to normal the off-normal springs 675 are disengaged to de-energize the relay R580. This relay, upon restoring, opens its contacts 586 to interrupt the above-traced path short-circuiting the lower winding of the relay R400 and thus permit this winding to be energized in series with the release magnet 674. More specifically, the circuit for energizing this winding extends from the grounded hold conductor C291 by way of the contacts 423, C492, the contacts 483 and 412, the lower winding of R400, the contacts 409, C519, and the winding of the magnet 674 to battery. When thus energized the relay R400 locks to the grounded hold conductor C291 in a circuit which includes its upper winding, its preliminary make contacts 407, C491, and the contacts 514. After this locking circuit is completed the relay R400 opens its contacts 408 further to interrupt the above-traced operating circuit for the release magnet 674. At its contacts 409, the relay R400 opens the circuit for energizing its lower winding in series with the indicated release magnet. At its contacts 408 and 409, the relay R400 also opens two points in the above-traced path for short-circuiting its lower winding. At its contacts 402 and 403, the relay R400 prepares a dry talking circuit to the busy called line. At its contacts 401, the relay R400 opens a point in the previously traced busy signaling circuit. At its contacts 404 and 405, the relay R400 transfers the locking circuit for the busy test relay R440 from the release conductor C272 to the test conductor C273. At its contacts 406, the relay R400 completes an obvious path for short-circuiting the lower winding of the busy test relay R440, thereby to render this relay slow to release.

During the dialing of the first digit of the directory number designating the desired substation, current pulses are again transmitted to the relay R420 and the operating magnet 673 in parallel. The relay R420, upon reoperating at the beginning of this digit, closes its contacts 422 to complete the previously traced multiple holding circuit for the two relays R430 and R530. At its contacts 423, the relay R420 interrupts the above-traced locking circuit for the relay R410. The latter relay is thus caused to restore during the first part of the second digit dialed into the connector 20. In releasing, this relay opens its contacts 411 further to interrupt its locking circuit, and closes its contacts 413 to reprepare the path for impressing ground potential upon the wiper 671 of the minor switch 670. At its contacts 414, the relay R410 opens the above-described alternative locking circuit for the transfer relay R430, whereby the latter relay is conditioned to release at the end of the digit. At its contacts 412, the relay R410 opens another point in the operating circuit for the relay R400. At its contact 416 the relay R410 prepares the operating circuit for the release magnet 674.

From this point on, the selection of the called line and the particular code utilized in signaling the desired substation associated with this line may proceed in the exact manner described above with reference to the call routed to the substation B. Assuming that the line 11 is the busy line desired by the toll operator, the busy test relay is energized and operates when the wipers 624, 625 and 626 are positioned on the bank contacts terminating the conductors of this line. In this case the relay R440, upon operating, locks to the grounded private conductor 11c over a path which includes the contacts 457, 443 and 405, C273, the contacts 656 and the test wiper 626. This locking circuit is completed incident to the release of the transfer relay R450 which occurs shortly after the end of the fourth digit dialed into the connector 20. With the relay R440 operated, the operating circuit for the idle test relay R620 is held open at the contacts 446 to prevent the transmission of ringing current over the busy called line after the fifth or ringing digit is dialed into the connector.

The transfer relay R450, upon restoring at the end of the fourth digit transmitted to the connector, also functions to complete the desired monitoring circuit to the busy called line 11. More specifically, this relay closes its contacts 451 and 452 to bridge the two repeating coil windings 348 and 349 across the talking conductors of the line 11. This bridging path may be traced as extending from the negative line conductor by way of the wiper 624, the contacts 652, C263, the condenser 417, the contacts 402, C426, the contacts 632, C427, the contacts 451, C268, the winding 348, the condenser 348', the winding 349, C375, the contacts 452, the condenser 418, the contacts 403, C266, the contacts 654, and the wiper 625 to the positive conductor of the line. When this circuit is completed the toll operator at the distant end of the connection may listen in on the conversation being held over the busy line 11 and ascertain the character or status of the conversation. If desired, she may break in upon the connection and offer the toll call to the desired subscriber.

After the monitoring connection is established in the manner just explained, the toll operator handling the call in the distant office has the option of immediately releasing the monitoring connection or of holding the connection until the previously established connection involving the line 11 is released, at which time the control equipment of the connector 20 is automatically shifted to its ringing position to re-signal the desired substation associated with the line 11. In this regard it will be noted that the monitoring connection as set up across the conductors of the line 11 through the connector 20 does not include a source of current or provide any direct current path between the conductors of this line. Accordingly, the previously established connection may be released without interference due to the presence of the monitoring connection. Incident to the release of the previously established connection the cut-off relay of the line circuit 15 is restored to normal and the private conductor 11c is disconnected from ground. When ground potential is thus removed from the test wiper 626, the busy test relay R440 is deenergized and restores. Upon releasing, the relay R440 closes its contacts 446 to complete the previously traced operating circuit for the idle test relay R620. The relay R620, upon operating, closes its contacts 621' to energize the switching relay R630. The latter relay now operates and performs the functions previously described. With the relay R630 in its operated position, transmission of ringing current of the selected code over the called line 11 to signal the desired substation may proceed in the exact manner previously described. In this regard it will be noted that when the ring pickup relay R510 first operates to initiate the ringing operation, it opens its contacts 514 to interrupt the locking circuit for the relay R400. In releasing, the relay R400 opens its contacts 407 further to interrupt its locking circuit. At its contacts 404 and 405, the relay R420 transfers the incomplete locking circuit for the busy test relay R440 from the test conductor C273 to the release conductor C272. At its contacts 402 and 403, the relay R400 opens two points in the above-traced path for bridging the repeating coil windings 348 and 349 across the talking wipers 624 and 625. At its contacts 401, the relay R400 reprepares the previously traced busy signaling circuit. At its contacts 406, the relay R400 opens the path short-circuiting the lower winding of the busy test relay R440. From this point on the manner in which the call is handled in the connector 20 is exactly the same as described above with reference to the call originating at the substation A.

In the event the toll operator in the distant office elects not to hold the toll monitoring connection as set up to the selected busy line 11, she may initiate the release of the connection in the manner explained above. During the release of the connection the two relays R400 and R410 are deenergized and restore when the hold slave relay R360 releases to disconnect the hold conductor C291 from ground. In this case the wipers of the minor switch 670 occupy an off-normal position corresponding to the desired ringing code at the time the release of the connector 20 is initiated. In order to effect the release of this switch under these circumstances, the above-described alternative operating circuit for the release magnet 674 is prepared incident to the release of the hold slave relay R360. This circuit extends from ground by way of the contacts 369, C391, the contacts 416, C518, the contacts 586 and the winding of the magnet 674 to battery. When this circuit is completed the minor swtich 670 and the relay R580 are released in the manner previously explained.

OUTGOING INTER-OFFICE TRUNK CALLS

Referring now more particularly to the mode of operation of the connector 20 to switch a calling loop circuit through to a repeater associated with an inter-office trunk extending to the automatic exchange 9, for example, it may be assumed that the above-described call originating at the substation A is intended for a subscriber served by the exchange 9. It may be assumed further that the directory number "0" is assigned to the group of inter-office trunks connecting the illustrated community exchange with the automatic exchange 9. After the call is extended to the connector 20, and when the single digit "0" is dialed into the connector from the calling substation A, ten current pulses are transmitted to the pulse-controlled relay R420 under the control of the line and pulsing relays R300 and R310. The first six current pulses are also transmitted to the operating magnet 673 of the minor switch 670, so that during the sixth impulse of the digit the wipers 671 and 672 are stepped to engage their respective associated sixth contacts. Incident to this operation a circuit through the wiper 671 is prepared for energizing the first digit pulse transfer relay R500. Shortly thereafter, and when the magnet 673 restores at the end of the sixth current pulse transmitted thereto, it closes its contacts 677 to complete the prepared operating circuit for the relay R500. This circuit extends from ground by way of the contacts 548, C597, the contacts 677, the wiper 671 and its engaged sixth contacts, C498, the contacts 486, C494, and the lower winding of R500 to battery. A branch of this circuit extends through the contacts 475, C468, the contacts 534 and 509 and the winding of the trunk hunting relay R520 to battery. Thus the two relays R500 and R520 both operate at the end of the sixth impulse of the digit. In operating, the trunk hunting relay R520 locks to the grounded release conductor C272 through the contacts 509 and 522. At its contacts 521, the relay R520 prepares the previously described circuit over which the rotary magnet 507 is operated during a trunk hunting operation. The relay R500, upon operating, locks to the grounded hold conductor C291 through its preliminary make contacts 506, and opens its contacts 504 to prevent the remaining current pulse of the first digit from being transmitted to the operating magnet 673 of the minor switch 670. At its contacts 503, the relay R500 prepares the operating circuit for the relay R460. At its contacts 502, the relay R500 completes an alternative locking circuit for the two transfer relays R470 and R480, this circuit extending from the grounded hold conductor C291 by way of the engaged contacts 422 of the operated pulse-controlled relay R420, C439, the contacts 502, C438, the contacts 472, and the parallel-connected windings of the two transfer relays R470 and R480 to battery. At its contacts 501 and 502, the relay R500 completes a circuit for energizing the transfer relay R450, this circuit extending from the grounded hold conductor C291 by way of the contacts 422, C439, the contacts 502, C438, the contacts 472, C436, the contacts 501, and the lower winding of R450 to battery. The relay R450, upon operating, locks to the grounded release conductor C272 through the contacts 454 and 531; opens the operating circuit for the transfer relay R470; opens the incomplete operating circuit for the idle test relay R620; and closes its contacts 456 to prepare the operating circuit for the busy test relay R440. At its contacts 451, the relay R450 opens a point in the previously traced busy signaling circuit.

In operating, the relay R500 also closes its contacts 505 to complete a circuit over which the remaining four current pulses of the digit are repeated by the two relays R300 and R310 to the vertical magnet 417. More specifically, this circuit, which is completed at the contacts 313 each time the pulsing relay R310 restores, extends from ground by way of the contacts 218 and 246, C296, the contacts 313 and 368, C390, the contacts 547, C517, the contacts 488 and 435, C459, the contacts 505, C467, and the winding of the magnet 417 to battery. Each time the vertical magnet 417 is energized in this circuit it closes its contacts 418 to reprepare or recomplete the operating circuit for the pulsing relay R310 and steps the wiper carriage structure of the Strowger switching mechanism one step in the vertical direction. It will be understood, therefore, that after the remaining four impulses of the digit have been transmitted to this magnet, the wiper 627 is positioned opposite the contact point 41 and the wipers 621 to 626, inclusive, are positioned opposite the fourth level of bank contacts, i. e., the level in which the trunks extending to the automatic exchange 9 are terminated. Incident to the off-normal movement of these wipers, the vertical off-normal springs 425 are disengaged to open the operating circuit for the transfer relay R480, and the other off-normal springs 224, 225 and 459 are operated to perform the functions previously described.

Shortly following the end of the digit the relay R420 restores and opens its contacts 422 to interrupt the locking circuits for the transfer relays R470 and R480. At these contacts the operating circuit for the transfer relay R450 is also opened but the latter relay is held energized over its locking circuit as traced above. In releasing, the relay R480 opens its contacts 489 to interrupt the above-traced circuit for energizing the relays R500 and R520 in parallel. At its contacts 486', the relay R480 completes a circuit for energizing the ring transfer relay R640, this circuit extending from ground by way of the contacts 548, C597, the contacts 677, the wiper 671 and its engaged sixth contacts, C498, the contacts 486', C499, the contacts 563 and 574, C595 and the lower winding of R640 to battery. In operating, the relay R640 locks to the grounded hold conductor C291. The remaining switching operations performed by this relay are without effect in the present instance. At its contacts 488, the relay R480 opens another point in the common portion of the previously traced circuits for transmitting current pulses to the vertical magnet 417 and the operating magnet 673. The remaining switching operations performed incident to the release of the transfer relay R480 are without effect at this time.

The relay R470, upon restoring, opens its contacts 472 further to interrupt the above-traced locking circuit for itself and the transfer relay R480 and the operating circuit for the transfer relay R450. At its contacts 475, the relay R470 opens another point in the operating circuit for the trunk hunting relay R520. At its contacts 475', the relay R470 prepares an alternative circuit for energizing the trunk hunting relay R520. At its contacts 476, the relay R470 opens the locking circuit for the slow-acting control relay R530. At its contacts 476', the relay R470 prepares a circuit for energizing the relay R530 in parallel with the rotary magnet 507 during the trunk hunting operation. At its contacts 477, the relay R470 completes the previously traced operating circuit for the relay R540. At its contacts 477', the relay R470 opens a point in one of the available operating circuits for the release magnet 674. The relay R540, upon operating, locks to the grounded hold conductor C291 through its contacts 545, and opens its contacts 547 further to interrupt the common portion of the pulsing circuits over which current pulses are delivered to the magnets 673, 507 and 417, and to the relay R420. At its contacts 546, the relay R540 prepares a path for impressing ground potential upon the test conductor C273. At its contacts 548, the relay R540 opens a point in the common portion of the above-traced operating circuits for the relays R520, R500 and R640. At its contacts 549, the relay R540 prepares an alternative operating circuit for the drain control relay R600. At its contacts 543 and 544, the relay R540 opens the initially established locking circuit for the relay R310, and completes an obvious alternative locking circuit for this relay. At its contacts 542, the relay R540 prepares the operating circuit for the pickup relay R519. At its contacts 541, the relay R540 prepares the operating circuit for the stop ringing relay R550.

At its contacts 474, the relay R470, in releasing, completes an automatic cut-in circuit over which the rotary magnet 507 is energized to rotate the wiper 627 into engagement with the contact point 41 and to rotate the wipers 621, 622 and 623 into engagement with the contacts terminating the conductors of the first trunk in the selected trunk group. This circuit extends from the grounded release conductor C272 by way of the contacts 533, C448, the contacts 474, C447, the contacts 521 and the winding of the magnet 507 to battery. A branch of this circuit extends from the contacts 521 by way of C490, the contacts 476' and C493 to energize the lower winding of the control relay R530. It will be understood that a current pulse is transmitted over this branch circuit each time the rotary magnet 507 is energized. Due to its slow-to-release characteristic the relay R530 remains operated during the trunk hunting operation. A second branch of the automatic cut-in circuit extends from the conductor C447 by way of the contacts 503, C284 and the winding of R460 to battery. In operating, the relay R460 closes its contacts 463 to connect the release conductor C272 to the control conductor C270 and thus prepare a circuit for holding the cut-off relay R110 operated after the switching through operation to an idle repeater is effected. At its contacts 461, the relay R460 opens a point in the operating circuit for the release magnet 257. At its contacts 462, the relay R460 opens a point in the prepared path for impressing ground potential upon the test conductor C273. At its contacts 464, the relay R460 opens a point in one branch of the previously traced operating circuit for the battery reversing relay R320. At its contacts 466, the relay R460 opens a point in the incomplete operating circuit for the idle test relay R620. At its contacts 465, the relay R460 short-circuits the switch-through relay R240 and in so doing prepares a circuit for energizing its own winding in series with the winding of the switch-through relay R240.

As indicated above, when the rotary magnet 507 is energized in the above-traced automatic cut-in circuit, it functions to step the wipers 621, 622 and 623 into engagement with the contacts terminating the conductors of the first trunk in the selected group. In operating, the magnet 507 also opens its contacts 509 to interrupt the locking circuit for the trunk hunting relay R520. The latter relay, upon restoring, opens its contacts 522 further to interrupt its locking circuit, and opens its contacts 521 to deenergize the parallel-connected windings of the magnet 507 and the control relay R530. The magnet 507 now restores and closes its contacts 509 to reprepare the operating and locking circuits for the trunk hunting relay R520.

Further operation of the trunk hunting facilities depends upon whether the first trunk of the group, as selected in the manner just explained, is idle or busy. In the event this trunk is occupied with a call, the test or private conductor thereof is marked with ground potential so that the operating circuit for the busy test relay R440 is completed incident to the selection of the trunk. In operating, the relay R440 closes its contacts 444 to complete a circuit through the PBX arc 628 for energizing the trunk hunting relay R520. More specifically, this circuit extends from ground through the plate 628 and the contact point 41 carried thereby, the wiper 627, the contacts 657, C591, the contacts 561, C469, the contacts 444 and 475', C468, the contacts 534 and 509, and the winding of R520 to battery. At its contacts 446, the relay R440 opens the path short-circuiting the winding of the switch-through relay R240. At its contacts 445, the relay R440 prepares the above-mentioned path for impressing ground potential upon the test conductor C273.

In reoperating, the relay R520 recloses the circuit for energizing the parallel-connected windings of the magnet 507 and the relay R530. The magnet 507 now reoperates to step the wipers 621, 622 and 623 into engagement with the contacts terminating the second trunk of the selected level, and opens its contacts 509 to deenergize the trunk hunting relay R520. The relay R520, upon restoring, opens its contacts 521 to deenergize the rotary magnet 507.

If the second trunk of the selected group is also busy, the busy test relay R440 is again energized and reoperates to recomplete the operating circuit for the trunk hunting relay R520, this circuit now extending to ground through the wiper 627, the second contact 42 in the fourth level of contacts carried by the arc 628, and through this arc to ground. In reoperating, the trunk hunting relay R520 again closes the operating circuit for the rotary magnet 507, whereby the wipers 621, 622 and 623 are stepped a third step to engage the contacts terminating the conductors of the third trunk in the selected group. The trunk hunting operation of the connector 20 continues until all the trunks of the selected group are tested and found to be busy or until an idle trunk in the group is located.

Assuming that all four of the trunks in the group are busy, the wipers 621 to 627, inclusive, are operated to the fourth rotary position wherein they engage the contacts terminating the conductors of the last trunk in the group. With the wipers in this position it will be observed that the wiper 627 is disconnected from ground through the PBX arc 628 and, accordingly, no further circuit is available for energizing the trunk hunting relay R520. Since the fourth trunk of the group is assumed to be busy, it will be understood that the busy test relay R440 reoperates upon the selection of this trunk, and since the trunk hunting relay R520 remains in its restored position upon the selection of the last trunk in the group, no further current pulses are transmitted to the control relay R530. The latter relay accordingly restores shortly after the last trunk of the group is selected. In releasing, the relay R530 opens its contacts 531 to deenergize the transfer relay R450. At its contacts 533, the relay R530 opens the operating circuit for the relay R460 and a point in the operating circuit for the rotary magnet 507. At its contacts 534, the relay R530 opens a point in the operating circuit for the trunk hunting relay R520. The remaining circuit switching operations performed incident to the release of the relay R530 are without effect at this time. The relay R460, upon restoring, closes its contacts 461 to reprepare the operating circuit for the release magnet 257. The remaining circuit switching operations performed incident to the release of the relay R460 are without effect at this time. The transfer relay R450, upon restoring, closes its contacts 457 to complete the locking circuit for the busy test relay R440 and closes its contacts 451 to complete the previously traced busy signaling circuit. When this circuit is completed busy tone current is transmitted over the calling end of the connection to signal the calling subscriber that the desired connection cannot be obtained. After receiving the busy signal a calling subscriber may release the connection in a manner clearly apparent from the preceding explanation.

Assuming now that the trunk 13 is the first idle trunk in the selected group, the trunk hunting operation of the connector 20 is arrested when the wipers 621, 622 and 623 are operated to engage the contacts terminating the conductors of the link line extending through the line circuit 17 to the repeater 18. With the trunk 13 idle the test conductor 13c is marked with negative battery potential, so that the busy test relay is not reoperated. With the busy test relay in its restored position, the trunk hunting operation of the connector is arrested. When the relays R530 and R450 sequentially restore shortly after the trunk is selected, the path short-circuiting the winding of the switch-through relay R240 is opened at the contacts 533. When this path is broken, the two relays R240 and R460 are energized in series over a circuit which extends from the grounded release conductor C272 by way of the contacts 446 and 455, C237, the winding of R240, C284, and the winding of R460 to battery. The current traversing this circuit is sufficient to maintain the relay R460 in its operated position and to cause the operation of the switch-through relay R240.

In operating, the relay R240 closes its contacts 245 to complete a path including the grounded release conductor C272, the test conductor C273, the contacts 655, and the wiper 623 for impressing ground potential upon the conductor 13c, thereby to mark the selected trunk 13 as busy. At its contacts 246, the relay R240 opens the previously traced operating and locking circuits for the hold relay R370. At its contacts 242 and 244, the relay R240 switches the calling loop circuit through to the repeater 18. At its contacts 241 and 243, the relay R240 opens the loop circuit as initially extended to the connector 20, thereby to cause the deenergization and release of the three relays R300, R260 and R310.

When the calling loop circuit is extended over the conductors C263 and C266 to the repeater 18 in the manner just explained, certain of the relays embodied therein operate to connect the test conductor 13c and the connected conductors C273 and C272 to ground, thereby to provide locking circuits for the relays R240 and R460. In operating, these relays of the repeater also condition the repeater to repeat impulses transmitted thereto from the calling substation over the trunk 13 to the automatic switching equipment provided in the exchange 9, and close a path for impressing ground potential upon the control conductor C270 for the purpose of maintaining the cut-off relay R110 operated and the line 10 marked as busy in the bank contacts of the connectors. This ground path may partially be traced as extending by way of the grounded test conductor 13c, the wiper 623, the contacts 655, C273, the contacts 245, C272, the contacts 463, C299, and the contacts 223 and 219 to the control conductor C270.

Shortly following the operation of the repeater 18 to perform the functions just described, the hold relay R370 restores and opens its contacts 373 and 374 to deenergize the hold slave relay R360 and the trunk identification relay R330. The relay R360, upon restoring, opens its contacts 365 to interrupt the operating circuit for the timing relay R200 and thus render the timing facilities of the connector 20 inactive. At its contacts 361, the relay R360 opens the only remaining path in the connector 20 over which ground potential is impressed upon the release conductor C272 and the connected test conductor C273. At its contacts 363, the relay R360 completes the previously described path for impressing ground potential upon the release alarm conductor C281. At its contacts 364', the relay R360 prepares the operating circuit for the release magnet 257. At its contacts 366', the relay R360 disconnects the hold conductor C291 from ground, thereby to cause the deenergization and release of any operated ones of the relays R200, R210, R500, R540 and R640. At its contacts 369, the relay R360 recompletes one of the above-traced operating circuits for the release magnet 674, whereby the minor switch 670 is restored to normal. Incident to the release of this switch the off-normal springs 675 are disengaged to deenergize the relay R580. Following the release of the last-mentioned relay no further operation of the control equipment embodied in the connector 20 occurs until the connection is released. In this regard it will be noted that after the switch-through operation is effected the calling loop circuit as extended to the repeater 18 is cleared of all impedances which might interfere with the transmission of switch directing impulses to this repeater. It will also be noted that only the two relays R240 and R460 are operated in the connector 20 after the switch-through operation is effected. The dial pulses as transmitted to the repeater 18 are, through operation of this repeater, transmitted to the automatic switching equipment assigned for use in the exchange 9 and serve to control this equipment so that the call is extended to the desired substation in a manner well understood in the art. The manner in which the called substation is signaled and the desired talking circuit is set up, all under the control of the assigned automatic switching equipment in the exchange 9, may be entirely conventional.

Preferably, the circuit arrangement of the repeater 18 is such that the release of the connection as extended through the connector 20 and the automatic switching equipment of the exchange 9 to the called line is entirely under the control of the calling subscriber at the substation A. With this arrangement, when the calling subscriber hangs up to interrupt the loop circuit extending to the repeater 18 the operated control relays of this repeater are deenergized and restore. Incident to the release of these relays the loop circuit extending to the automatic exchange 9 and including the conductors of the trunk 13 is interrupted to initiate the release of the automatic switching equipment occupied with the call in the exchange 9. Also incident to the release of the operated relays in the repeater 18, the connected conductors 13c, C273, C272 and C270 are disconnected from ground. When the conductor 13c is disconnected from ground the line circuit 17 is released in a manner clearly apparent from the above explanation with reference to the line circuit 14. When the control conductor C270 is disconnected from ground the line circuit 14 is also released in a manner clearly apparent from the preceding explanation. When the release conductor C272 is disconnected from ground the finder 19 is caused to release and the two operated relays R240 and R460 of the connector 20 are deenergized and restore. In releasing, the relay R460 closes its contacts 461 to complete the prepared operating circuit for the release magnet 257. This magnet, upon operating, closes its contacts 258 to impress ground potential upon the release alarm conductor C281 and attracts its associated holding pawl to cause the release of the wiper carriage structure embodied in the Strowger switching mechanism of the connector 20. When this structure is restored to its rotary and vertical normal position, the off-normal springs 425, 224, 225 and 259 are respectively operated to their normal positions. Incident to the disengagement of the off-normal springs 259, the release magnet 257 is deenergized. In releasing, this magnet opens its contacts 258 to disconnect the release alarm conductor C281 from ground. Following the release operations just described all of the equipment utilized in handling the call is fully restored to normal and rendered available for further use.

REVERTING CALLS

The arrangement of the illustrated automatic switching equipment provided in the community exchange is such that reverting call connections, i. e., connections between substations served by the same line, are set up by the directory number dialing method. In considering this type of call it may be assumed that a call intended for the substation C is initiated at the substation B and that the illustrated finder-connector link is utilized in handling the call. After the connection is extended through the line circuit 15 and the finder 19 to the connector 20 and the dial tone signal is transmitted to the calling subscriber at the substation B, this subscriber may dial the directory number designating the desired substation C. The first three digits of this number correspond to the first three digits of the directory number designating the substation B, only the fourth or code selecting digits of the two numbers being different to distinguish between the two substations. At the end of the third digit the wipers 624, 625 and 626 of the connector are positioned to engage the contacts terminating the conductors of the line 11. Obviously, this line is marked as busy through the application of ground potential to the private conductor 11c thereof. Accordingly, the previously traced operating circuit for the busy test relay R440 is completed immediately the line is selected by the connector 20. Shortly after the third digit is completed, the transfer relay R450 restores to complete the locking circuit for the busy test relay R440 and to close the previously traced busy signaling circuit. Accordingly, after the dialing operation is completed, i. e., after the fourth digit is dialed into the minor switch 670 to select the ringing code assigned to the substation C, a busy signal is received by the calling subscriber. Upon receiving this signal the calling subscriber restores the receiver provided at the substation B to its supporting hook or cradle, whereby the hook or cradle switch springs are operated to interrupt the loop circuit extending through the finder 19 to the connector 20. When this loop circuit is broken, the three relays R260, R300 and R310 are deenergized and restore. When the two relays R300 and R310 restore the operating and locking circuits for the hold relay R370 are opened at the contacts 312 and 302, respectively. At its contacts 313, the relay R310 prepares the previously mentioned operating circuit for the reverting call relay R250 and completes a locking circuit for the operated cut-off relay in the line circuit 15. More specifically, the relay R310, upon closing its contacts 313, completes a path for impressing ground potential upon the connected conductors C273, 11c and C270. This path extends from ground by way of the contacts 218 and 246, C296, the contacts 313 and 368, C390, the contacts 546, C516, the contacts 462 and 445, C273, the contacts 655, the test wiper 626, the private conductor 11c, the test wiper of the finder 19 and through the engaged contacts of the operated switch-through relay in the finder 19 to the conductor C270. This ground path serves to maintain the line 11 marked as busy and to prevent the release of the operated line and cut-off relays in the line circuit 15. When ground potential is applied to the conductor C270 over the above-traced path, a locking circuit is established for the hold slave relay R360, this circuit extending from the grounded conductor C270 by way of the contacts 219 and 223, C299, the contacts 464, C236, the contacts 233, C285, the contacts 364 and the winding of R360 to battery.

When the hold relay R370 restores it opens its contacts 374 to interrupt the operating circuit for the hold relay R360, and opens its contacts 373 to disconnect the control conductor C270 from ground in the connector 20. At its contacts 373, the relay R370 also opens the operating circuit for the trunk identification relay R330. At its contacts 372, the relay R370 completes the prepared operating circuit for the reverting call relay R250, this circuit extending from the grounded control conductor C270 by way of the contacts 372, C379, the contacts 442, C271 and the winding of R250 to battery. In operating, the relay R250 opens its contacts 251 and 252 to disconnect the repeating coil windings 346 and 347 from the conductors of the line 11, and thus interrupt two additional points in the circuit for energizing the two relays R260 and R300 in series. At its contacts 253, the relay R250 prepares the operating circuit for the relay R230. At its contacts 254, the relay R250 opens a point in one of the previously traced paths for impressing ground potential upon the test conductor C273. At its contacts 255, the relay R250 completes a multiple path for impressing ground potential upon the connected conductors C273, 11c and C270, this path extending from ground by way of the contacts 255 and 246, C296, the contacts 313 and 368, C390, the contacts 546, C516 and the contacts 462 and 445 to the conductor C273. At its contacts 256, the relay R250 completes the previously mentioned alternative operating circuit for the drain control relay R600, this circuit extending from ground by way of the contacts 366', C291, the contacts 256, C228, the contacts 549, C598, the contacts 639, and the winding of R600 to battery.

In operating, the relay R600 closes its contacts 605 to complete a circuit including the grounded hold conductor C291 for energizing the switching relay R630. The relay R630, upon operating, locks through its contacts 638 to the grounded hold conductor C291, and opens its contacts 639 to deenergize the drain control relay R600. At its contacts 632, the relay R630 opens the previously traced busy signaling circuit to prevent the continued transmission of busy tone signaling current over the line 11. In operating, the relay R630 also closes its contacts 636, thereby to render the pickup relay R510 responsive to the pickup pulse next transmitted over the selected one of the two pickup leads C576 and C577. From this point on the manner in which ringing current of the selected code is transmitted over the line 11, to energize the ringer provided at the called substation C, is exactly the same as described above with reference to the call originating at the substation A and routed to the substation B.

When the answering loop circuit is completed the ring cut-off relay R660 is energized thereover in the manner previously explained. In operating, this relay closes its contacts 661 to complete the prepared operating circuit for the stop ringing relay R550. The relay R550 now operates and locks to the grounded conductor C381 through its contacts 551. At its contacts 553, the relay R550 deenergizes the pickup relay R510, if operated. At its contacts 554, the relay R550 completes one of the previously traced operating circuits for the release magnet 674, whereby the minor switch 670 is restored to normal in the manner previously described. Incident to the release of this switch the off-normal springs 675 are disengaged to deenergize the relay R580 which now restores. The relay R510, upon restoring, opens its contacts 515 to deenergize the relay R610, if operated. The relay R610, in releasing, opens its contacts 616 to deenergize the drain control relay R600, if operated. When the relay operations just described are concluded, the transmission of ringing current over the line 11 is arrested. When both of the relays R609 and R610 are deenergized, the answering loop circuit is extended through the repeating coil windings 348 and 349 to include the winding of the back-bridge relay R340. The relay R340, upon operating, closes its contacts 341 to complete the previously traced locking circuit for the stop ringing relay R550, and opens its contacts 343 to interrupt the operating circuit for the timing relay R200. At its contacts 342, the relay R340 completes the prepared operating circuit for the relay R230, this circuit extending from ground by way of the parallel-connected contacts 255 and 218, the contacts 246, C296, the contacts 313 and 360, C390, the contacts 546, C516, the contacts 462 and 445, the test conductor C273, the contacts 656, the wiper 626, the conductor 11c, the test wiper of the finder 19, the engaged contacts of the operated switch-through relay in this finder, C270, the contacts 219 and 223, C299, the contacts 342, C276, the contacts 253, and the upper winding of R230 to battery. In operating, the relay R230 locks to the grounded control conductor C270 in a circuit which includes its lower winding, the contacts 234, C271, the contacts 442, C379, and the contacts 372. At its contacts 235', the relay R230 connects the ringing apparatus start conductor C599 to ground. At its contacts 233 and 232, the relay R230 establishes alternative locking circuits for the two relays R360 and R550. These circuits commonly extend from the grounded control conductor C270 by way of the contacts 219 and 223, C299, the contacts 342, C276, the contacts 232, C285, and the contacts 364 to the conductor C381 where they divide, one branch extending through the winding of R360 to battery, and the second branch extending by way of the contacts 341, C380, the contacts 541 and the winding of R550 to battery. At its contacts 235, the relay R230 prepares the operating circuit for the reverting call timing relay R220. At its contacts 231, the relay R230 completes a circuit for transmitting a distinctive signal tone current over the established connection to the answering substation. This current is derived from the ringing current generator and the circuit traversed thereby may be traced as extending from the generator lead C618 by way of the interrupter springs 1133, the reverting call tone lead C267, the condenser 225', and the contacts 231 to the negative link line conductor C268. From this point, the current is transmitted over the line 11 to energize the receiver provided at the answering substation. This current, as reproduced in the form of a distinctive interrupted signal, serves to inform the answering party that the answered call is of the revertive type. The purpose of transmitting this signal is to prevent the answering party from believing that the answered call has been abandoned. Assuming that the line 11 is arranged for bridged ringing, the ringer provided at this substation is energized concurrently with that provided at the substation C during the ringing interval. Accordingly, when the call is answered at the called substation, to terminate the ringing operation in the manner just explained, the calling subscriber is informed that the call has been answered. Accordingly, this subscriber may, by again lifting the receiver provided at the substation B from its supporting hook or cradle, establish the desired talking circuit between the two substations B and C. In the event the line 11 is arranged for divided ringing and the ringers at the calling and called substations are connected to different sides of the line 11, the calling subscriber at the substation B is expected to wait a reasonable time interval after hanging up to initiate the ringing operation, before again removing the receiver at this substation from its supporting hook or cradle. This permits a ringing period of reasonable length to elapse during which the called substation may be signaled before the ringing operation is arrested. In this regard it will be noted that, regardless of the substation at which the answering loop circuit including the line 11 is established, the ringing operation is automatically terminated when such a loop circuit is completed.

A short interval after the operation of the start timing relay R230 to perform the functions just described, the interrupter springs 1020 are closed under the control of the cam 1033 to complete a circuit including the pulsing lead C289 and the contacts 235, for energizing the timing relay R220. In operating, the relay R220 locks through its contacts 221 to the grounded hold conductor C291. At its contacts 222 and 223, the relay R220 transfers the holding circuits for the relays R230 and R360 from the grounded control conductor C270 to the grounded cut-off lead C293, the latter lead normally being connected to ground through the interrupter springs 1001. A short time interval after the timing relay R220 operates, the springs 1001 are disengaged under the control of the cam 1021 to deenergize the upper winding of the relay R230 and the hold slave relay R360. The relay R360 now restores and opens its contacts 361 to disconnect the release conductor C272 from ground. At its contacts 364, the relay R360 further interrupts its own locking circuit. At its contacts 366', the relay R360 disconnects the hold conductor C291 from ground to cause the deenergization and release of the relays R220, R540, R630 and R650, and any operated ones of the relays R560, R570 and R640. At its contacts 363, the relay R360 opens the previously traced path for impressing ground potential upon the connected conductors C273, 11c and C279. When ground potential is removed from the release conductor C272 the operated finder 19 is released in the manner previously described and the busy test relay R440 is deenergized and restores. When ground potential is removed from the conductor 11c, the operated cut-off relay of the line circuit 15 is deenergized and restores to reconnect the windings of its associated line relay across the conductors of the line 11. Thus the line circuit 15 is operated to its line lockout setting wherein the line relay thereof is operated and the cut-off relay thereof is released. With the circuit in this condition ground potential is restored to the private conductor 11c to maintain the line 11 marked as busy in the connectors having access thereto, and talking battery is supplied to the transmitters provided at the calling and called substations through the windings of the line relay.

When ground potential is removed from the control conductor C270, the two relays R250 and R230 are deenergized and restore. Incident to the release of the hold slave relay R360, the contacts 364' are closed to complete the prepared operating circuit for the release magnet 257, whereby the Strowger switching mechanism of the connector 20 is restored to normal in the manner previously described. Incident to the release of this mechanism, the off-normal springs 259 are disengaged to deenergize the release magnet 257. Following the deenergization of this magnet all of the equipment utilized in signaling the desired substation C, with the exception of the line circuit 15, is restored to normal in readiness for further use. When the calling and called parties at the substations B and C, respectively, both hang up to open the established loop circuit extending to the line circuit 15, the operated line relay of this line circuit is deenergized and restores. Thus the line circuit 15 is released.

FORCED RELEASE

As previously indicated, the two relays R200 and R210 are controlled by the interrupter 50 forcibly to release the illustrated link comprising the finder 19 and the connector 20 when this link is held over a line having a permanent calling condition thereon. The permanent condition of the line may be due to a fault on the line or to carelessness on the part of a party using the line. In considering the manner in which the forced release of the link is accomplished it may be assumed that the link is held over the line 10. In this regard it will be recalled from the preceding explanation that, when a loop circuit is extended from the line 10 to the connector 20, the hold slave relay R360 operates and closes its contacts 365 to prepare the operating circuit for the timing relay R200. It will also be recalled that a short time interval after this circuit is prepared the interrupter springs 1366 are momentarily closed to transmit a ground pulse over the lead C292 and thus energize the upper winding of the timing relay R200. In operating, this relay locks up in a circuit which includes its lower winding, the contacts 203 and 214, C292, the contacts 557, C492, the contacts 423, and the grounded hold conductor C291. At its contacts 204, the relay R200 prepares the operating circuit for the timing relay R210. Assuming that the call was initiated at the substation A, and that the dialing of the directory number designating the desired substation is performed at the calling substation within a reasonable time interval, the operation of the timing equipment forcibly to release the link is prevented. In this regard it will be noted that the locking circuit for the timing relay R200 is opened at the contacts 423 each time a digit is dialed into the connector 20 to cause the operation of the pulse-controlled relay D420. In the event the dialing operation is started but not completed the timing relay R200 will obviously be reoperated shortly after the dialing operation is discontinued. On the other hand, if no switch directing impulses are transmitted to the connector 20, the timing relay R200 will remain in its operated position after it is initially energized. Assuming that this relay is held operated, a ground pulse is transmitted over the pulsing lead C290 by the interrupter springs 1371 at the end of a measured time interval, thereby to energize the lower winding of the timing relay R210. In operating, the relay R210 locks to ground in a circuit which includes its upper winding, its contacts 216 and the hold conductor C291. At its contacts 214 and 215, the relay R210 transfers the locking circuit for the timing relay R200 from the grounded hold conductor C291 to the normally grounded interrupter lead C288.

Immediately the timing relay R210 operates, the hold relay R370 is deenergized and restores. Thus it will be noted that with the back-bridge relay R340 in its restored position and the two relays R200 and R210 operated, the available circuits for energizing the hold relay R370 are held open at the contacts 344, 218, 206 and 255. At its contacts 219, the relay R210 opens one of the available paths over which ground potential is impressed upon the control conductor C270. At its contacts 213, the relay R210 opens a point in the operating circuit for the relay R200.

The relay R370, upon restoring, opens its contacts 373 to disconnect the control conductor C270 from ground, and opens its contacts 374 to deenergize the hold slave relay R360. The latter relay, upon restoring, disconnects the two conductors C272 and C291 from ground to deenergize the timing relay R210 and to initiate the release of the link in the manner previously explained. In releasing, the relay R210 opens its contacts 215 to transfer the locking circuit for the timing relay R200 from the grounded conductor C288 back to the hold conductor C291. At this time the latter conductor is disconnected from ground, and, accordingly, the timing relay R200 is deenergized and restores. Aside from the release of the two relays R200 and R210, the finder 19 and the connector 20 are released in the exact manner previously described.

When ground potential is removed from the control conductor C270, the cut-off relay R110 is deenergized and restores. In releasing, this relay bridges the windings of the line relay R100 across the conductors of the line 10 to maintain the latter relay energized. Thus it will be noted that the line circuit 14 is operated to its line lockout setting incident to the removal of ground potential from the control conductor C270. This setting is maintained until the calling condition present on the line 10 is removed, at which time the line relay R100 is deenergized and restores.

Operation of the Ringing Control Equipment

In general, the arrangement of the transfer relays provided in the ringing equipment 901 for selectively rendering the two available ringing current generators operative to deliver ringing current to the line switching equipment of the exchange is similar to the arrangement disclosed for this purpose in Fig. 6 of co-pending application, Serial No. 329,087, filed April 11, 1940, Seth E. Peterson and Morris E. Griffins. In brief, this apparatus is so arranged that a transfer from one ringing current generator to the other generator is automatically effected in the event a fault should occur in the first generator, and vice versa. The transfer apparatus is also so arranged that either generator may be substituted for the other, under the selective control of a supervisory operator located in a distant office. For example, if the first of the two generators is connected to deliver current to the exchange switching equipment, and the remote operator desires to cut this generator out of service and to initiate the operation of the second generator, she may do so by dialing the transfer directory number assigned to the transfer lead C975 which is terminated in the private bank of each of the connectors of the community exchange. Assuming that the illustrated link is utilized in setting up a connection of this character, ground potential is impressed upon the transfer lead C975 incident to the operation of the switching relay R630, in the manner previously explained. When this lead is connected to ground the transfer relays of the equipment 901 operate to effect a substitution of the second generator for the first generator. Thereafter, and when the transfer lead C975 is disconnected from ground incident to the release of the illustrated link under the control of the remote operator, the transfer control relays are conditioned to be controlled over the transfer lead C976 to effect another transfer operation wherein the second generator is cut out of service and the first generator is cut into service. More specifically, this re-transfer operation may be effected under the control of the remote operator by routing a transfer connection through the illustrated link, for example, to the transfer lead C976. When this lead is connected to ground the transfer control relays are operated to substitute the inactive first generator for the second generator. Incident to the release of the last-mentioned transfer connection, the transfer control relays are again conditioned to be controlled over the transfer lead C975 to effect a substitution of the second generator for the first generator. In any case where a fault occurs in the active generator to cause the other generator to be cut into service, the transfer control relays function to impress ground potential upon the alarm conductor C919. When this lead is connected to ground an alarm signal is transmitted to the distant operator position in the manner explained immediately below.

Operation of the Alarm Equipment

As indicated previously, the sustained application of ground potential to any one of the various alarm leads C909, C914, C919, C924, C120, C949, etc., indicates different types of faults in the switching equipment of the community exchange, which should be brought to the attention of the maintenance staff. More specifically, the application of ground potential to the conductor C909 indicates that the source of alternating supply current for the motor 1201 and the input circuit of the rectifier 1202 has failed; the application of ground potential to the conductor C914 indicates that the rectifier 1202 is out of order; the application of ground potential to the conductor C919 indicates that a fault is present in one of the ringing current generators; the application of ground potential to the conductor C924 indicates that the voltage across the exchange bus conductors 1303 and 1304 is below normal; the application of ground potential to the conductor C120 indicates that one of the line circuits of the exchange occupies a line lockout setting; and the application of ground potential to the conductor C949 indicates that the fuse through which current is supplied to the relay and magnet coils of one of the links has blown. It may further be noted that if a fuse, such, for example, as the fuse 982 associated with the main distributing frame alarm bar 981 is blown, ground potential is applied to this bar to initiate the operation of the alarm sending equipment in the manner explained below. The alarm sending relays 55 operate to transmit an alarm signal to the distant supervisory operator when any one of the enumerated leads or the alarm bar 981 is connected to ground for a sustained time interval. Thus it will be noted that when the conductor C883 is connected to ground through the alarm bar 981 or any one of the leads C909, C914, C919, C924 or C949 the normally operated relay R840 is short-circuited and restores. In releasing, this relay closes its contacts 843 to complete an obvious circuit for energizing the timing relay R810, and opens its contacts 842 to disconnect the test relay R830 from the test conductor 845c of the alarm sending trunk 845.

In this regard it may be noted that the conductors of the trunk 845 are connected to the conductors of a repeater which terminates one of the inter-office trunks extending to the distant manual office. More specifically, the conductors 845a, 845b and 845c are respectively multipled to the positive and negative talking conductors and the test conductor over which the repeater may be seized through the links of the community exchange. It will be understood, therefore, that when this repeater is in use, ground potential is impressed upon the conductor 845c to energize the test relay R830. With this relay operated, the contacts 832 are disengaged to prevent the relay R840 from being short-circuited over the alarm conductor C883, and the contacts 831 are disengaged to prevent the relay R820 from being energized over the alarm conductor C882. Accordingly, if ground potential is impressed upon the conductor C883 at a time when the relay R830 is operated, the relay R840 remains in its operated position until the inter-office trunk assigned for alarm sending purposes is released to cause the deenergization and release of the test relay R830.

As indicated above, the relay R840, upon restoring, closes its contacts 843 to energize the relay R810, and opens its contacts 842 to interrupt the circuit for energizing the test relay R830. At its contacts 841, the relay R840 completes a loop circuit including the talking conductors 845a and 845b, which extends to the repeater associated with the inter-office trunk assigned for alarm sending purposes. When this loop circuit is completed the repeater functions to transmit a call signal over the associated trunk to the operator position in the distant manual office. The operator, upon answering the call and failing to receive any response, is informed that she has answered an alarm call. Upon receiving this indication the operator may transmit the information to a supervisory operator who may dial the test number assigned to the community exchange for the purpose of ascertaining the character of the fault.

When the timing relay R810 is energized the armature 811 thereof strikes the weighted armature 813 to initiate vibration thereof. During vibration of the armature 813 the intermittent engagement of the contacts 812 is insufficient to cause the operation of the slow-to-operate relay R800, but after a predetermined time interval vibration of the armature 813 is arrested and the contacts 812 settle into resting engagement. When this occurs, the relay R800 operates after an interval and closes its contacts 801 to complete a circuit including the conductor C884 for energizing the parallel-connected lower windings of the alarm relays R905, R910, R915, R920, R925, R930, R935, R940, R945, R950, R955 and R960. These relays, upon operating, prepare or complete locking circuits which respectively include the associated alarm conductors. Thus if the alarm conductor C909 is connected to ground the relay R905 locks up in a circuit which includes this conductor, its upper winding, and the contacts 907. Similarly, if the conductor C949 is connected to ground the alarm relay R945 locks up in a circuit which includes this conductor, its upper winding, and the contacts 947. Since all of the relays R905, R910, R915, R920, R925, R930, R935, R940, R945 and R950 are operated in response to the operation of the relay R800, the alarm conductor C883 is disconnected from all of the alarm leads C909, C914, C919, C924 and C949, and from the alarm bar 981. Accordingly, the path short-circuiting the winding of the relay R840 is opened. This relay now reoperates and opens its contacts 841 to interrupt the loop circuit extending to the alarm sending repeater. At its contacts 842, the relay R840 reprepares the operating circuit for the test relay R830. At its contacts 843, the relay R840 opens the operating circuit for the relay R810, thereby to cause the sequential release of the latter relay and the relay R800. When the relay R800 restores it opens its contacts 801 to interrupt the multiple operating circuits for the alarm relays R905, R910, R915, R920, R925, R935, R940, R945, R950, R955 and R960. When this circuit is broken only the alarm relays which are locked up to their respective associated grounded alarm conductors remain operated. Thus, if only the alarm conductor C909 is connected to ground, only the alarm relay R905 remains in its operated position. Similarly, if the alarm conductor C924 is connected to ground, the relay R920 remains in its operated position. The remaining alarm relays are all deenergized and restore.

Assuming that the alarm relay R905 is locked energized at the end of the alarm sending operation described above, this relay maintains its contacts 908 in engagement to short-circuit the interrupter springs 1016 over a path which includes the two conductors C1052 and C1053. Similarly, if the alarm relay R910 is locked up in its operated position at the end of the alarm sending operation, the interrupter springs 1015 are bridged by a path which includes the conductors C1051 and C1052 and the engaged contacts 913 of the alarm relay R910. From these examples it will be apparent that with different ones of the illustrated alarm relays operated, different sets of the interrupter springs 1005 to 1019, inclusive, are short-circuited to condition the supervisory signaling circuits for the transmission of differently coded alarm signals.

The fuses associated with the two alarm bars 983 and 985 are arranged to control the alarm sending relays 55 in a manner substantially similar to that described above. Thus if the fuse 984, for example, associated with the alarm bar 983 is blown, the negative terminal of the exchange battery 1300 is connected to this alarm bar to complete a circuit for energizing the relay R820. This circuit extends from ground by way of the winding of R820, the contacts 831, C882, the contacts 956, the bar 983, and the fuse 984 to battery. A similar circuit is also completed if the fuse 986, for example, associated with the alarm bar 985 is disrupted to impress negative battery potential upon this bar. It will be noted that the circuit for energizing the relay R820 extends through the contacts 831. Accordingly, this relay can not be energized when the test relay R830 is operated to indicate that the associated alarm sending repeater is busy. In operating, the relay R820 closes its contacts 821 to complete an obvious alternative path for short-circuiting the winding of the relay R840. The relay R840, in releasing, initiates the transmission of the alarm and the timing operation, in the manner explained above. A predetermined time interval following the release of this relay, and, more specifically, when the relay R800 operates, the parallel-connected lower windings of the alarm relays are all energized. In the case under consideration, only one of the two relays R955 and R960 is locked energized. Thus if the alarm bar 983 is connected to the negative terminal of the exchange battery, the relay R955 is locked up in a circuit which includes its upper winding, the contacts 957 and the bar 983. Similarly, if the alarm bar 985 is connected to the negative terminal of the exchange battery through an associated disrupted fuse, the relay R960 is locked energized in a circuit which includes this bar, the contacts 962, and the upper winding of R960. With one of the two relays R955 and R960 operated, the circuit for energizing the relay R820 is opened at the contacts 956 or 961. This relay, in restoring, initiates the release of the alarm sending relays 55 in the manner explained above. Incident to the release of these relays the conductor C884 is disconnected from ground to deenergize the lower windings of all of the double-wound alarm relays. Accordingly, all of these relays, with the exception of one of the two relays R955 and R960, are deenergized and restore. It will be noted that with the relay R955 operated, a path including the two conductors C1042 and C1043 and the contacts 958, is completed for shunting the interrupter springs 1006. Similarly, if the relay R960 is locked energized at the end of the alarm sending operation, the interrupter springs 1005 are shunted over a path which includes the two conductors C1041 and C1042 and the contacts 963.

In the arrangement illustrated, the alarm sending equipment is not controlled to transmit an alarm signal to the distant operator position when a line circuit individual to one of the subscriber lines of the system occupies its line lockout setting. In this regard it will be recalled from the preceding explanation that when a line circuit, such, for example, as the line circuit 14, is operated to its lockout setting, the alarm conductor C120 is connected to ground. When this occurs the relay R930 is energized in an obvious circuit. With this relay operated the contacts 931 are engaged to complete a path including the two conductors C1047 and C1048, which shunts the interrupter springs 1011. The operation of the relay R930 does not initiate the transmission of an alarm signal to the distant operator position in the manner explained above.

As pointed out previously, the two relays R860 and R870 in cooperation with the timing cams of the interrupter 50, are arranged to control the transmission of a release alarm signal to the distant operator position. In this regard it will be recalled from the preceding explanation that when the Strowger switching mechanism of the connector 20 is conditioned for release, the release magnet 257 is operated to impress ground potential upon the release alarm conductor C281 through its contacts 258. Similarly, if the hold slave relay R360 of the connector is released to complete the operating circuit for the release magnet 674 of the minor switch 670, and this minor switch fails to release, the relay R580 remains in its operated position to hold ground potential upon the release alarm conductor C281 over a path which includes the contacts 363, C383 and the contacts 358. In a similar manner, when the finder 19 is conditioned for release, the release alarm conductor C281 is connected to ground. Normally the release operations, both in the finder and the connector, are effected in a short time interval. If, however, a release operation should not be performed within a reasonable time interval, the operating circuit for the relay R870 is completed. Thus if ground potential is maintained upon the release alarm conductor C281 for a time interval which is somewhat less than two minutes, the interrupter springs 1365 are closed under the control of the cam 1380 to complete the operating circuit for the relay R870. This circuit extends from the grounded conductor C281 by way of the conductor C879, the interrupter springs 1365, C878, and the winding of R870 to battery. In operating, the relay R870 locks directly to the grounded release alarm conductor C281 and closes its contacts 872 to prepare the operating circuit for the relay R860. Approximately two minutes after the relay R870 operates, the interrupter springs 1370 are closed under the control of the cam 1383 to complete the prepared operating circuit for the relay R860, this circuit extending from ground by way of the interrupter springs 1370, C880, the contacts 872, and the winding of R860 to battery. It will be noted that if the release alarm conductor C281 is disconnected from ground during this two-minute period to cause the deenergization and release of the relay R870, the operating circuit just traced is opened at the contacts 872 to prevent the energization of the relay R860, and hence the transmission of the alarm. When energized over the above-traced circuit, the relay R860 locks to ground over a path including the contacts 861 and 871. At its contacts 862, the relay R860 connects the alarm conductor C883 to ground over a path which includes the conductor C939 and the contacts 936. When this path is completed the alarm sending relays 55 operate to transmit an alarm to the distant operator and to cause the operation of the double-wound relays in the manner explained above. The relay R935, upon operating, locks to ground over a path including its contacts 937, C939 and the contacts 862. At its contacts 936, the relay R935 disconnects the alarm lead C883 from ground to initiate the release of the alarm sending relays 55 and the associated alarm relays, in the manner explained above. At its contacts 938, the relay R935 completes a path including the conductors C1046 and C1047 for short-circuiting the interrupter springs 1010. Obviously, the alarm relay R935 is held in its operated position until the two relays R870 and R860 are deenergized. This occurs only when the release alarm conductor C281 is disconnected from ground to cause the sequential release of the two relays R870 and R860 in an obvious manner.

The alarm relay R950 is arranged to be controlled from the distributor 21 over the alarm lead C912 to transmit a delayed alarm to the distant central office when the distributor is held operated for an excessively long time interval. Thus, each time the start relay of the distributor is operated, the lead C912 is connected to ground. Conversely, each time this start relay restores to indicate that all waiting calls have been assigned links, the lead C912 is disconnected from ground. This lead and the interrupter 50 are arranged to control a set of timing relays which are identical in wiring arrangement with the two relays R860 and R870. Accordingly, if the lead C912 is connected to ground for a sustained time interval, indicating that incoming calls are not being handled properly or at the required speed, the alarm relay R950 operates to initiate the transmission of an alarm to the central office in the exact manner described above. In operating, the relay R950 also closes its contacts 953 to impart a setting to the supervisory signaling circuit which indicates the character of the trouble.

TRANSMITTING THE SUPERVISORY SIGNAL

In the event the supervisory operator in the distant central office is informed of an alarm transmitted in the manner explained above, or desires to make a routine test of the equipment provided in the community exchange, she may route a connection over one of the inter-office trunks connecting the two exchanges and through one of the finder-connector links of the community exchange to the test terminals terminating the conductors C875, C876 and C877, in a manner clearly apparent from the preceding explanation. Assuming that the illustrated finder-connector link is utilized in setting up the test connection, the two windings of the signal transmitting relay R850 are energized in series with the ring cut-off relay R660 incident to the operation of the line switching relay R630 and the ringing relay R610 in the manner previously explained. When thus energized the ring cut-off relay R660 operates to stop the ringing and to cause a communication connection to be set up through the connector 20 to the line terminals of the test contact set, in the exact manner previously described. After the connection is established the two windings of the signal transmitting relay R850 are energized in series with the winding of the back-bridge relay R340 and the winding of the battery feeding coil 350. When thus energized the relay R850 closes its contacts 854 to impress ground potential upon the test conductor C875 and thus mark the test terminals of the connector 20 as busy. At its contacts 852 and 853, the relay R850 connects the two start conductors C680 and C599 to ground, thereby to initiate the operation of the dial and busy tone generators and the ringing current generating equipment. At its contacts 851, the relay R850 completes the supervisory signaling circuit. This circuit normally extends from the output terminal of the dial tone generator 990 by way of the conductor C377, the series-connected interrupter springs 1002 and 1004 to 1019, inclusive, C881, the condenser 886, the contacts 851, C877, the wiper 621, and the contacts 651, 631, 611 and 601 to the negative link line conductor C266. From this point the dial tone current is transmitted over the calling end of the connection to energize the receiver of the telephone headset in use at the position of the calling supervisory operator. During each revolution of the supervisory shaft 1401 upon which the supervisory cams are mounted, the above-traced supervisory signaling circuit is successively interrupted by the interrupter springs 1005, 1006, 1007, 1008, 1009, 1004, 1010, 1011, 1012, 1013, 1014, 1004, 1015, 1016, 1017, 1018, and 1019, in the order named. Thus the supervisory signal normally transmitted during each revolution of the shaft 1401 comprises five evenly separated signal periods, a longer spacing period, five additional evenly separated signal periods, and a second spacing period followed by five more evenly spaced signal periods. Each signal or silent period corresponds to an abnormal condition that may be present in the switching equipment of the exchange. The longer spacing periods are provided in the signal for the purpose of more easily identifying the individual signal periods. At the end of each transmitted code signal, a marking signal is transmitted to indicate to the listening operator that the transmitted signal is completed and is about to be repeated. Thus each time the cam 1021 is rotated to a position wherein the interrupter springs 1002 are opened and the interrupter springs 1003 are closed, the supervisory signaling circuit traced above is energized with current derived from the ringing current apparatus 991 over a path which includes the conductor C618. The frequency of this current is different from the frequency of the current produced by the dial tone generator 990 and, accordingly, the marking signal reproduced by the receiver of the operator headset is of a pitch which differs from the supervisory signal. Moreover, by using the two different signal generators for the marking and supervisory signals, the operator may check the operability of the two different pieces of equipment and thus be informed that they are in proper working order. In this regard it will be understood that if the dial tone generating equipment is out of order, the supervising operator will fail to receive the coded supervisory signal. Further, if the ringing equipment is not operating, the operator will fail to receive the marking signal at the end of each supervisory signal.

It will be apparent from the preceding explanation that the character of the signal transmitted over the supervisory signaling circuit depends upon the setting of the alarm relays illustrated in Fig. 9 of the drawings. Thus if the relay R960 is operated, indicating that one of the fuses associated with the alarm bar 985 is defective, the interrupter springs 1005 are short-circuited through the contacts 963. Accordingly, the first signal period, i. e., the first silent interval, of the superivsory signal is masked. As a result the first third of the code will comprise only four short signal periods. The position of the masked signal period in the code enables the operator to identify the particular trunk. In a similar manner, if the relay R955 is locked in its operated position, the interrupter springs 1006 are short- circuited through the contacts 958 so that the second signal period of the first group of five periods is masked out to indicate to the listening operator that a fuse associated with the No. 2 fuse alarm bar 983 is defective. More generally considered, the character of the supervisory signal which is transmitted will be fully apparent from the following chart:

| Alarm relay operated | Type of fault | Signal transmitted |
|---|---|---|
| R905 | Low system voltage | 5 shorts, 1 long, 5 shorts, 1 long, 1 short, spacing period, 3 shorts. |
| R910 | Failure of rectifier 1202 | 5 shorts, 1 long, 5 shorts, 1 long, spacing period, 4 shorts. |
| R915 | Ringing generator failure. | 5 shorts, 1 long, 4 shorts, spacing period, 1 long, 5 shorts. |
| R920 | Commercial power failure. | 5 shorts, 1 long, 3 shorts, spacing period, 1 short, 1 long, 5 shorts. |
| R925 | Not wired | |
| R930 | Permanent calling line | 5 shorts, 1 long, 1 short, spacing period, 3 shorts, 1 long, 5 shorts. |
| R935 | Failure of a link to release. | 5 shorts, 1 long, spacing period, 4 shorts, 1 long, 5 shorts. |
| R940 | Blown fuse associated with M. D. F. alarm bar 981. | 4 shorts, spacing period, 1 long, 5 shorts, 1 long, 5 shorts. |
| R945 | Blown link fuse | 3 shorts, spacing period, 1 short, 1 long, 5 shorts, 1 long, 5 shorts. |
| R950 | Improper operation of the distributor 21. | 2 shorts, spacing period, 2 shorts, 1 long, 5 shorts, 1 long, 5 shorts. |
| R955 | Blown fuse associated with No. 2 fuse alarm bar 983. | 1 short, spacing period, 3 shorts, 1 long, 5 shorts, 1 long, 5 shorts. |
| R960 | Blown fuse associated with No. 1 fuse alarm bar. | Spacing period, 4 shorts, 1 long, 5 shorts, 1 long, 5 shorts. |

By referring to a chart of the above character the supervisory operator may readily identify any fault or abnormal condition in the community exchange and is thus enabled more intelligently to advise the maintenance staff as to where any trouble existing in the distant exchange is to be found. From this chart it will be apparent that the alarm relays shown in Fig. 9 of the drawings function to alter the character of the transmitted supervisory signal to indicate any abnormal condition that may arise in the system.

From the preceding explanation it will be understood that the alarm relay R930 may be operated to indicate the presence of a line having a permanent calling condition thereon but which is in good working order. Thus, a subscriber may fail to hang up after a connection is initiated and abandoned, or after a connection is released at the other end thereof, and thereby cause the line circuit associated with the line in use to be timed out to its line lockout setting. In such case the relay R930 will remain in its operated position until the calling condition is cleared. The supervisory operator, upon receiving a signal indicating a line condition of this character, may by making check test calls at regular intervals ascertain the true condition of the line and proceed accordingly. Such check test calls are also useful in determining the condition of the current supply system illustrated in Figs. 12 and 13 of the drawings. For example, the alternating current supply source for this equipment may frequently fail for short time intervals which do not seriously affect the state of charge of the storage battery 1300. Each time such a power failure occurs the relay R905 is operated and is held locked up under the control of the relay R1260 until power is again supplied to the terminals 1213 and 1214. It will be understood, therefore, that if the operator receives a supervisory signal which indicates by the character thereof that the relay R905 is operated she may, by making check test calls, ascertain whether or not the power failure is permanent or temporary, and thus be advised as to what steps should be taken to correct the fault in the feeder circuit. In a similar manner, if the relay R920 is operated to indicate a low voltage condition of the storage battery 1300, the supervisory operator is informed of this fact by the character of the received supervisory signal and may, by making check test calls, ascertain whether or not the condition clears itself within a reasonable time interval. In checking the condition of the ringing apparatus the operator may, by first dialing the supervisory test number, check the condition of the ringing generator in use. After the condition of the first generator is thus ascertained, the operator may dial the transfer number required to cut the other ringing current generator into use and then repeat the test call, whereby she is informed as to the condition of the stand-by generator. After this operation is performed the operator may cut the first ringing current generator back into service by dialing the second transfer number, if desired.

While one embodiment of the invention has been described, it will be understood that various modifications may be made therein without departing from the true spirit and scope of the invention.

What is claimed is:

1. In a telephone system which includes lines and trunks arranged in groups; a connector having a predetermined setting wherein a connection may be established therethrough to a busy called line and including an impulse-controlled device operative to different settings, line selecting means operative to different settings to select different groups of said lines, means responsive to the operation of said device in its response to a predetermined digit transmitted to said connector for conditioning said connector to operate to said predetermined setting, means for utilizing a portion of the impulses of a different received digit for imparting a predetermined setting to said device, and means responsive to the operation of said device to said predetermined setting for directing the remaining impulses of said different digit to said line selecting means.

2. In a telephone system which includes lines and trunks arranged in groups, a connector having a predetermined setting wherein a connection may be established therethrough to a busy called line and including an impulse-controlled device operative to different settings, line selecting means operative to different settings to select different groups of said lines, means responsive to the operation of said device in its response to a predetermined first digit transmitted to said connector for conditioning said connector to operate to said predetermined setting, means for utilizing a portion of the impulses of a different received first digit for imparting a predetermined setting to said device, and means responsive to the operation of said device to said predetermined setting for directing the remaining impulses of said different first digit to said line selecting means.

3. In a telephone system which includes lines and trunks arranged in groups, a connector having a predetermined setting wherein a connection may be established therethrough to a busy called line and including an impulse-controlled device operative to different settings, line selecting means operative to different settings to select different groups of said lines, means including said device for causing said connector to operate to said predetermined setting, and means including said device for absorbing a portion of the impulses of a received trunk selecting digit and for directing the remaining impulses of the received digit to said line selecting means.

4. In a telephone system which includes lines and trunks arranged in groups, a connector comprising a relay operative to condition said connector to establish a communication connection to a busy called line, line selecting means operative to different settings to select different groups of said lines, an operating circuit for said relay, means operative to prepare said circuit only when said connector is seized over a calling trunk, an impulse-controlled device included in said connector and operative to different settings, means responsive to the operation of said device in its response to a predetermined digit transmitted to said connector for completing said circuit, means for utilizing a portion of the impulses of a different received digit for imparting a predetermined setting to said device, and means responsive to the operation of said device to said predetermined setting for directing the remaining impulses of said different digit to said line selecting means.

5. In a telephone system which includes lines and trunks arranged in groups, a connector comprising a relay operative to condition said connector to establish a communication connection to a busy called line, line selecting means operative to different settings to select different groups of said lines, an operating circuit for said relay, means operative to prepare said circuit only when said connector is seized over a calling trunk, an impulse-controlled device included in said connector and operative to different settings, means responsive to the operation of said device in its response to a predetermined first digit transmitted to said connector for completing said circuit, means for utilizing a portion of the impulses of a different received first digit for imparting a predetermined setting to said device, and means responsive to the operation of said device to said predetermined setting for directing the remaining impulses of said different first digit to said line selecting means.

6. In a telephone system which includes lines and trunks arranged in groups, an impulse-controlled connector having access to said lines and trunks and including means responsive to the impulses of a received plural digit directory number for establishing a communication connection to a busy called line, means responsive to the impulses of a different plural digit directory number for selecting said group of trunks and for then successively testing said trunks until an idle trunk is found, and means responsive to the impulses of a received plural digit directory number which differs from said last-mentioned number only in the numerical value of one of the digits thereof for limiting the operation of said last-named means to the selection of a particular trunk in said group regardless of the idle or busy condition of said particular trunk.

7. In a telephone system which includes lines and trunks arranged in groups, an impulse-controlled connector having access to said lines and trunks and including means responsive to the impulses of a received plural digit directory number for establishing a communication connection to a busy called line, means responsive to the impulses of a different plural digit directory number for selecting said group of trunks and for then successively testing said trunks until an idle trunk is found, and means responsive to the impulses of a received plural digit directory number which differs from said last-mentioned number only in the numerical value of the first digit thereof for limiting the operation of said last-named means to the selection of said particular trunk regardless of the idle or busy condition of said trunk.

8. In a telephone system which includes a group of trunks and a plurality of lines, a connector having access to said lines and trunks and including an impulse-controlled device operative to different settings, monitor means controlled by said device to set up a communication connection to a busy called line, directively controlled means for selecting said group of trunks and for then automatically selecting an idle trunk in said group, and means controlled by said device for conditioning said last-named means to select a particular trunk in said group regardless of the idle or busy condition of said particular trunk.

9. In a telephone system which includes a group of trunks and a plurality of lines, a connector having access to said lines and trunks and including an impulse-controlled device operative to different settings, a marking circuit over which a calling trunk is marked in said connector when the connector is seized thereover, monitor means controlled over said circuit by said device and operative to set up a communication connection to a busy called line, directively controlled means for selecting said group of trunks and for then automatically selecting an idle trunk in said group, and means controlled by said device for conditioning said last-named means to select a particular trunk in said group regardless of the idle or busy condition of said particular trunk.

10. In a telephone system which includes a group of trunks and a plurality of multiparty lines arranged for selective signaling of the substations respectively associated therewith, a connector having access to said trunks and lines and including an impulse-controlled device operative to select the different signals which are utilized in selectively signaling over said lines, monitor means controlled by said device and operative to set up a communication connection to a busy called line, directively controlled means for selecting said group of trunks and for then automatically selecting an idle trunk in said group, and means controlled by said device for conditioning said last-named means to select a particular trunk in said group regardless of the idle or busy condition of said particular trunk.

11. In a telephone system which includes a group of trunks and a plurality of multiparty lines arranged for selective signaling of the substations respectively associated therewith, a connector having access to said trunks and lines and including an impulse-controlled device operative to select the different signals which are utilized in selectively signaling over said lines, monitor means controlled by said device during a first digit transmitted to said connector and operative to set up a communication connection to a busy called line, directively controlled means for selecting said group of trunks and for then automatically selecting an idle trunk in said group, and means controlled by said device during a first digit transmitted to said connector for conditioning said last-named means to select a particular trunk in said group regardless of the idle or busy condition of said particular trunk.

12. In a telephone system which includes different groups of trunks and a plurality of lines, a connector having access to said lines and trunks and including an impulse-controlled device operative to different settings, directively controlled line selecting means operative to different settings to select different groups of said trunks and to then automatically select an idle trunk in the selected group, monitor means controlled by said device and operative to set up a communication connection to a busy called line, means for utilizing a portion of the impulses of a received trunk selecting digit to impart a predetermined setting to said device, means responsive to the operation of said device to said predetermined setting for directing the remaining impulses of the digit to said line selecting means, and means controlled by said device for limiting the operation of said line selecting means to the selection of a particular trunk in a selected group regardless of the idle or busy condition of the particular trunk.

13. In a telephone system which includes different groups of trunks and a plurality of lines, a connector having access to said lines and trunks and including an impulse-controlled device operative to different settings, directively controlled line selecting means operative to different settings to select different groups of said trunks and to then automatically select an idle trunk in the selected group, a marking circuit over which a calling trunk is marked in said connector when said connector is seized thereover, monitor means controlled over said circuit by said device and operative to set up a communication connection to a busy called line, means for utilizing a portion of the impulses of a received trunk selecting digit to impart a predetermined setting to said device, means responsive to the operation of said device to said predetermined setting for directing the remaining impulses of the digit to said line selecting means, and means controlled by said device for limiting the operation of said line selecting means to the selection of a particular trunk in a selected group regardless of the idle or busy condition of the particular trunk.

14. In a telephone system which includes different groups of trunks and a plurality of lines, a connector having access to said lines and trunks and including an impulse-controlled device operative to different settings, directively controlled line selecting means operative to different settings to select different groups of said trunks and to then automatically select an idle trunk in the selected group, monitor means controlled by said device in its response to a predetermined first digit transmitted to said connector and operative to set up a communication connection to a busy called line, means controlled by said device in its response to a different first digit for limiting the operation of said line selecting means to the selection of a particular trunk in a selected group regardless of the idle or busy condition of the particular trunk, means for utilizing a portion of the impulses of a still different received first digit to impart a predetermined setting to said device, and means responsive to the operation of said device to said predetermined setting for directing the remaining impulses of the digit to said line selecting means, 15. In a telephone system which includes a group of trunks and a plurality of multiparty lines arranged for selective signaling of the substations respectively associated therewith, a connector having access to said trunks and lines and including an impulse-controlled device operative to select the different signals which are utilized in selectively signaling over said lines, monitor means controlled by said device and operative to set up a communication connection to a busy called line, line selecting means operative to different settings to select different groups of said lines, means for utilizing a portion of the impulses of a received trunk selecting digit to impart a predetermined setting to said device, and means responsive to the operation of said device to said predetermined setting for directing the remaining impulses of said digit to said line selecting means.

16. In a telephone system which includes a group of trunks and a plurality of multiparty lines arranged for selective signaling of the substations respectively associated therewith, a connector having access to said trunks and lines and including an impulse-controlled device operative to select the different signals which are utilized in selectively signaling over said lines, a marking circuit over which a calling trunk is marked in said connector when said connector is seized thereover, monitor means controlled over said circuit by said device and operative to set up a communication connection to a busy called line, line selecting means operative to different settings to select different groups of said lines, means for utilizing a portion of the impulses of a received trunk selecting digit to impart a predetermined setting to said device, and means responsive to the operation of said device to said predetermined setting for directing the remaining impulses of said digit to said line selecting means.

17. In a telephone system which includes a group of trunks and a plurality of multiparty lines arranged for selective signaling of the substations respectively associated therewith, a connector having access to said trunks and lines and including an impulse-controlled device operative to select the different signals which are utilized in selectively signaling over said lines, a marking circuit over which a calling trunk is marked in said connector when said connector is seized thereover, monitor means controlled over said circuit by said device in its response to a predetermined first digit transmitted to said connector and operative to set up a communication connection to a busy called line, means for utilizing a portion of the impulses of a received different first digit to impart a predetermined setting to said device, and means responsive to the operation of said device to said predetermined setting for directing the remaining impulses of said different first digit to said line selecting means.

PIER BAKKER.